United States Patent
Gong et al.

(10) Patent No.: US 10,111,124 B2
(45) Date of Patent: Oct. 23, 2018

(54) INTERFERENCE MEASUREMENT METHOD AND SYSTEM, RELATED EQUIPMENT AND STORAGE MEDIUM

(71) Applicant: ZTE Corporation, Shenzhen, Guangdong (CN)

(72) Inventors: Yuhong Gong, Shenzhen (CN); Yunfeng Sun, Shenzhen (CN); Yu Ngok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 123 days.

(21) Appl. No.: 14/903,507

(22) PCT Filed: Apr. 25, 2014

(86) PCT No.: PCT/CN2014/076287
§ 371 (c)(1),
(2) Date: Feb. 3, 2016

(87) PCT Pub. No.: WO2014/166443
PCT Pub. Date: Oct. 16, 2014

(65) Prior Publication Data
US 2016/0192227 A1    Jun. 30, 2016

(30) Foreign Application Priority Data

Jul. 11, 2013    (CN) .......................... 2013 1 0292228

(51) Int. Cl.
*H04W 24/10*    (2009.01)
*H04L 5/00*    (2006.01)
*H04B 7/06*    (2006.01)

(52) U.S. Cl.
CPC .......... *H04W 24/10* (2013.01); *H04B 7/0626* (2013.01); *H04L 5/005* (2013.01); *H04L 5/0051* (2013.01); *H04L 5/0071* (2013.01)

(58) Field of Classification Search
CPC .. H04W 24/10; H04W 72/042; H04B 7/0626; H04L 5/0048; H04L 5/0053; H04L 5/0035
(Continued)

(56) References Cited

U.S. PATENT DOCUMENTS 8,305,987 B2    11/2012  Fong
2011/0199986 A1    8/2011  Fong
(Continued)

FOREIGN PATENT DOCUMENTS

CN    102149124 A    8/2011
CN    102378110 A    3/2012
(Continued)

OTHER PUBLICATIONS

LG Electronics, Consideration on Interference Measurement Resource, 3GPP TSG RAN WG1 Meeting #69, R1-122295, May 2012.*
(Continued)

*Primary Examiner* — Chandrahas B Patel
(74) *Attorney, Agent, or Firm* — Oppedahl Patent Law Firm LLC

(57) ABSTRACT

Disclosed are an interference measurement method and system, and related equipment. The method includes: a network side configures Interference Measurement Resources for Demodulation (DM-IMRs) for a target data channel of a terminal, positions of the DM-IMRs on a frequency domain being determined according to a Physical Resource Block (PRB) which bears the target data channel; and the network side indicates configuration information of the DM-IMRs to the terminal to enable the terminal to perform transmission interference measurement on the target data channel. By the solutions of the present disclosure, accuracy in transmission interference measurement of the target data channel may be improved, so that improvement
(Continued)

in demodulation/decoding performance of the target data channel at a receiving side is facilitated, and receiving performance of the target data channel may further be improved.

27 Claims, 18 Drawing Sheets

(58) Field of Classification Search
USPC .................................. 370/310–350, 431–463
See application file for complete search history.

(56) References Cited

U.S. PATENT DOCUMENTS

| | | | |
|---|---|---|---|
| 2014/0066116 A1 | 3/2014 | Gao et al. | |
| 2015/0249517 A1* | 9/2015 | Seo | H04W 16/10 370/329 |
| 2016/0080963 A1* | 3/2016 | Marinier | H04L 5/0053 370/252 |

FOREIGN PATENT DOCUMENTS

| | | |
|---|---|---|
| CN | 102474375 A | 5/2012 |
| CN | 102742176 A | 10/2012 |
| CN | 103037397 A | 4/2013 |
| WO | 2013025558 A1 | 2/2013 |
| WO | 2014182541 A2 | 11/2014 |

OTHER PUBLICATIONS

Supplementary European Search Report in European application No. 14782801.6, dated May 31, 2016.
LG Electron I CS:"Consideration on Interference Measurement Resource",3GPP Draft; RI-122295,vol. RAN WG 1, No. 69 , May 12, 2012 (May 12, 2012), XP050600558,Prague, Czech Republic.
Pantech:"Remaining issues on interference measurement resources Rel-11",3GPP Draft; RI-124306, vol. RAN WG1, No. .70-bis Sep. 29, 2012, XP050662206, San Dieg, USA.
International Search Report in international application No. PCT/CN2014/076287, dated Aug. 4, 2014.
English Translation of the Written Opinion of the International Search Authority in international application No. PCT/CN2014/076287, dated Aug. 4, 2014.

* cited by examiner

INTERFERENCE MEASUREMENT METHOD AND SYSTEM, RELATED EQUIPMENT AND STORAGE MEDIUM

TECHNICAL FIELD

The disclosure relates to wireless communication technology, and in particular to an interference measurement method and system, a related equipment and a storage medium.

BACKGROUND

A Long Term Evolution (LTE) system is an important plan of the 3$^{rd}$ Generation Partnership Project (3GPP). When the LTE system adopts a conventional Cyclic Prefix (CP), a timeslot includes 7 downlink symbols with a certain length. When the LTE system adopts an extended CP, a timeslot includes 6 downlink symbols with the certain length.

FIG. 1 is a diagram illustrating a Physical Resource Block (PRB) in an LTE system according to a related technology. As shown in FIG. 1, one Resource Element (RE) is one subcarrier in one Orthogonal Frequency Division Multiplexing (OFDM) symbol, and one downlink Resource Block (RB) consists of 12 continuous subcarriers and 7 (6 in case of the extended CP) continuous OFDM symbols. An RB is 180 kHz in the frequency domain, and is one timeslot in the time domain. During resource allocation, resources may be allocated by taking two RBs (also called a PRB pair) on a sub-frame (corresponding to two timeslots) as a basic unit.

In an LTE system, the following physical channels are defined.

A Physical Broadcast Channel (PBCH): information carried by the channel includes: a frame number of the system, a downlink bandwidth of the system, a cycle of a Physical Hybrid ARQ Indicator Channel (PHICH) and a parameter $N_g \in \{1/6, 1/2, 1, 2\}$ for determining the channel group number of PHICHs.

A Physical Multicast Channel (PMCH): mainly configured to support a Multicast Broadcast over Single Frequency Network (MBSFN) service and broadcast multimedia time-frequency information to multiple users, wherein the PMCH may transmit data only in an MBSFN sub-frame and an MBSFN area.

A Physical Downlink Shared Channel (PDSCH): configured to bear downlink transmission data.

A Physical Downlink Control Channel (PDCCH): configured to bear uplink and downlink scheduling information and uplink power control information. PDCCHs in LTE Release 8 (R8), Release 9 (R9) and Release 10 (R10) are mainly distributed in first 1, 2, 3 or 4 OFDM symbols of a sub-frame, and specific distribution is required to be configured according to different sub-frame types and the number of Common Reference Signal or Cell-specific Reference Signal (CRS) ports. As shown in Table 1, Table 1 shows the numbers of OFDM symbols occupied by PDCCHs configured according to different sub-frame types and the number of CRS ports under the conditions that the number ($N_{RB}^{DL}$) of downlink Resource Blocks (RB) is more than 10 and not more than 10 respectively.

TABLE 1

| Sub-frame | Number of OFDM symbols occupied by PDCCH under the condition of $N_{RB}^{DL} > 10$ | Number of OFDM symbols occupied by PDCCH under the condition of $N_{RB}^{DL} \leq 10$ |
| --- | --- | --- |
| Sub-frame 1 and sub-frame 6 in sub-frame type 2 | 1, 2 | 2 |
| MBSFN sub-frame on a carrier supporting a PDSCH, CRS being configured to occupy port 1 or 2 | 1, 2 | 2 |
| MBSFN sub-frame on a carrier supporting a PDSCH, CRS being configured to occupy port 4 | 2 | 2 |
| Sub-frame on a carrier not supporting PDSCH transmission | 0 | 0 |
| Non-MBSFN sub-frame (except sub-frame 6 in sub-frame structure type 2) configured to be a Position Reference Signal (PRS) | 1, 2, 3 | 2, 3 |
| All other cases | 1, 2, 3 | 2, 3, 4 |

A Physical Control Format Indicator Channel (PCFICH): information carried by the channel is configured to indicate the number of transmission OFDM symbols of a PDCCH in a sub-frame, and is sent on the first OFDM symbol of the sub-frame, and a frequency position of the PCFICH is determined by the downlink bandwidth of the system and a cell Identity (ID).

A PHICH: configured to bear Acknowledgement/Non-acknowledgement (ACK/NACK) feedback information of uplink transmission data, wherein the number and time-frequency positions of PHICHs may be determined by a system message in a PBCH of a downlink carrier where the PHICHs are located and the cell ID.

In order to improve spectrum efficiency more, a cell is deployed more and more densely, and user interference (as shown in FIG. 2) in the same cell and co-channel interference (as shown in FIG. 3) between cells increasingly become main factors which limit network capacity.

In current researches, interference compression is implemented on a sending side mainly in manners of pre-coding, cooperative scheduling and the like on a network side. However, such network-side-based interference cooperation greatly depends on accuracy of fed Channel State Information (CSI). Related research data show that an advanced receiving method may also be adopted to well compress interference. In addition, compared with interference cooperation in the sender, terminal-based enhancement may alleviate pressure from channel information feedback. Therefore, how to optimize terminal reception for better interference compression is an important direction for effectively improving spectrum efficiency.

In an LTE R8 system, a CRS is adopted for Channel Quality Information (CQI) measurement and channel demodulation of a PDCCH/PDSCH. Since a CRS is a cell-specific signal, all terminals of the same cell adopt the same CRS resource. Resources occupied by CRSs of different cells may be staggered, that is, different cells have the same $V_{shift}$ value. The resources occupied by the CRSs of different cells may also be completely overlapped, that is, different cells have different values. Herein, $V_{shift}$ is related to a cell ID $N_{ID}^{cell}$, and is consistent with $V_{shift} = N_{ID}^{cell}$ mod 6. FIG. 4 and FIG. 5 are diagrams ($V_{shift}=0$) illustrating CRS resource configuration under normal CP and extended CP conditions respectively. When a CRS-based pre-coding processing manner is adopted, a sender is required to additionally notify a receiver of pre-coding weight information adopted during data transmission, and pilot overhead is higher. In addition, in a Multi-user Multi-input Multi-output (MU-MIMO) system, multiple users adopt the same CRS resources, so that it is impossible to achieve orthogonal pilot, thereby limiting target data channel estimation performance under a multi-user transmission condition.

In order to reduce pilot overhead and improve channel estimation accuracy, pilot measurement and data demodulation functions are separated in an Advanced Long Term Evolution (LTE-A) system, and two types of reference signals are defined respectively: a Demodulation Reference Signal (DMRS) and a Channel State Information Reference Signal (CSI-RS). A DMRS is mainly configured to implement channel estimation of a PDSCH and an Enhanced Physical Downlink Control Channel (ePDCCH) for data/control channel demodulation, and pre-coding information of the corresponding PDSCH/ePDCCH is contained during transmission of the DMRS. A CSI-RS is mainly configured to implement channel measurement to obtain and feed back CQI to enable a Node B side to implement a user schedule and implement adaptive allocation of a Modulation and Coding Scheme (MCS) by virtue of the CQI, and pre-coding information is not contained during transmission of the CSI-RS. CSI-RSs also includes a type of special CSI-RSs called Zero Power Channel State Information Reference Signals (ZP-CSI-RSs) and determined as zero power signals sent on resources for the ZP-CSI-RSs. A ZP-CSI-RS is mainly intended to ensure orthogonal CSI-RSs between cells and avoid interference between the CSI-RSs of the cells and a PDSCH. In addition, in an LTE Release (R11), a Channel State Information Interference Measurement (CSI-IM) signal is introduced, and is mainly configured to improve CQI interference measurement performance.

However, there is yet no effective solution for how to improve interference measurement performance under a PDCCH/ePDCCH/PDSCH demodulation condition.

SUMMARY

In view of the above, the embodiments of the disclosure provide an interference measurement method and system, related equipment and a storage medium, which may improve interference measurement accuracy under a target data channel demodulation condition and further improve receiving performance of a target data channel.

The technical solutions of the embodiments of the disclosure are implemented as follows.

An interference measurement method is provided, which includes:

a network side configures Interference Measurement Resources for Demodulation (DM-IMRs) for a target data channel of a terminal, positions of the DM-IMRs on a frequency domain being determined according to a PRB which bears the target data channel; and configuration information of the DM-IMRs is indicated to the terminal to enable the terminal to perform transmission interference measurement on the target data channel.

An interference measurement method is provided, which may include:

a terminal side receives configuration information of DM-IMRs, positions of the DM-IMRs on a frequency domain being determined according to a PRB which bears a target data channel; and the terminal side determines DM-IMRs corresponding to the target data channel according to the configuration information of the DM-IMRs, and measures interference during transmission of the target data channel through the DM-IMRs.

A network-side equipment is provided, which includes a configuration module and an indication module, wherein the configuration module is configured to configure DM-IMRs for a target data channel of a terminal, positions of the DM-IMRs on a frequency domain being determined according to a PRB which bears the target data channel; and the indication module is configured to indicate configuration information of the DM-IMRs to the terminal to enable the terminal to perform transmission interference measurement on the target data channel.

A terminal equipment is provided, which includes a receiving module and a measurement module, wherein the receiving module is configured to receive configuration information of DM-IMRs, positions of the DM-IMRs on a frequency domain being determined according to a PRB which bears a target data channel; and the measurement module is configured to determine DM-IMRs corresponding to the target data channel according to the configuration information of the DM-IMRs, and measure interference during transmission of the target data channel through the DM-IMRs.

A storage medium is provided, in which a computer program is stored, the computer program being configured to execute the abovementioned interference measurement methods.

According to the interference measurement method and system and related equipment provided by the embodiments of the disclosure, the network side configures the DM-IMRs for the target data channel of the terminal, the positions of the DM-IMRs on the frequency domain being determined according to the PRB allocated to the target data channel; and the network side indicates the configuration information of the DM-IMRs to the terminal to enable the terminal to perform transmission interference measurement on the target data channel. By adopting the solutions of the embodiments of the disclosure, accuracy in transmission interference measurement of the target data channel may be improved, so that improvement in demodulation/decoding performance of the target data channel at a receiving side is facilitated, and receiving performance of the target data channel may further be improved.

DETAILED DESCRIPTION

In order to make the purpose, technical solutions and advantages of the disclosure clearer, embodiments of the disclosure are described below with reference to the drawings in detail. It is important to note that the embodiments in the disclosure and characteristics in the embodiments can be freely combined under the condition of no conflicts.

Figure 1:
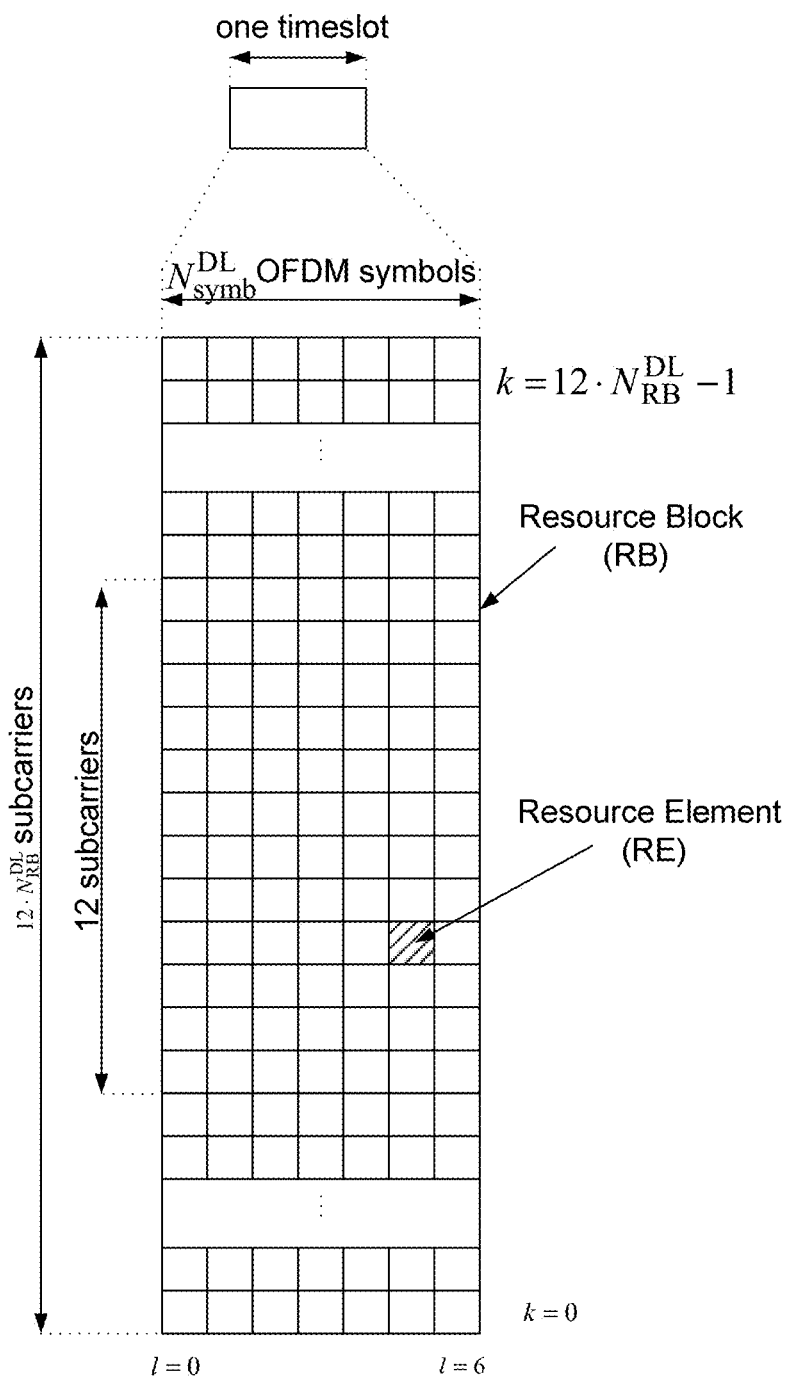
FIG. 1 is a diagram illustrating a PRB in an LTE system according to the related technology.
Figure 2:
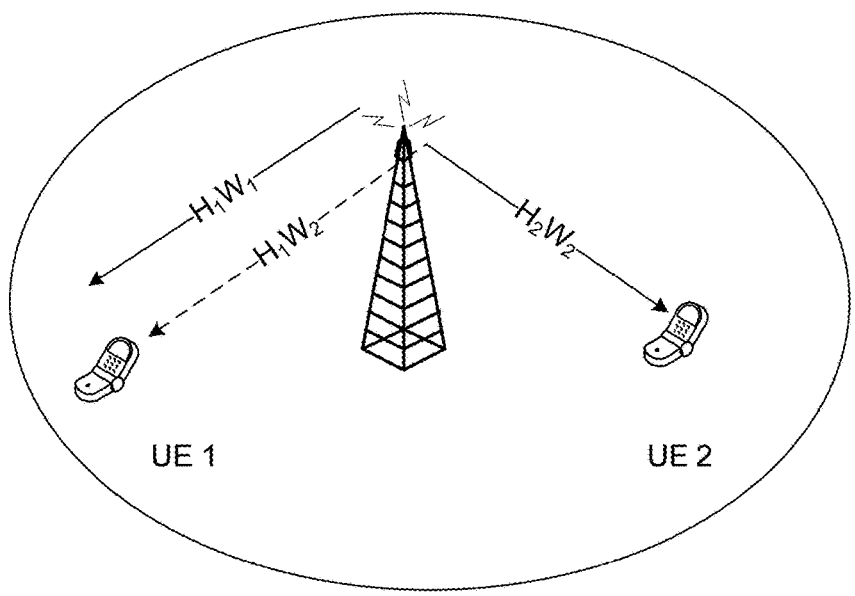
FIG. 2 is a diagram illustrating user interference in a cell according to the related technology.
Figure 3:
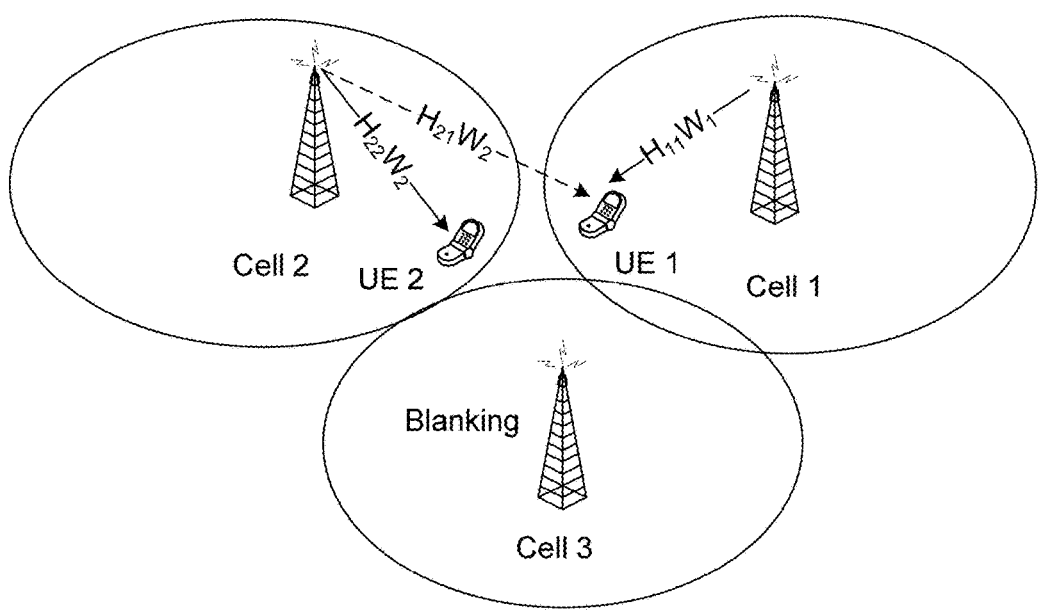
FIG. 3 is a diagram illustrating user interference between cells according to the related technology.
Figure 4:
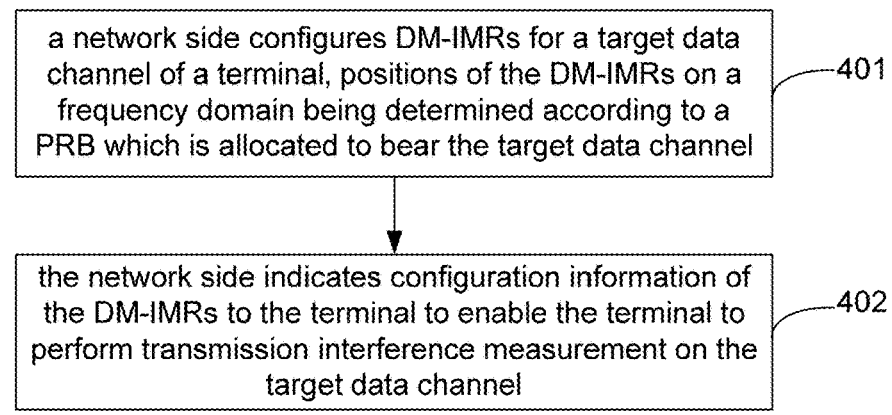
FIG. 4 is a flowchart showing an interference measurement method according to an embodiment of the disclosure.

FIG. 4 is a flowchart showing an interference measurement method according to an embodiment of the disclosure, and as shown in FIG. 4, the method includes the following steps.

Step 401: a network side configures DM-IMRs for a target data channel of a terminal, positions of the DM-IMRs on a frequency domain being determined according to a PRB which is allocated to bear the target data channel; and Step 402: the network side indicates configuration information of the DM-IMRs to the terminal to enable the terminal to perform transmission interference measurement on the target data channel.

Preferably, the positions of the DM-IMRs on the frequency domain only exist in the PRB which bears the target data channel.

Preferably, the DM-IMRs include one of the following resources:

RE resources configured as ZP-CSI-RSs;
RE resources configured as CSI-RSs; and
RE resources configured as CRSs.

Preferably, when the DM-IMRs are the RE resources configured as ZP-CSI-RSs, the DM-IMRs are one or more sets of RE resources configured as ZP-CSI-RS resources; or the DM-IMRs are a part of RE resources in one or more sets of RE resources configured as ZP-CSI-RS resources.

Preferably, when the DM-IMRs are the RE resources configured as CSI-RSs, the DM-IMRs are one or more sets of RE resources configured as single-antenna or double-antenna port CSI-RS resources; or the DM-IMRs are one or more sets of RE resources configured as four-antenna port CSI-RS resources; or the DM-IMRs are one or more sets of RE resources configured as eight-antenna port CSI-RS resources.

Preferably, when the DM-IMRs are the RE resources configurable as CRSs, the DM-IMRs are RE resources at a position where a serving cell CRS of the terminal is located; or the DM-IMRs are a part of RE resources at the position where the serving cell CRS of the terminal is located; or the DM-IMRs are RE resources at a position where an interference cell CRS of the terminal is located; or the DM-IMRs are a part of RE resources at the position where the interference cell CRS of the terminal is located.

Preferably, the RE resources configurable as ZP-CSI-RSs are RE resources which are supported by a communication system and may be configured as ZP-CSI-RSs or RE resources which are added on the basis of the RE resources which are supported by the communication system and may be configured as ZP-CSI-RSs and may be configured into ZP-CSI-RSs; and the RE resources configurable as CSI-RSs are RE resources which are supported by the communication system and may be configured as CSI-RSs or RE resources configurable as CSI-RSs which are added on the basis of the RE resources which are supported by the communication system and may be configured as CSI-RSs.

Preferably, the RE resources which may be configured into ZP-CSI-RSs are determined by CSI-RS configurations which may be configured into ZP-CSI-RS resources; or the RE resources which may be configured into ZP-CSI-RSs are determined by both the CSI-RS configurations which may be configured into ZP-CSI-RSs and CSI-RS sub-frame configurations which may be configured into ZP-CSI-RS resources.

Preferably, the RE resources which may be configured into CSI-RSs are determined by CSI-RS configurations which may be configured into CSI-RS resources; or the RE resources which may be configured into CSI-RSs are determined by both the CSI-RS configurations which may be configured into CSI-RS resources and CSI-RS sub-frame configurations which may be configured into CSI-RS resources.

Preferably, an attribute of the DM-IMRs is that: the network side sends zero power signals on the DM-IMRs, and the target data channel is mapped to the DM-IMRs in a rate matching manner.

Preferably, the DM-IMRs only exist in a sub-frame which bears the target data channel.

Preferably, the DM-IMRs are not configured in a sub-frame where a PMCH is located.

Preferably, the part of RE resources at the position where the CRS is located are located in an RE resource area of transmission of the target data channel.

Preferably, the configuration information of the DM-IMRs is indicated to the terminal in one of manners as follows:

one or more sets of DM-IMRs are configured and indicated through high-layer signalling; or, multiple sets of DM-IMRs are configured through high-layer signalling, and DM-IMRs configured for interference measurement of the current target data channel therein are indicated to the terminal through physical-layer signalling.

Preferably, a DM-IMR Information Element (IE) configuration item is set in the high-layer signalling, and the DM-IMR IE configuration item includes one or more of:

DM-IMR IDs, configured to distinguish different sets of DM-IMRs;

a DM-IMR configuration, configured to indicate RE resource positions of the DM-IMRs in each PRB resource where the target data channel is located; and a DM-IMR sub-frame configuration, configured to indicate a sub-frame where the DM-IMRs are located.

Preferably, the DM-IMR configuration includes at least one of:

a ZP-CSI-RS resource configuration supported by the communication system;

a ZP-CSI-RS resource configuration which is added on the basis of the ZP-CSI-RS resource configuration supported by the communication system;

the ZP-CSI-RS resource configuration supported by the communication system and position indication information of a part of RE resources under each ZP-CSI-RS resource configuration;

the ZP-CSI-RS resource configuration which is added on the basis of the ZP-CSI-RS resource configuration supported by the communication system and the position indication information of the part of RE resources under each ZP-CSI-RS resource configuration;

a single-antenna or double-antenna port CSI-RS resource configuration supported by the communication system;

a single-antenna or double-antenna port CSI-RS resource configuration which is added on the basis of the single-antenna or double-antenna port CSI-RS resource configuration supported by the communication system;

a four-antenna port CSI-RS resource configuration supported by the communication system;

a four-antenna port CSI-RS resource configuration which is added on the basis of the four-antenna port CSI-RS resource configuration supported by the communication system;

an eight-antenna port CSI-RS resource configuration supported by the communication system;

an eight-antenna port CSI-RS resource configuration which is added on the basis of the eight-antenna port CSI-RS resource configuration supported by the communication system;

position indication information of the RE resources at the position where the serving cell CRS of the terminal is located;

position indication information of the part of RE resources at the position where the serving cell CRS of the terminal is located;

position indication information of the RE resources at the position where the interference cell CRS of the terminal is located; and position indication information of the part of RE resources at the position where the interference cell CRS of the terminal is located.

Preferably, the DM-IMR sub-frame configuration includes at least one of:

a CSI-RS sub-frame configuration supported by the communication system;

a CSI-RS sub-frame configuration which is added on the basis of the CSI-RS sub-frame configuration supported by the communication system; and a sub-frame configuration which bears the target data channel.

Preferably, a representation manner for the DM-IMR configuration includes one of manners as follows:

the DM-IMR configuration is characterized by 16 or 16+X or X-bit high-layer signalling, and ZP-CSI-RS resources configured into DM-IMRs are indicated to the terminal in a bitmap manner (that is, which set or sets of ZP-CSI-RS resources are RE resources configured into DM-IMRs are indicated to the terminal in the bitmap manner), wherein X represents a ZP-CSI-RS resource configuration which is added on the basis of LTE R11, and X is a positive integer;

the DM-IMR configuration is characterized by 32 or 32+Y1 or Y1-bit high-layer signalling, and double-antenna port CSI-RS resources configured into DM-IMRs are indicated to the terminal in the bitmap manner (that is, which set or sets of double-antenna port CSI-RS resources are RE resources configured into DM-IMRs are indicated to the terminal in the bitmap manner), wherein Y1 represents a double-antenna port CSI-RS resource configuration which is added on the basis of LTE R11, and Y1 is a positive integer;

the DM-IMR configuration is characterized by 16 or 16+Y2 or Y2-bit high-layer signalling, and four-antenna port CSI-RS resources configured into DM-IMRs are indicated to the terminal in the bitmap manner (that is, which set or sets of four-antenna port CSI-RS resources are RE resources configured into DM-IMRs are indicated to the terminal in the bitmap manner), wherein Y2 represents a four-antenna port CSI-RS resource configuration which is added on the basis of LTE R11, and Y2 is a positive integer;

the DM-IMR configuration is characterized by 8 or 8+Y3 or Y3-bit high-layer signalling, and eight-antenna port CSI-RS resources configured into DM-IMRs are indicated to the terminal in the bitmap manner (that is, which set or sets of eight-antenna port CSI-RS resources are RE resources configured into DM-IMRs are indicated to the terminal in the bitmap manner), wherein Y3 represents an eight-antenna port CSI-RS resource configuration which is added on the basis of LTE R11, and Y3 is a positive integer;

the DM-IMR configuration is characterized by $|\log_2 16|$ or $|\log_2(16+X)|$ or $|\log_2 X|$-bit high-layer signalling, and the ZP-CSI-RS resources configured into DM-IMRs are indicated to the terminal (that is, which set of ZP-CSI-RS resources are RE resources configured into DM-IMRs are indicated to the terminal), wherein X represents the ZP-CSI-RS resource configuration which is added on the basis of LTE R11, and X is a positive integer;

the DM-IMR configuration is characterized by $|\log_2 32|$ or $|\log_2(32+Y1)|$ or $|\log_2 Y1|$-bit high-layer signalling, and the double-antenna port CSI-RS resources configured into DM-IMRs are indicated to the terminal (that is, which set of double-antenna port CSI-RS resources are RE resources configured into DM-IMRs are indicated to the terminal), wherein Y1 represents the double-antenna port CSI-RS resource configuration which is added on the basis of LTE R11, and Y1 is a positive integer;

the DM-IMR configuration is characterized by $|\log_2 16|$ or $|\log_2(16+Y2)|$ or $|\log_2 Y2|$-bit high-layer signalling, and the four-antenna port CSI-RS resources configured into DM-IMRs are indicated to the terminal (that is, which set of four-antenna port CSI-RS resources are RE resources configured into DM-IMRs are indicated to the terminal), wherein Y2 represents the four-antenna port CSI-RS resource configuration which is added on the basis of LTE R11, and Y2 is a positive integer;

the DM-IMR configuration is characterized by $|\log_2 8|$ or $|\log_2(8+Y3)|$ or $|\log_2 Y3|$-bit high-layer signalling, and the eight-antenna port CSI-RS resources configured into DM-IMRs are indicated to the terminal (that is, which set of eight-antenna port CSI-RS resources are RE resources configured into DM-IMRs are indicated to the terminal), wherein Y3 represents the eight-antenna port CSI-RS resource configuration which is added on the basis of LTE R11, and Y3 is a positive integer;

the DM-IMR configuration is characterized by 16 or 16+Q or 16+X+Q-bit high-layer signalling, and RE resources configured in the ZP-CSI-RS resources configured into DM-IMRs are indicated to the terminal in the bitmap manner (that is, which RE resources in which set or sets of ZP-CSI-RS resources are configured into DM-IMRs are indicated to the terminal in the bitmap manner), wherein X represents the ZP-CSI-RS resource configuration which is added on the basis of LTE R11, Q is configured to represent the RE resources configured into DM-IMRs of the terminal in each set of ZP-CSI-RS resources which may be configured into the DM-IMRs of the terminal, and both X and Q are positive integers;

the DM-IMR configuration is characterized by 24-bit high-layer signalling, and RE resources configured into the DM-IMRs of the terminal in the RE resources at the position where the CRS is located are indicated to the terminal in the bitmap manner (that is, which RE resources in the RE resources at the position where the CRS is located are configured into the DM-IMRs of the terminal are indicated);

Z sets of patterns of a part of CRS REs are pre-defined, the DM-IMR configuration is characterized by Z or $|\log_2 Z|$-bit high-layer signalling, and RE resources configured into the DM-IMRs of the terminal in the Z sets of patterns of the part of CRS REs are indicated to the terminal (that is, which set or sets of RE resources in the Z sets of patterns of the part of CRS REs are configured into the DM-IMRs of the terminal are indicated), wherein Z is an integer more than 1;

positions or corresponding shift values $V_{shift}$ or physical cell IDs of CRSs serving as DM-IMRs are indicated to the terminal through high-layer and/or physical-layer signalling; and the DM-IMR configuration is characterized by 24+V-bit high-layer signalling, and the positions of the CRSs and RE resources configured into the DM-IMRs of the terminal in resources at the positions of the CRSs are indicated to the terminal, wherein V is a positive integer.

Preferably, the operation that the multiple sets of DM-IMRs are configured through the high-layer signalling and the DM-IMRs configured for the interference measurement of the current target data channel therein are indicated to the terminal through physical-layer dynamic signalling includes:

the network side configures N sets of DM-IMRs to the terminal through high-layer signalling, and indicates DM-IMRs configured for the interference measurement of the current target data channel therein to the terminal through $|\log_2 N|$ or N-bit physical-layer dynamic signalling, wherein N is a positive integer more than 1.

The technical solution of the disclosure is applicable to multiple LTE systems in LTE R11 as well as LTE R10 and the like.

Figure 5:
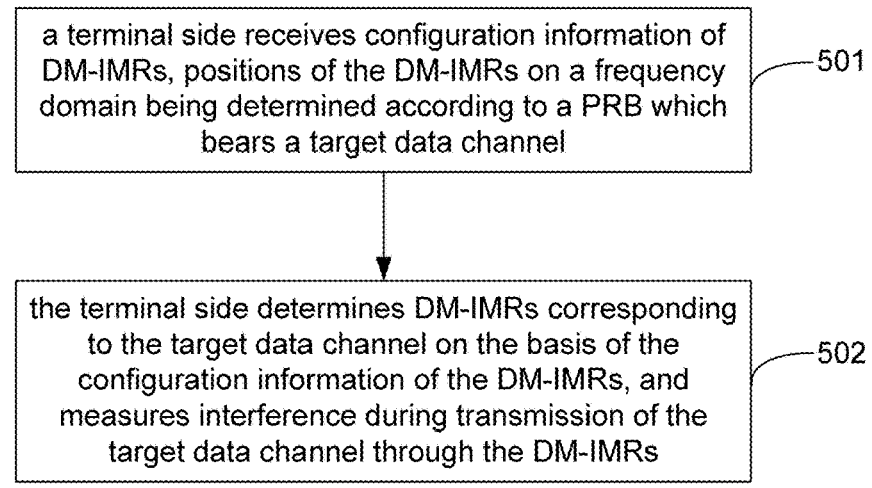
FIG. 5 is a flowchart showing an interference measurement method according to an embodiment of the disclosure.

The embodiment of the disclosure also correspondingly discloses an interference measurement method, and as shown in FIG. 5, the method includes:

Step 501: a terminal side receives configuration information of DM-IMRs, positions of the DM-IMRs on the frequency domain being determined according to a PRB which bears a target data channel; and Step 502: the terminal side determines DM-IMRs corresponding to the target data channel on the basis of the configuration information of the DM-IMRs, and measures interference during transmission of the target data channel through the DM-IMRs.

Preferably, the positions of the DM-IMRs on the frequency domain only exist in the PRB which bears the target data channel.

Preferably, the DM-IMRs include one of the following resources:
RE resources which may be configured into ZP-CSI-RSs;
RE resources which may be configured into CSI-RSs; and
RE resources which may be configured into CRSs.

Preferably, when the DM-IMRs are the RE resources which may be configured into ZP-CSI-RSs,
the DM-IMRs are one or more sets of RE resources which may be configured into ZP-CSI-RS resources; or
the DM-IMRs are a part of RE resources in one or more sets of RE resources which may be configured into ZP-CSI-RS resources.

Preferably, when the DM-IMRs are the RE resources which may be configured into CSI-RSs,
the DM-IMRs are one or more sets of RE resources which may be configured into single-antenna or double-antenna port CSI-RS resources; or
the DM-IMRs are one or more sets of RE resources which may be configured into four-antenna port CSI-RS resources; or
the DM-IMRs are one or more sets of RE resources which may be configured into eight-antenna port CSI-RS resources.

Preferably, when the DM-IMRs are the RE resources which may be configured into CRSs,
the DM-IMRs are RE resources at a position where a serving cell CRS of the terminal is located; or
the DM-IMRs are a part of RE resources at the position where the serving cell CRS of the terminal is located; or
the DM-IMRs are RE resources at a position where an interference cell CRS of the terminal is located; or
the DM-IMRs are a part of RE resources at the position where the interference cell CRS of the terminal is located.

Preferably, the RE resources which may be configured into ZP-CSI-RSs are RE resources which are supported by a communication system and may be configured into ZP-CSI-RSs or RE resources which are added on the basis of the RE resources which are supported by the communication system and may be configured into ZP-CSI-RSs and may be configured into ZP-CSI-RSs; and the RE resources which may be configured into CSI-RSs are RE resources which are supported by the communication system and may be configured into CSI-RSs or RE resources which are added on the basis of the RE resources which are supported by the communication system and may be configured into CSI-RSs and may be configured into CSI-RSs.

Preferably, the RE resources which may be configured into ZP-CSI-RSs are determined by CSI-RS configurations which may be configured into ZP-CSI-RS resources; and the RE resources which may be configured into CSI-RSs are determined by CSI-RS configurations which may be configured into CSI-RS resources.

Preferably, the RE resources which may be configured into ZP-CSI-RSs are determined by both the CSI-RS configurations which may be configured into ZP-CSI-RSs and CSI-RS sub-frame configurations which may be configured into ZP-CSI-RS resources; and the RE resources which may be configured into CSI-RSs are determined by both the CSI-RS configurations which may be configured into CSI-RS resources and CSI-RS sub-frame configurations which may be configured into CSI-RS resources.

Preferably, the terminal does not receive any signal on the DM-IMRs, and de-maps the target data channel on the DM-IMRs in a rate matching manner.

Preferably, the terminal determines as a default that the DM-IMRs only exist in a sub-frame which bears the target data channel.

Preferably, the terminal determines as a default that there are no DM-IMRs in a sub-frame where a PMCH is located.

Preferably, the terminal determines as a default that the part of RE resources at the position where the CRS is located are located in an RE resource area of transmission of the target data channel.

Preferably, the terminal receives the configuration information of the DM-IMRs in one of manners of:

determining one or more sets of DM-IMRs which are configured and indicated by receiving high-layer signalling; or, determining multiple sets of DM-IMRs which are configured by receiving high-layer signalling, and determining DM-IMRs configured for interference measurement of the current target data channel therein by receiving physical-layer signalling.

Preferably, the terminal determines the configured DM-IMRs by receiving a DM-IMR IE configuration item in the high-layer signalling, and the DM-IMR IE configuration item includes one or more of:

DM-IMR IDs, configured to distinguish different sets of DM-IMRs;

a DM-IMR configuration, configured to indicate RE resource positions of the DM-IMRs in each PRB resource where the target data channel is located; and a DM-IMR sub-frame configuration, configured to indicate a sub-frame where the DM-IMRs are located.

Preferably, the DM-IMR configuration includes at least one of:

a ZP-CSI-RS resource configuration supported by the communication system;

a ZP-CSI-RS resource configuration which is added on the basis of the ZP-CSI-RS resource configuration supported by the communication system;

the ZP-CSI-RS resource configuration supported by the communication system and position indication information of a part of RE resources under each ZP-CSI-RS resource configuration;

the ZP-CSI-RS resource configuration which is added on the basis of the ZP-CSI-RS resource configuration supported by the communication system and the position indication information of the part of RE resources under each ZP-CSI-RS resource configuration;

a single-antenna or double-antenna port CSI-RS resource configuration supported by the communication system;

a single-antenna or double-antenna port CSI-RS resource configuration which is added on the basis of the single-antenna or double-antenna port CSI-RS resource configuration supported by the communication system;

a four-antenna port CSI-RS resource configuration supported by the communication system;

a four-antenna port CSI-RS resource configuration which is added on the basis of the four-antenna port CSI-RS resource configuration supported by the communication system;

an eight-antenna port CSI-RS resource configuration supported by the communication system;

an eight-antenna port CSI-RS resource configuration which is added on the basis of the eight-antenna port CSI-RS resource configuration supported by the communication system;

position indication information of the RE resources at the position where the serving cell CRS of the terminal is located;

position indication information of the part of RE resources at the position where the serving cell CRS of the terminal is located;

position indication information of the RE resources at the position where the interference cell CRS of the terminal is located; and position indication information of the part of RE resources at the position where the interference cell CRS of the terminal is located.

Preferably, the DM-IMR sub-frame configuration includes at least one of:

a CSI-RS sub-frame configuration supported by the communication system;

a CSI-RS sub-frame configuration which is added on the basis of the CSI-RS sub-frame configuration supported by the communication system; and the sub-frame which bears the target data channel.

Preferably, a representation manner for the DM-IMR configuration includes one of manners as follows:

the DM-IMR configuration is characterized by 16 or 16+X or X-bit high-layer signalling, and ZP-CSI-RS resources configured into DM-IMRs are indicated to the terminal in a bitmap manner (that is, which set or sets of ZP-CSI-RS resources are RE resources configured into DM-IMRs are indicated), wherein X represents a ZP-CSI-RS resource configuration which is added on the basis of LTE R11, and X is a positive integer;

the DM-IMR configuration is characterized by 32 or 32+Y1 or Y1-bit high-layer signalling, and double-antenna port CSI-RS resources configured into DM-IMRs are indicated to the terminal in the bitmap manner (that is, which sets of double-antenna port CSI-RS resources are RE resources configured into DM-IMRs are indicated), wherein Y1 represents a double-antenna port CSI-RS resource configuration which is added on the basis of LTE R11, and Y1 is a positive integer;

the DM-IMR configuration is characterized by 16 or 16+Y2 or Y2-bit high-layer signalling, and four-antenna port CSI-RS resources configured into DM-IMRs are indicated to the terminal in the bitmap manner (that is, which sets of four-antenna port CSI-RS resources are RE resources configured into DM-IMRs are indicated), wherein Y2 represents a four-antenna port CSI-RS resource configuration which is added on the basis of LTE R11, and Y2 is a positive integer;

the DM-IMR configuration is characterized by 8 or 8+Y3 or Y3-bit high-layer signalling, and eight-antenna port CSI-RS resources configured into DM-IMRs are indicated to the terminal in the bitmap manner (that is, which sets of eight-antenna port CSI-RS resources are RE resources configured into DM-IMRs are indicated), wherein Y3 represents an eight-antenna port CSI-RS resource configuration which is added on the basis of LTE R11, and Y3 is a positive integer;

the DM-IMR configuration is characterized by $|\log_2 16|$ or $|\log_2(16+X)|$ or $|\log_2 X|$-bit high-layer signalling, and the ZP-CSI-RS resources configured into DM-IMRs are indicated to the terminal (that is, which set of ZP-CSI-RS resources are RE resources configured into DM-IMRs are indicated), wherein X represents the ZP-CSI-RS resource configuration which is added on the basis of LTE R11, and X is a positive integer;

the DM-IMR configuration is characterized by $|\log_2 32|$ or $|\log_2(32+Y1)|$ or $|\log_2 Y1|$-bit high-layer signalling, and the double-antenna port CSI-RS resources configured into DM-IMRs are indicated to the terminal (that is, which set of double-antenna port CSI-RS resources are RE resources configured into DM-IMRs are indicated), wherein Y1 represents the double-antenna port CSI-RS resource configuration which is added on the basis of LTE R11, and Y1 is a positive integer;

the DM-IMR configuration is characterized by $|\log_2 16|$ or $|\log_2(16+Y2)|$ or $|\log_2 Y2|$-bit high-layer signalling, and the four-antenna port CSI-RS resources configured into DM-IMRs are indicated to the terminal (that is, which set of four-antenna port CSI-RS resources are RE resources configured into DM-IMRs are indicated), wherein Y2 represents the four-antenna port CSI-RS resource configuration which is added on the basis of LTE R11, and Y2 is a positive integer;

the DM-IMR configuration is characterized by $|\log_2 8|$ or $|\log_2(8+Y3)|$ or $|\log_2 Y3|$-bit high-layer signalling, and the eight-antenna port CSI-RS resources configured into DM-IMRs are indicated to the terminal (that is, which set of eight-antenna port CSI-RS resources are RE resources configured into DM-IMRs are indicated), wherein Y3 represents the eight-antenna port CSI-RS resource configuration which is added on the basis of LTE R11, and Y3 is a positive integer;

the DM-IMR configuration is characterized by 16 or 16+Q or 16+X+Q-bit high-layer signalling, and RE resources in the ZP-CSI-RS resources configured into DM-IMRs are indicated to the terminal in the bitmap manner (that is, which RE resources in which sets of ZP-CSI-RS resources are configured into DM-IMRs are indicated), wherein X represents the ZP-CSI-RS resource configuration which is added on the basis of LTE R11, Q is configured to represent the RE resources configured into DM-IMRs of the terminal in each set of ZP-CSI-RS resources which may be configured into the DM-IMRs of the terminal, and both X and Q are positive integers;

the DM-IMR configuration is characterized by 24-bit high-layer signalling, and RE resources configured into the DM-IMRs of the terminal in the RE resources at the position where the CRS is located are indicated to the terminal in the bitmap manner (that is, which RE resources in the RE resources at the position where the CRS is located are configured into the DM-IMRs of the terminal are indicated);

Z sets of patterns of a part of CRS REs are pre-defined, the DM-IMR configuration is characterized by Z or $|\log_2 Z|$-bit high-layer signalling, and RE resources configured into the DM-IMRs of the terminal in the Z sets of patterns of the part of CRS REs are indicated to the terminal (that is, which set or sets of RE resources in the Z sets of patterns of the part of CRS REs are configured into the DM-IMRs of the terminal are indicated), wherein Z is an integer more than 1;

positions or corresponding shift values $V_{shift}$ or physical cell IDs of CRSs serving as DM-IMRs are indicated to the terminal through high-layer and/or physical-layer signalling; and the DM-IMR configuration is characterized by 24+V-bit high-layer signalling, and the positions of the CRSs and RE resources configured into the DM-IMRs of the terminal in resources at the positions of the CRSs are indicated to the terminal, wherein V is a positive integer.

Preferably, the terminal specifically determines N sets of available DM-IMRs by receiving the high-layer signalling, and determines resources configured for the interference measurement of the current target data channel by receiving $|\log_2 N|$ or N-bit physical-layer dynamic signalling, wherein N is a positive integer more than 1.

Figure 6:
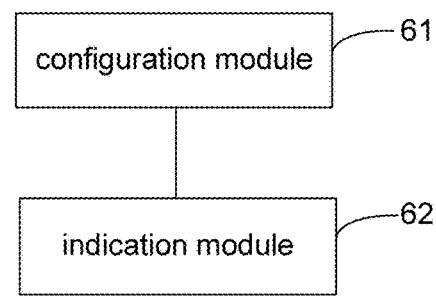
FIG. 6 is a structure diagram illustrating network-side equipment according to an embodiment of the disclosure.

The embodiment of the disclosure also correspondingly discloses network-side equipment, and as shown in FIG. 6, the network-side equipment includes: a configuration module 61 and an indication module 62, wherein the configuration module 61 is configured to configure DM-IMRs to a target data channel of a terminal, positions of the DM-IMRs on the frequency domain being determined according to a PRB which bears the target data channel; and the indication module 62 is configured to indicate configuration information of the DM-IMRs configured by the configuration module 61 to the terminal to enable the terminal to perform transmission interference measurement on the target data channel.

Preferably, the positions of the DM-IMRs on the frequency domain only exist in the PRB which bears the target data channel.

Preferably, the DM-IMRs include one of the following resources:

RE resources which may be configured into ZP-CSI-RSs;
RE resources which may be configured into CSI-RSs; and
RE resources which may be configured into CRSs.

Preferably, when the DM-IMRs are the RE resources which may be configured into ZP-CSI-RSs, the DM-IMRs are one or more sets of RE resources which may be configured into ZP-CSI-RS resources; or the DM-IMRs are a part of RE resources in one or more sets of RE resources which may be configured into ZP-CSI-RS resources.

Preferably, when the DM-IMRs are the RE resources which may be configured into CSI-RSs, the DM-IMRs are one or more sets of RE resources which may be configured into single-antenna or double-antenna port CSI-RS resources; or the DM-IMRs are one or more sets of RE resources which may be configured into four-antenna port CSI-RS resources; or the DM-IMRs are one or more sets of RE resources which may be configured into eight-antenna port CSI-RS resources.

Preferably, when the DM-IMRs are the RE resources which may be configured into CRSs, the DM-IMRs are RE resources at a position where a serving cell CRS of the terminal is located; or the DM-IMRs are a part of RE resources at the position where the serving cell CRS of the terminal is located; or the DM-IMRs are RE resources at a position where an interference cell CRS of the terminal is located; or the DM-IMRs are a part of RE resources at the position where the interference cell CRS of the terminal is located.

Preferably, the RE resources which may be configured into ZP-CSI-RSs are RE resources which are supported by a communication system and may be configured into ZP-CSI-RSs or RE resources which are added on the basis of the RE resources which are supported by the communication system and may be configured into ZP-CSI-RSs and may be configured into ZP-CSI-RSs; and the RE resources which may be configured into CSI-RSs are RE resources which are supported by the communication system and may be configured into CSI-RSs or RE resources which are added on the basis of the RE resources which are supported by the communication system and may be configured into CSI-RSs and may be configured into CSI-RSs.

Preferably, the RE resources which may be configured into ZP-CSI-RSs are determined by CSI-RS configurations which may be configured into ZP-CSI-RS resources; and the RE resources which may be configured into CSI-RSs are determined by CSI-RS configurations which may be configured into CSI-RS resources.

Preferably, the RE resources which may be configured into ZP-CSI-RSs are determined by both the CSI-RS configurations which may be configured into ZP-CSI-RSs and CSI-RS sub-frame configurations which may be configured into ZP-CSI-RS resources; and the RE resources which may be configured into CSI-RSs are determined by both the CSI-RS configurations which may be configured into CSI-RS resources and CSI-RS sub-frame configurations which may be configured into CSI-RS resources.

Preferably, an attribute of the DM-IMRs is that: a network side sends zero power signals on the DM-IMRs, and the target data channel is mapped to the DM-IMRs in a rate matching manner.

Preferably, configuration module is further configured to configure that the DM-IMRs only exist in a sub-frame which bears the target data channel.

Preferably, the configuration module is further configured not to configure the DM-IMRs in a sub-frame where a PMCH is located.

Preferably, the part of RE resources at the position where the CRS is located are located in an RE resource area of transmission of the target data channel.

Preferably, the indication module indicates the configuration information of the DM-IMRs configured to the target data channel of the terminal to the terminal in one of manners of:

configuring and indicating one or more sets of DM-IMRs through high-layer signalling; or, configuring multiple sets of DM-IMRs through high-layer signalling, and indicating DM-IMRs configured for interference measurement of the current target data channel therein to the terminal through physical-layer signalling.

Preferably, a DM-IMR IE configuration item is set in the high-layer signalling, and the DM-IMR IE configuration item includes one or more of:

DM-IMR IDs, configured to distinguish different sets of DM-IMRs;

a DM-IMR configuration, configured to indicate RE resource positions of the DM-IMRs in each PRB resource where the target data channel is located; and a DM-IMR sub-frame configuration, configured to indicate a sub-frame where the DM-IMRs are located.

Preferably, the DM-IMR configuration includes at least one of:

a ZP-CSI-RS resource configuration supported by the communication system;

a ZP-CSI-RS resource configuration which is added on the basis of the ZP-CSI-RS resource configuration supported by the communication system;

the ZP-CSI-RS resource configuration supported by the communication system and position indication information of a part of RE resources under each ZP-CSI-RS resource configuration;

the ZP-CSI-RS resource configuration which is added on the basis of the ZP-CSI-RS resource configuration supported by the communication system and the position indication information of the part of RE resources under each ZP-CSI-RS resource configuration;

a single-antenna or double-antenna port CSI-RS resource configuration supported by the communication system;

a single-antenna or double-antenna port CSI-RS resource configuration which is added on the basis of the single-antenna or double-antenna port CSI-RS resource configuration supported by the communication system;

a four-antenna port CSI-RS resource configuration supported by the communication system;

a four-antenna port CSI-RS resource configuration which is added on the basis of the four-antenna port CSI-RS resource configuration supported by the communication system;

an eight-antenna port CSI-RS resource configuration supported by the communication system;

an eight-antenna port CSI-RS resource configuration which is added on the basis of the eight-antenna port CSI-RS resource configuration supported by the communication system;

position indication information of the RE resources at the position where the serving cell CRS of the terminal is located;

position indication information of the part of RE resources at the position where the serving cell CRS of the terminal is located;

position indication information of the RE resources at the position where the interference cell CRS of the terminal is located; and position indication information of the part of RE resources at the position where the interference cell CRS of the terminal is located.

Preferably, the DM-IMR sub-frame configuration includes at least one of:

a CSI-RS sub-frame configuration supported by the communication system;

a CSI-RS sub-frame configuration which is added on the basis of the CSI-RS sub-frame configuration supported by the communication system; and a sub-frame configuration which bears the target data channel.

Preferably, a representation manner for the DM-IMR configuration includes one of manners as follows:

the DM-IMR configuration is characterized by 16 or 16+X or X-bit high-layer signalling, and ZP-CSI-RS resources configured into DM-IMRs are indicated to the terminal in a bitmap manner (that is, which sets of ZP-CSI-RS resources are RE resources configured into DM-IMRs are indicated), wherein X represents a ZP-CSI-RS resource configuration which is added on the basis of LTE R11, and X is a positive integer;

the DM-IMR configuration is characterized by 32 or 32+Y1 or Y1-bit high-layer signalling, and double-antenna port CSI-RS resources configured into DM-IMRs are indicated to the terminal in the bitmap manner (that is, which sets of double-antenna port CSI-RS resources are RE resources configured into DM-IMRs are indicated), wherein Y1 represents a double-antenna port CSI-RS resource configuration which is added on the basis of LTE R11, and Y1 is a positive integer;

the DM-IMR configuration is characterized by 16 or 16+Y2 or Y2-bit high-layer signalling, and four-antenna port CSI-RS resources configured into DM-IMRs are indicated to the terminal in the bitmap manner (that is, which sets of four-antenna port CSI-RS resources are RE resources configured into DM-IMRs are indicated), wherein Y2 represents a four-antenna port CSI-RS resource configuration which is added on the basis of LTE R11, and Y2 is a positive integer;

the DM-IMR configuration is characterized by 8 or 8+Y3 or Y3-bit high-layer signalling, and eight-antenna port CSI-RS resources configured into DM-IMRs are indicated to the terminal in the bitmap manner (that is, which sets of eight-antenna port CSI-RS resources are RE resources configured into DM-IMRs are indicated), wherein Y3 represents an eight-antenna port CSI-RS resource configuration which is added on the basis of LTE R11, and Y3 is a positive integer;

the DM-IMR configuration is characterized by $|\log_2 16|$ or $|\log_2(16+X)|$ or $|\log_2 X|$-bit high-layer signalling, and the ZP-CSI-RS resources configured into DM-IMRs are indicated to the terminal (that is, which set of ZP-CSI-RS resources are RE resources configured into DM-IMRs are indicated), wherein X represents the ZP-CSI-RS resource configuration which is added on the basis of LTE R11, and X is a positive integer;

the DM-IMR configuration is characterized by $|\log_2 32|$ or $|\log_2(32+Y1)|$ or $|\log_2 Y1|$-bit high-layer signalling, and the double-antenna port CSI-RS resources configured into DM-IMRs are indicated to the terminal (that is, which set of double-antenna port CSI-RS resources are RE resources configured into DM-IMRs are indicated), wherein Y1 represents the double-antenna port CSI-RS resource configuration which is added on the basis of LTE R11, and Y1 is a positive integer;

the DM-IMR configuration is characterized by $|\log_2 16|$ or $|\log_2(16+Y2)|$ or $|\log_2 Y2|$-bit high-layer signalling, and the four-antenna port CSI-RS resources configured into DM-IMRs are indicated to the terminal (that is, which set of four-antenna port CSI-RS resources are RE resources configured into DM-IMRs are indicated), wherein Y2 represents the four-antenna port CSI-RS resource configuration which is added on the basis of LTE R11, and Y2 is a positive integer;

the DM-IMR configuration is characterized by $|\log_2 8|$ or $|\log_2(8+Y3)|$ or $|\log_2 Y3|$-bit high-layer signalling, and the eight-antenna port CSI-RS resources configured into DM-IMRs are indicated to the terminal (that is, which set of eight-antenna port CSI-RS resources are RE resources configured into DM-IMRs are indicated), wherein Y3 represents the eight-antenna port CSI-RS resource configuration which is added on the basis of LTE R11, and Y3 is a positive integer;

the DM-IMR configuration is characterized by 16 or 16+Q or 16+X+Q-bit high-layer signalling, and RE resources in the ZP-CSI-RS resources configured into DM-IMRs are indicated to the terminal in the bitmap manner (that is, which RE resources in which sets of ZP-CSI-RS resources are configured into DM-IMRs are indicated), wherein X represents the ZP-CSI-RS resource configuration which is added on the basis of LTE R11, Q is configured to represent the RE resources configured into DM-IMRs of the terminal in each set of ZP-CSI-RS resources which may be configured into the DM-IMRs of the terminal, and both X and Q are positive integers;

the DM-IMR configuration is characterized by 24-bit high-layer signalling, and RE resources configured into the DM-IMRs of the terminal in the RE resources at the position where the CRS is located are indicated to the terminal in the bitmap manner (that is, which RE resources in the RE resources at the position where the CRS is located are configured into the DM-IMRs of the terminal are indicated);

Z sets of patterns of a part of CRS REs are pre-defined, the DM-IMR configuration is characterized by Z or $|\log_2 Z|$-bit high-layer signalling, and RE resources configured into the DM-IMRs of the terminal in the Z sets of patterns of the part of CRS REs are indicated to the terminal (that is, which set or sets of RE resources in the Z sets of patterns of the part of CRS REs are configured into the DM-IMRs of the terminal are indicated), wherein Z is an integer more than 1;

positions or corresponding shift values $V_{shift}$ or physical cell IDs of CRSs serving as DM-IMRs are indicated to the terminal through high-layer and/or physical-layer signalling; and the DM-IMR configuration is characterized by 24+V-bit high-layer signalling, and the positions of the CRSs and RE resources configured into the DM-IMRs of the terminal in resources at the positions of the CRSs are indicated to the terminal, wherein V is a positive integer.

Preferably, the indication module 62 is further configured to configure N sets of DM-IMRs to the terminal through high-layer signalling, and indicate DM-IMRs configured for the interference measurement of the current target data channel therein to the terminal through $|\log_2 N|$ or N-bit physical-layer dynamic signalling, wherein N is a positive integer more than 1.

Figure 7:
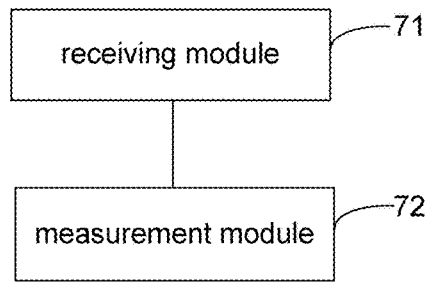
FIG. 7 is a structure diagram illustrating terminal equipment according to an embodiment of the disclosure.

The embodiment of the disclosure also correspondingly discloses terminal equipment, and as shown in FIG. 7, the terminal equipment includes: a receiving module 71 and a measurement module 72, wherein the receiving module 71 is configured to receive configuration information of DM-IMRs, positions of the DM-IMRs on the frequency domain being determined according to a PRB which bears a target data channel; and the measurement module 72 is configured to determine DM-IMRs corresponding to the target data channel according to the configuration information of the DM-IMRs, and measure interference during transmission of the target data channel through the DM-IMRs.

Preferably, the positions of the DM-IMRs on the frequency domain only exist in the PRB which bears the target data channel.

Preferably, the DM-IMRs include one of the following resources:

RE resources which may be configured into ZP-CSI-RSs;
RE resources which may be configured into CSI-RSs; and
RE resources which may be configured into CRSs.

Preferably, when the DM-IMRs are the RE resources which may be configured into ZP-CSI-RSs, the DM-IMRs are one or more sets of RE resources which may be configured into ZP-CSI-RS resources; or the DM-IMRs are a part of RE resources in one or more sets of RE resources which may be configured into ZP-CSI-RS resources.

Preferably, when the DM-IMRs are the RE resources which may be configured into CSI-RSs, the DM-IMRs are one or more sets of RE resources which may be configured into single-antenna or double-antenna port CSI-RS resources; or the DM-IMRs are one or more sets of RE resources which may be configured into four-antenna port CSI-RS resources; or the DM-IMRs are one or more sets of RE resources which may be configured into eight-antenna port CSI-RS resources.

Preferably, when the DM-IMRs are the RE resources which may be configured into CRSs, the DM-IMRs are RE resources at a position where a serving cell CRS of the terminal is located; or the DM-IMRs are a part of RE resources at the position where the serving cell CRS of the terminal is located; or the DM-IMRs are RE resources at a position where an interference cell CRS of the terminal is located; or the DM-IMRs are a part of RE resources at the position where the interference cell CRS of the terminal is located.

Preferably, the RE resources which may be configured into ZP-CSI-RSs are RE resources which are supported by a communication system and may be configured into ZP-CSI-RSs or RE resources which are added on the basis of the RE resources which are supported by the communication system and may be configured into ZP-CSI-RSs and may be configured into ZP-CSI-RSs; and the RE resources which may be configured into CSI-RSs are RE resources which are supported by the communication system and may be configured into CSI-RSs or RE resources which are added on the basis of the RE resources which are supported by the communication system and may be configured into CSI-RSs and may be configured into CSI-RSs.

Preferably, the RE resources which may be configured into ZP-CSI-RSs are determined by CSI-RS configurations which may be configured into ZP-CSI-RS resources; and the RE resources which may be configured into CSI-RSs are determined by CSI-RS configurations which may be configured into CSI-RS resources.

Preferably, the RE resources which may be configured into ZP-CSI-RSs are determined by both the CSI-RS configurations which may be configured into ZP-CSI-RSs and CSI-RS sub-frame configurations which may be configured into ZP-CSI-RS resources; and the RE resources which may be configured into CSI-RSs are determined by both the CSI-RS configurations which may be configured into CSI-RS resources and CSI-RS sub-frame configurations which may be configured into CSI-RS resources.

Preferably, the receiving module is further configured to not receive any signal on the DM-IMRs, and de-map the target data channel on the DM-IMRs in a rate matching manner.

Preferably, the receiving module is further configured to determine as a default that the DM-IMRs only exist in a sub-frame which bears the target data channel.

Preferably, the receiving module is further configured to determine as a default that there are no DM-IMRs in a sub-frame where a PMCH is located.

Preferably, the receiving module is further configured to determine as a default that the part of RE resources at the position where the CRS is located are located in an RE resource area of transmission of the target data channel.

Preferably, the receiving module is further configured to receive the configuration information of the DM-IMRs in one of manners of:

determining one or more sets of DM-IMRs which are configured and indicated by receiving high-layer signalling; or, determining multiple sets of DM-IMRs which are configured by receiving high-layer signalling, and determining DM-IMRs configured for interference measurement of the current target data channel therein by receiving physical-layer signalling.

Preferably, the receiving module is further configured to determine the configured DM-IMRs by receiving a DM-IMR IE configuration item in the high-layer signalling, and the DM-IMR IE configuration item includes one or more of:

DM-IMR IDs, configured to distinguish different sets of DM-IMRs;

a DM-IMR configuration, configured to indicate RE resource positions of the DM-IMRs in each PRB resource where the target data channel is located; and a DM-IMR sub-frame configuration, configured to indicate a sub-frame where the DM-IMRs are located.

Preferably, the DM-IMR configuration includes at least one of:

a ZP-CSI-RS resource configuration supported by the communication system;

a ZP-CSI-RS resource configuration which is added on the basis of the ZP-CSI-RS resource configuration supported by the communication system;

the ZP-CSI-RS resource configuration supported by the communication system and position indication information of a part of RE resources under each ZP-CSI-RS resource configuration;

the ZP-CSI-RS resource configuration which is added on the basis of the ZP-CSI-RS resource configuration supported by the communication system and the position indication information of the part of RE resources under each ZP-CSI-RS resource configuration;

a single-antenna or double-antenna port CSI-RS resource configuration supported by the communication system;

a single-antenna or double-antenna port CSI-RS resource configuration which is added on the basis of the single-antenna or double-antenna port CSI-RS resource configuration supported by the communication system;

a four-antenna port CSI-RS resource configuration supported by the communication system;

a four-antenna port CSI-RS resource configuration which is added on the basis of the four-antenna port CSI-RS resource configuration supported by the communication system;

an eight-antenna port CSI-RS resource configuration supported by the communication system;

an eight-antenna port CSI-RS resource configuration which is added on the basis of the eight-antenna port CSI-RS resource configuration supported by the communication system;

position indication information of the RE resources at the position where the serving cell CRS of the terminal is located;

position indication information of the part of RE resources at the position where the serving cell CRS of the terminal is located;

position indication information of the RE resources at the position where the interference cell CRS of the terminal is located; and position indication information of the part of RE resources at the position where the interference cell CRS of the terminal is located.

Preferably, the DM-IMR sub-frame configuration includes at least one of:

a CSI-RS sub-frame configuration supported by the communication system;

a CSI-RS sub-frame configuration which is added on the basis of the CSI-RS sub-frame configuration supported by the communication system; and the sub-frame which bears the target data channel.

Preferably, a representation manner for the DM-IMR configuration includes one of manners as follows:

the DM-IMR configuration is characterized by 16 or 16+X or X-bit high-layer signalling, and ZP-CSI-RS resources configured into DM-IMRs are indicated to the terminal in a bitmap manner (that is, which sets of ZP-CSI-RS resources are RE resources configured into DM-IMRs are indicated), wherein X represents a ZP-CSI-RS resource configuration which is added on the basis of LTE R11, and X is a positive integer;

the DM-IMR configuration is characterized by 32 or 32+Y1 or Y1-bit high-layer signalling, and double-antenna port CSI-RS resources configured into DM-IMRs are indicated to the terminal in the bitmap manner (that is, which sets of double-antenna port CSI-RS resources are RE resources configured into DM-IMRs are indicated), wherein Y1 represents a double-antenna port CSI-RS resource configuration which is added on the basis of LTE R11, and Y1 is a positive integer;

the DM-IMR configuration is characterized by 16 or 16+Y2 or Y2-bit high-layer signalling, and four-antenna port CSI-RS resources configured into DM-IMRs are indicated to the terminal in the bitmap manner (that is, which sets of four-antenna port CSI-RS resources are RE resources configured into DM-IMRs are indicated), wherein Y2 represents a four-antenna port CSI-RS resource configuration which is added on the basis of LTE R11, and Y2 is a positive integer;

the DM-IMR configuration is characterized by 8 or 8+Y3 or Y3-bit high-layer signalling, and eight-antenna port CSI-RS resources configured into DM-IMRs are indicated to the terminal in the bitmap manner (that is, which sets of eight-antenna port CSI-RS resources are RE resources configured into DM-IMRs are indicated), wherein Y3 represents an eight-antenna port CSI-RS resource configuration which is added on the basis of LTE R11, and Y3 is a positive integer;

the DM-IMR configuration is characterized by $|\log_2 16|$ or $|\log_2(16+X)|$ or $|\log_2 X|$-bit high-layer signalling, and the ZP-CSI-RS resources configured into DM-IMRs are indicated to the terminal (that is, which set of ZP-CSI-RS resources are RE resources configured into DM-IMRs are indicated), wherein X represents the ZP-CSI-RS resource configuration which is added on the basis of LTE R11, and X is a positive integer;

the DM-IMR configuration is characterized by $|\log_2 32|$ or $|\log_2(32+Y1)|$ or $|\log_2 Y1|$-bit high-layer signalling, and the double-antenna port CSI-RS resources configured into DM-IMRs are indicated to the terminal (that is, which set of double-antenna port CSI-RS resources are RE resources configured into DM-IMRs are indicated), wherein Y1 represents the double-antenna port CSI-RS resource configuration which is added on the basis of LTE R11, and Y1 is a positive integer;

the DM-IMR configuration is characterized by $|\log_2 16|$ or $|\log_2(16+Y2)|$ or $|\log_2 Y2|$-bit high-layer signalling, and the four-antenna port CSI-RS resources configured into DM-IMRs are indicated to the terminal (that is, which set of four-antenna port CSI-RS resources are RE resources configured into DM-IMRs are indicated), wherein Y2 represents the four-antenna port CSI-RS resource configuration which is added on the basis of LTE R11, and Y2 is a positive integer;

the DM-IMR configuration is characterized by $|\log_2 8|$ or $|\log_2(8+Y3)|$ or $|\log_2 Y3|$-bit high-layer signalling, and the eight-antenna port CSI-RS resources configured into DM-IMRs are indicated to the terminal (that is, which set of eight-antenna port CSI-RS resources are RE resources configured into DM-IMRs are indicated), wherein Y3 represents the eight-antenna port CSI-RS resource configuration which is added on the basis of LTE R11, and Y3 is a positive integer;

the DM-IMR configuration is characterized by 16 or 16+Q or 16+X+Q-bit high-layer signalling, and RE resources in the ZP-CSI-RS resources configured into DM-IMRs are indicated to the terminal in the bitmap manner (that is, which RE resources in which sets of ZP-CSI-RS resources are configured into DM-IMRs are indicated), wherein X represents the ZP-CSI-RS resource configuration which is added on the basis of LTE R11, Q is configured to represent the RE resources configured into DM-IMRs of the terminal in each set of ZP-CSI-RS resources which may be configured into the DM-IMRs of the terminal, and both X and Q are positive integers;

the DM-IMR configuration is characterized by 24-bit high-layer signalling, and RE resources configured into the DM-IMRs of the terminal in the RE resources at the position where the CRS is located are indicated to the terminal in the bitmap manner (that is, which RE resources in the RE resources at the position where the CRS is located are configured into the DM-IMRs of the terminal are indicated);

Z sets of patterns of a part of CRS REs are pre-defined, the DM-IMR configuration is characterized by Z or $|\log_2 Z|$-bit high-layer signalling, and RE resources configured into the DM-IMRs of the terminal in the Z sets of patterns of the part of CRS REs are indicated to the terminal (that is, which set or sets of RE resources in the Z sets of patterns of the part of CRS REs are configured into the DM-IMRs of the terminal are indicated), wherein Z is an integer more than 1;

positions or corresponding shift values $V_{shift}$ or physical cell IDs of CRSs serving as DM-IMRs are indicated to the terminal through high-layer and/or physical-layer signalling; and the DM-IMR configuration is characterized by 24+V-bit high-layer signalling, and the positions of the CRSs and RE resources configured into the DM-IMRs of the terminal in resources at the positions of the CRSs are indicated to the terminal, wherein V is a positive integer.

Preferably, the measurement module 72 further determines N sets of available DM-IMRs by receiving the high-layer signalling, and determines resources configured for the interference measurement of the current target data channel by receiving $|\log_2 N|$ or N-bit physical-layer dynamic signalling, wherein N is a positive integer more than 1.

The embodiment of the disclosure also correspondingly discloses an interference measurement system, which includes the abovementioned network-side equipment and the above-mentioned terminal equipment.

The disclosure will be further described below with specific embodiments in detail.

Embodiment 1

The embodiment provides an interference measurement method, which mainly includes:

a network side configures DM-IMRs for a target data channel of a terminal, and indicates configuration information of the DM-IMRs to the terminal; and the terminal receives the configuration information of the DM-IMRs, determines DM-IMRs corresponding to its target data channel, and measures interference during transmission of the target data channel through the DM-IMRs.

Herein, positions of the DM-IMRs on the frequency domain are determined according to a PRB which bears the target data channel. Preferably, the DM-IMRs are only allowed to exist in a PRB resource where the target data channel of the terminal is located, that is, a PRB resource where the DM-IMRs of the target terminal is located is the same as the PRB resource where the target data channel is located. The target data channel mentioned here is a channel that the terminal is required to receive currently and the target data channel includes at least one of a PDSCH, an ePDCCH and a PDCCH.

Specifically, the embodiment includes the following steps.

Step 1: the network side configures the DM-IMRs for the terminal, wherein the DM-IMRs may be at least one of the following resources.

(1) One or more sets of RE resources configurable as ZP-CSI-RS resources.

Distribution of resources configurable as ZP-CSI-RSs which are supported in LTE Release 11 is shown in FIGS. 8 and 9.

FIG. 8(*a*) and FIG. 8(*b*) show ZP-CSI-RS resource configuration supported in LTE R11 under a normal CP condition (totally 16 sets, wherein indexes of each set of ZP-CSI-RS resources are supposed to be 0~15), which may be configured for demodulation interference measurement under the normal CP condition. CSI-RS configurations (as shown in Table 2, wherein Table 2 comes from Table 6.10.5.2-1 in an LTE standard protocol TS36.211-b20) corresponding to the 16 sets of ZP-CSI-RS resources are 0~9 and 20~25.

FIG. 9(*a*) and FIG. 9(*b*) show ZP-CSI-RS resource configuration supported in LTE R11 under an extended CP condition (totally 14 sets, wherein indexes of each set of ZP-CSI-RS resources are supposed to be 0~13), which may be configured for demodulation interference measurement under the extended CP condition. CSI-RS configurations (as shown in Table 3, wherein Table 3 comes from Table 6.10.5.2-3 in the LTE protocol TS36.211-b20) corresponding to the 14 sets of ZP-CSI-RS resources are 0~7 and 16~21.

Figure 15A:
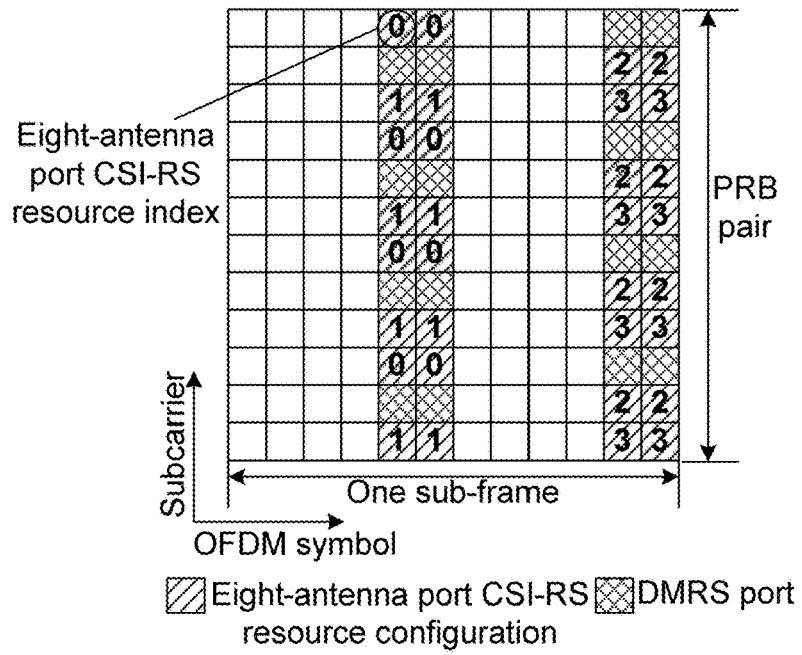
FIG. 15(a) and FIG. 15(b) are diagrams illustrating eight-antenna port CSI-RS resource configuration under an extended CP condition according to the related technology.
Figure 15B:
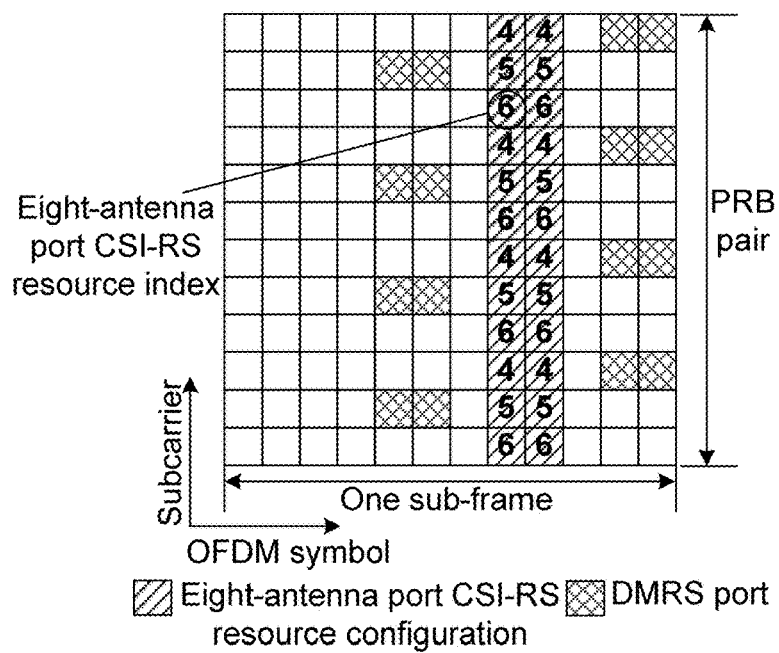

(k', l') in Table 2 and Table 3 is a parameter related to a position of a CSI-RS resource or a ZP-CSI-RS resource, and how to determine the position of the ZP-CSI-RS resource (as shown in FIGS. 8 and 9) or the position of the CSI-RS resource (as shown in FIGS. 10 and 15) by (k', l') may specifically refer to a related recitation in section 6.10.5.2 in the LTE standard protocol TS36.211-b20, and will not be repeated here. ZP-CIS-RS resource position (k', l') sets in Table 2 and Table 3 correspond to a four-antenna CSI-RS resource position (k', l') set, and both of them are notified to the terminal by adopting different signalling in an existing technology.

In addition, the ZP-CSI-RS resources serving as the DM-IMRs may also be ZP-CSI-RS resources added on the basis of ZP-CSI-RS resources supported by the network side in LTE R11.

A relationship between the CSI-RS configuration and CSI-RS resources or ZP-CSI-RS resources under the normal CP condition is shown in Table 2.

TABLE 2

| | | Number of CSI-RS antenna ports | | | | | |
|---|---|---|---|---|---|---|---|
| | CSI-RS | 1 or 2 | | 4 | | 8 | |
| | configuration | (k', l') | $n_s$ mod 2 | (k', l') | $n_s$ mod 2 | (k', l') | $n_s$ mod 2 |
| Frame structure types 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

A mapping relationship between the CSI-RS configuration and the CSI-RS resources or the ZP-CSI-RS resources under the extended CP condition is shown in Table 3.

TABLE 3

| | CSI-RS configuration | Number of CSI-RS reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure types 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

(2) A part of RE resources in one or more sets of RE resources configurable as ZP-CSI-RS resources.

There is only one or more fixed RE resources for demodulation interference measurement in each set of ZP-CSI-RS resources configured for DM-IMRs, and the other RE resources may keep serving as ZP-CSI-RSs or DM-IMRs for other users. For example, the first two REs in each set of ZP-CSI-RS resources (totally 4 REs) for DM-IMRs are configured for interference measurement during transmission of a target data channel of user 1, while the latter two REs in each set of ZP-CSI-RS resources (totally 4 REs) for DM-IMRs are configured for the interference measurement during the transmission of the target data channel of user 1. The network side may also configure the first two REs and latter two REs in each set of ZP-CSI-RS resources (totally 4 REs) configured for DM-IMRs for the interference measurement during the transmission of the target data channel of the same user.

Figure 10A:
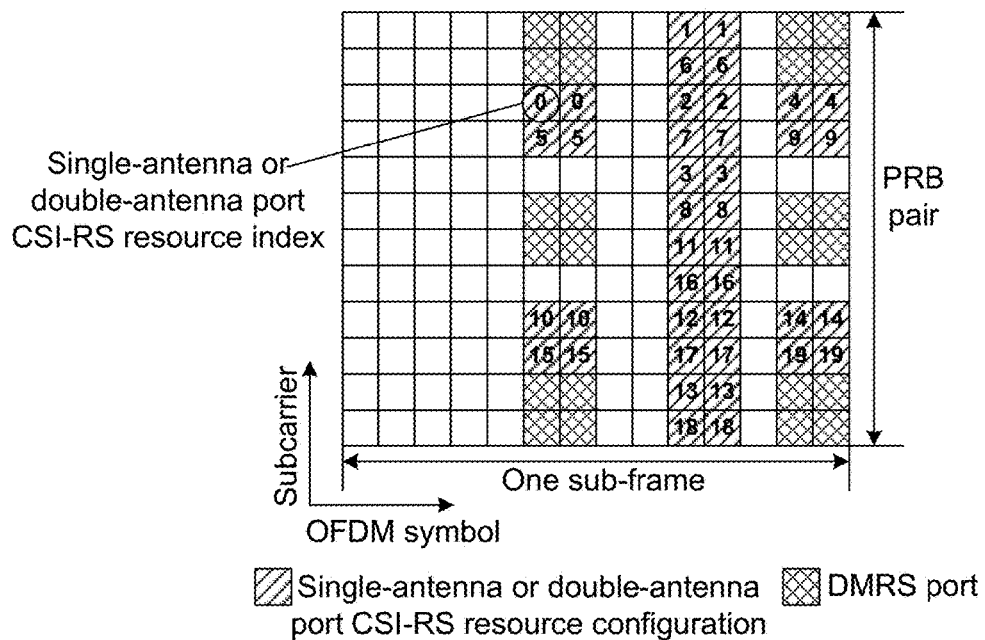
FIG. 10(a) and FIG. 10(b) are diagrams illustrating single-antenna or double-antenna port CSI-RS resource configuration under a normal CP condition according to the related technology.
Figure 10B:
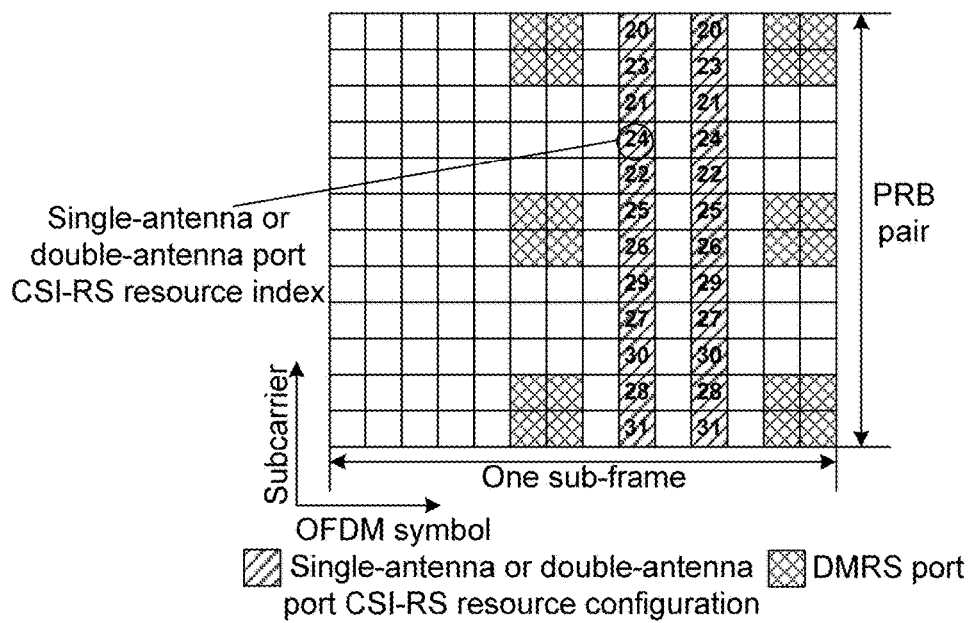
Figure 11A:
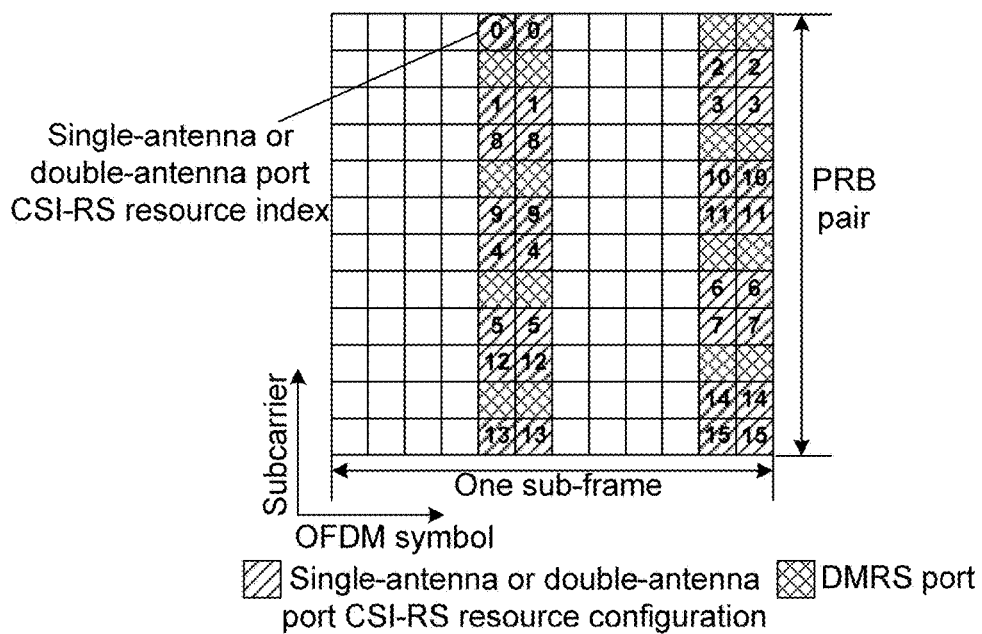
FIG. 11(a) and FIG. 11(b) are diagrams illustrating single-antenna or double-antenna port CSI-RS resource configuration under an extended CP condition according to the related technology.
Figure 11B:
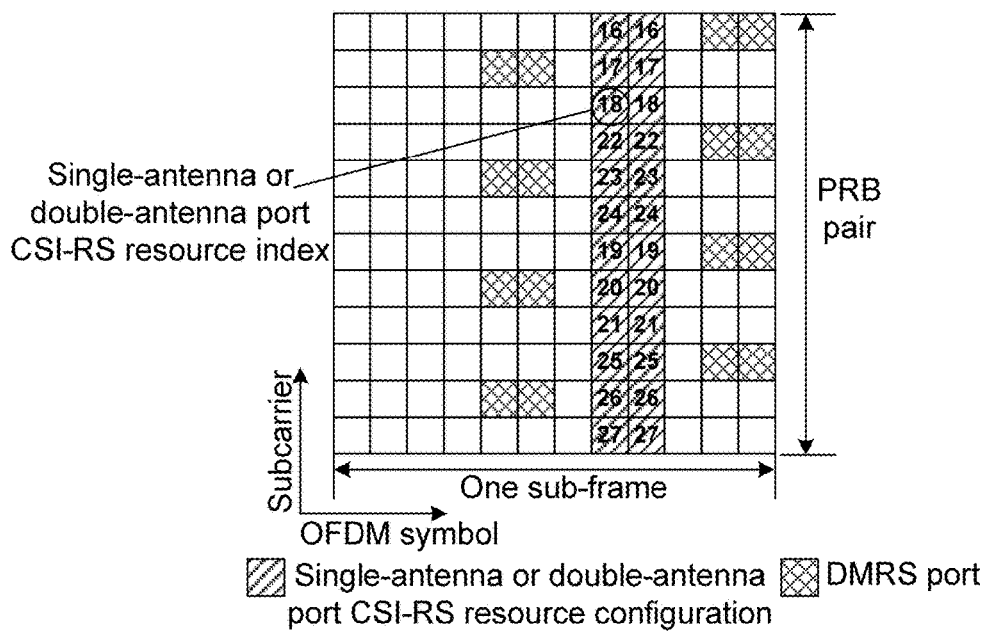

(3) One or more sets of RE resources configurable as single-antenna or double-antenna port CS I-RSs. Distribution of resources configurable as single-antenna or double-antenna port CSI-RSs and supported in LTE R11 is shown in FIGS. 10 and 11, wherein FIG. 10(a) and FIG. 10(b) show single-antenna or double-antenna port CSI-RS resource configuration supported in LTE R11 under the normal CP condition (totally 32 sets, wherein indexes of each set of single-antenna or double-antenna port CSI-RS resources are supposed to be 0~31, and respectively correspond to CSI-RS configurations 0~31 in Table 2), which may be configured for demodulation interference measurement under the normal CP condition. FIG. 11(a) and FIG. 11(b) show single-antenna or double-antenna port CSI-RS resource configuration supported in LTE R11 under the extended CP condition (totally 28 sets, wherein indexes of each set of single-antenna or double-antenna port CSI-RS resources are supposed to be 0~27, and respectively correspond to CSI-RS configurations 0~27 in Table 3), which may be configured for demodulation interference measurement under the extended CP condition.

In addition, the single-antenna or double-antenna port CSI-RS resources serving as the DM-IMRs may also be single-antenna or double-antenna port CSI-RS resources added on the basis of single-antenna or double-antenna port CSI-RS resources supported by the network side in LTE R11.

(4) One or more sets of RE resources configurable as four-antenna port CSI-RSs.

Figure 12A:
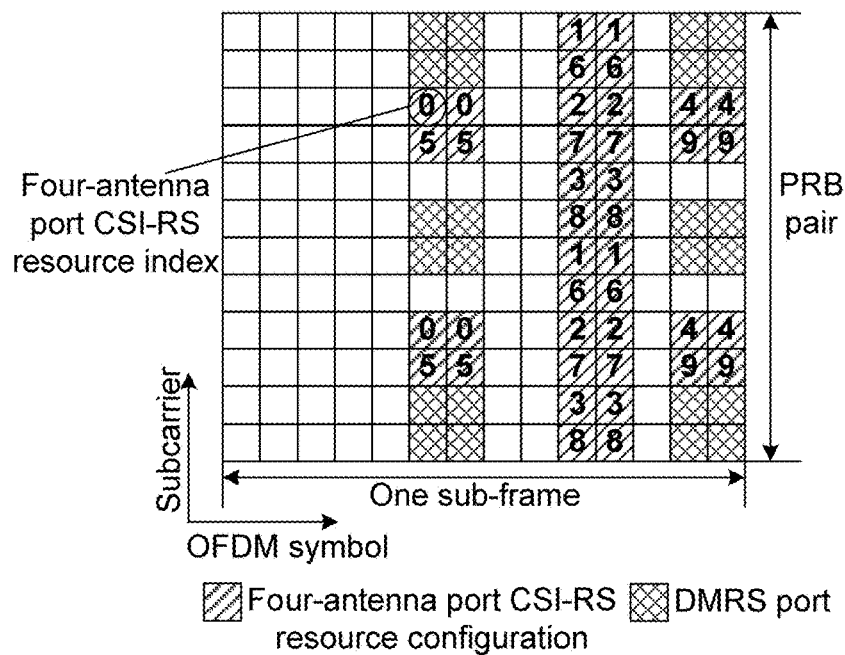
FIG. 12(a) and FIG. 12(b) are diagrams illustrating four-antenna port CSI-RS resource configuration under a normal CP condition according to the related technology.
Figure 12B:
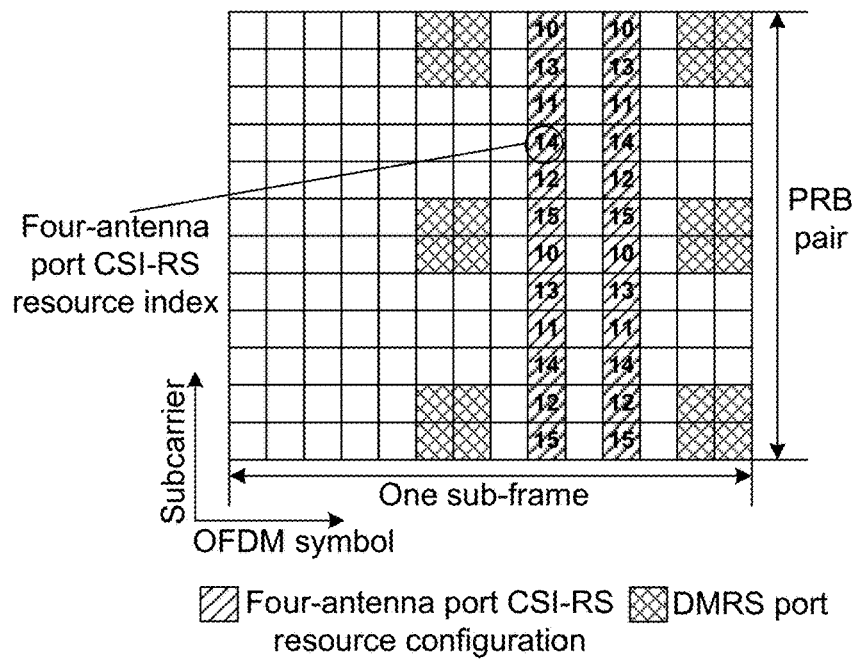
Figure 13A:
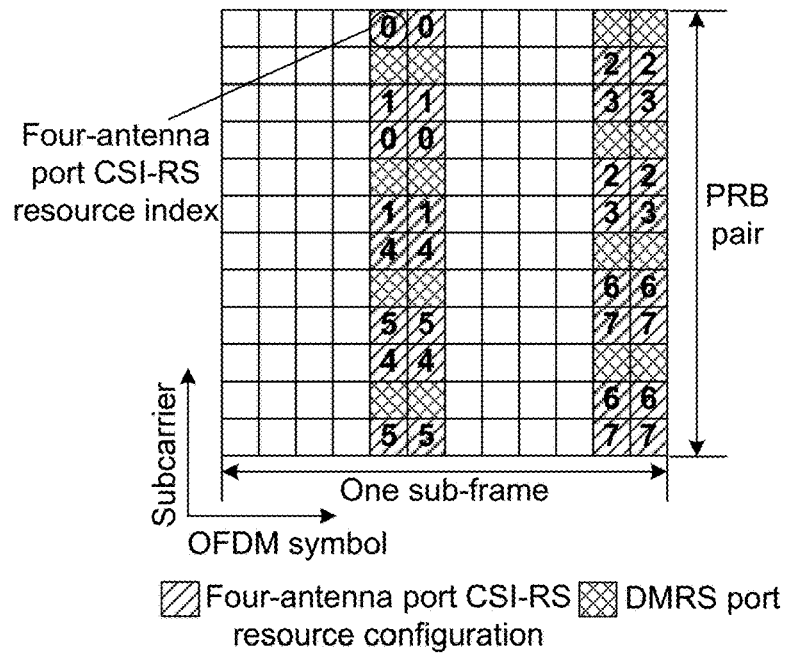
FIG. 13(a) and FIG. 13(b) are diagrams illustrating four-antenna port CSI-RS resource configuration under an extended CP condition according to the related technology.
Figure 13B:
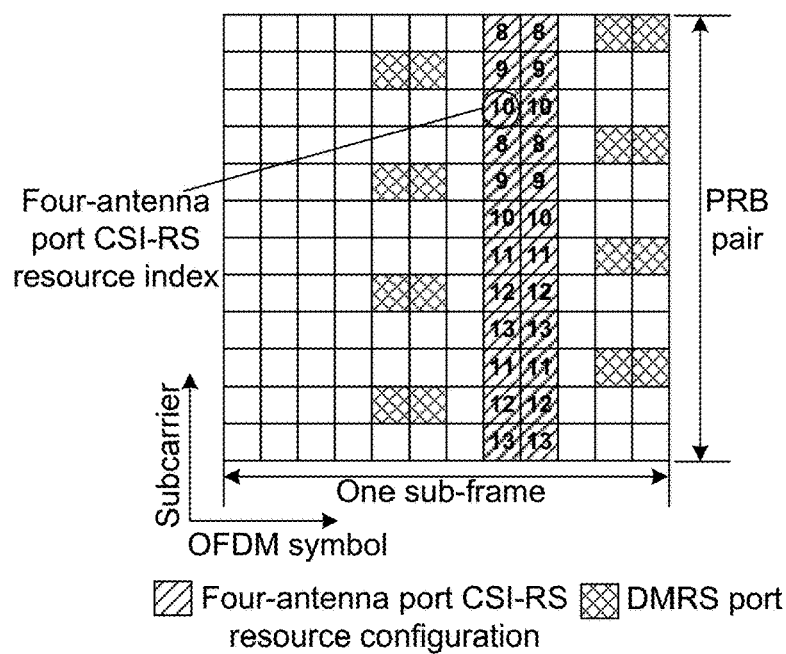

Distribution of resources configurable as four-antenna port CSI-RSs and supported in LTE R11 is shown in FIGS. 12 and 13, wherein FIG. 12(a) and FIG. 12(b) show four-antenna port CSI-RS resource configuration supported in LTE R11 under the normal CP condition (totally 16 sets, wherein indexes of each set of four-antenna port CSI-RS resources are 0~15, and respectively correspond to CSI-RS configurations 0~9 and 20~25 in Table 2), which may be configured for demodulation interference measurement under the normal CP condition; and FIG. 13(a) and FIG. 13(b) show four-antenna port CSI-RS resource configuration supported in LTE R11 under the extended CP condition (totally 14 sets, wherein indexes of each set of four-antenna port CSI-RS resources are 0~13, and respectively correspond to CSI-RS configurations 0~7 and 16~21 in Table 3), which may be configured for demodulation interference measurement under the extended CP condition.

In addition, the four-antenna port CSI-RS resources serving as the DM-IMRs may also be four-antenna port CSI-RS resources added on the basis of four-antenna port CSI-RS resources supported by the network side in LTE R11.

(5) One or more sets of RE resources configurable as eight-antenna port CSI-RSs.

Figure 14A:
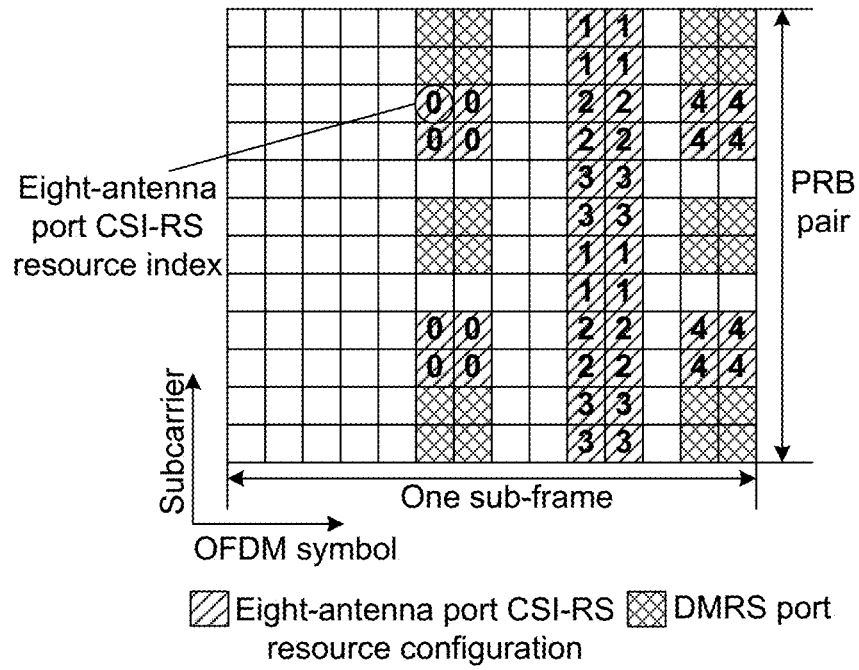
FIG. 14(a) and FIG. 14(b) are diagrams illustrating eight-antenna port CSI-RS resource configuration under a normal CP condition according to the related technology.
Figure 14B:
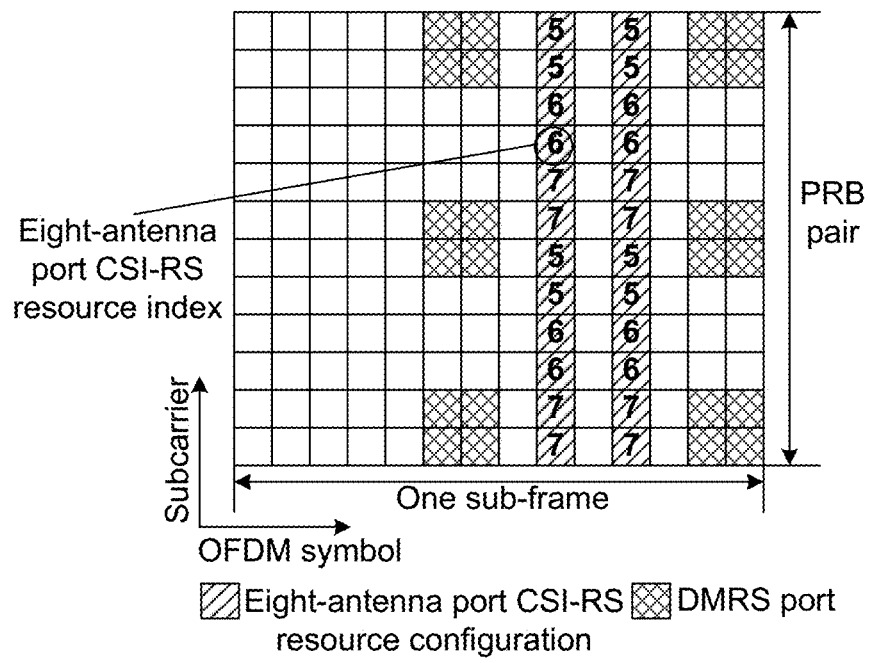

Distribution of resources configurable as eight-antenna port CSI-RSs and supported in LTE R11 is shown in FIGS. 14 and 15, wherein FIG. 14(*a*) and FIG. 14(*b*) show eight-antenna port CSI-RS resource configuration supported in LTE R11 under the normal CP condition (totally 8 sets, wherein indexes of each set of four-antenna port CSI-RS resources are supposed to be 0~7, and respectively correspond to CSI-RS configurations 0~4 and 20~22 in Table 2), which may be configured for demodulation interference measurement under the normal CP condition; and FIG. 15(*a*) and FIG. 15(*b*) show eight-antenna port CSI-RS resource configuration supported in LTE R11 under the extended CP condition (totally 7 sets, wherein indexes of each set of four-antenna port CSI-RS resources are 0~6, and respectively correspond to CSI-RS configurations 0~3 and 16~18 in Table 3), which may be configured for demodulation interference measurement under the extended CP condition.

In addition, the eight-antenna port CSI-RS resources serving as the DM-IMRs may also be eight-antenna port CSI-RS resources added on the basis of eight-antenna port CSI-RS resources supported by the network side in LTE R11.

(6) RE resources at a position where a serving cell CRS of the terminal is located. That is, all REs at the position where the serving cell CRS of the terminal is located are configured for interference measurement, wherein the network side sends zero power signals on these RE resources, and the target data channel is mapped on these RE resources in a rate matching manner. The solution is usually applicable to the condition that the CRS is not configured for data transmission, for example, new carrier type or DMRS-based data transmission.

(7) A part of RE resources at the position where the serving cell CRS of the terminal is located. That is, a part of REs at the position where the serving cell CRS of the terminal is located are configured for demodulation interference measurement, wherein the network side sends zero power signals on the part of RE resources, and the target data channel is mapped on the part of RE resources in the rate matching manner; and the part of RE resources at the position where the serving cell CRS is located are preferably located in an RE resource area which bears the target data channel.

(8) RE resources at a position where an interference cell CRS of the terminal is located. That is, RE resources at positions in serving cell resources corresponding to the position where the interference cell CRS (having the same or different CRS shift value $V_{shift}$ from a serving cell of the terminal) of the terminal is located are configured for demodulation interference measurement, wherein the network side sends zero power signals on these RE resources, and the target data channel is mapped on these RE resources in the rate matching manner.

(9) A part of RE resources at the position where the interference cell CRS of the terminal is located. That is, a part of RE resources at positions in the serving cell resources corresponding to the position where the interference cell CRS (having the same or different CRS shift value $V_{shift}$ from a cell where the terminal is located) of the terminal is located are configured for demodulation interference measurement, wherein the network side sends zero power signals on the part of RE resources, the target data channel is mapped on the part RE resources in the rate matching manner, and the part of RE resources at the position where the interference cell CRS is located are preferably located in the RE resource area which bears the target data channel.

Preferably, the network side sends zero power signals on the DM-IMRs, and at the same time the target data channel is mapped to the DM-IMRs in the rate matching manner.

Preferably, the DM-IMRs exist and only exist in a sub-frame which bears the target data channel. That is, sending of the DM-IMRs is triggered by transmission of the target data channel, and the DM-IMRs corresponding to the target data channel do not exist once the transmission of the target data channel is stopped.

Preferably, no DM-IMRs are configured in a sub-frame where a PMCH is located.

Preferably, when the part of RE resources in the resources at the position where the CRS is located are configured for DM-IMRs, the part of RE resources are usually located in the RE resource area which bears the target data channel.

Step 2: the network side indicates the configuration information of the DM-IMRs to the terminal, wherein the network side may notify the terminal of the configuration information of the DM-IMRs in one of manners of:

(1) configuring and indicating one or more sets of DM-IMRs through high-layer signalling; and (2) configuring multiple sets of DM-IMRs through high-layer signalling, and indicating which set or sets therein are configured for interference measurement of the current target data channel to the terminal through physical-layer signalling.

Herein, the high-layer signalling preferably refers to Radio Resource Control (RRC) signalling, and the physical-layer signalling refers to uplink and/or downlink signalling of a PDCCH or an ePDCCH.

Preferably, the network side adds a DM-IMR IE configuration item which is configured to indicate a condition of resource configuration in each set of DM-IMRs in the high-layer signalling, wherein the IE configuration item at least includes one of:

(1) DM-IMR IDs, configured to distinguish different sets of DM-IMRs, the DM-IMR IDs being integers valued from 1 to maxN, wherein maxN indicates that the network side may configure at most maxN sets of DM-IMRs to one terminal;

(2) a DM-IMR configuration, configured to indicate RE resource positions of the DM-IMRs in each PRB resource which bears the target data channel; and (3) a DM-IMR sub-frame configuration, configured to indicate a sub-frame where the DM-IMRs are located.

The DM-IMR configuration includes at least one of:

(1) a ZP-CSI-RS resource configuration supported in LTE R11;

(2) a ZP-CSI-RS resource configuration which is added by the network side on the basis of the ZP-CSI-RS resource configuration supported in LTE R11;

(3) position indication information of a part of RE resources under the ZP-CSI-RS resource configuration supported in LTE R11;

(4) position indication information of a part of RE resources under the ZP-CSI-RS resource configuration which is added by the network side on the basis of the ZP-CSI-RS resource configuration supported in LTE R11;

(5) a single-antenna or double-antenna port CSI-RS resource configuration supported in LTE R11;

(6) a single-antenna or double-antenna port CSI-RS resource configuration which is added by the network side on the basis of the single-antenna or double-antenna port CSI-RS resource configuration supported in LTE R11;

(7) a four-antenna port CSI-RS resource configuration supported in LTE R11;

(8) a four-antenna port CSI-RS resource configuration which is added by the network side on the basis of the four-antenna port CSI-RS resource configuration supported in LTE R11;

(9) an eight-antenna port CSI-RS resource configuration supported in LTE R11;

(10) an eight-antenna port CSI-RS resource configuration which is added by the network side on the basis of the eight-antenna port CSI-RS resource configuration supported in LTE R11;

(11) position indication information of the RE resources at the position where the serving cell CRS of the target terminal is located;

(12) position indication information of the part of RE resources at the position where the serving cell CRS of the target terminal is located;

(13) position indication information of the RE resources at the position where the interference cell CRS of the target terminal is located; and

(14) position indication information of the part of RE resources at the position where the interference cell CRS of the target terminal is located.

The DM-IMR sub-frame configuration includes at least one of:

(1) a CSI-RS sub-frame configuration supported in LTE R11, as shown in Table 4, wherein each sub-frame configuration corresponds to one CSI-RS period and one CSI-RS sub-frame offset, and it can be seen that a minimum CSI-RS period supported in LTE R11 is 5;

(2) a CSI-RS sub-frame configuration which is added by the network side on the basis of the CSI-RS sub-frame configuration supported in LTE R11, wherein the CSI-RS sub-frame configuration has a CSI-RS period shorter than the CSI-RS sub-frame configuration supported in LTE R11, and the added CSI-RS sub-frame configuration preferably supports the case that the CSI-RS period is 1, for example, as shown in Table 5; and (3) a sub-frame which bears the target data channel, wherein sending of the DM-IMRs is triggered by the transmission of the target data channel, and the DM-IMRs corresponding to the target data channel do not exist once the transmission of the target data channel is stopped.

The CSI-RS sub-frame configuration supported in LTE R11 is shown in Table 4:

TABLE 4

| CSI-RS sub-frame configuration $I_{CSI-RS}$ | CSI-RS period $T_{CSI-RS}$ (sub-frame) | CSI-RS sub-frame offset $\Delta_{CSI-RS}$ (sub-frame) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

The CSI-RS sub-frame configuration enhanced on the basis of LTE R11 is shown in Table 5:

TABLE 5

| CSI-RS sub-frame configuration $I_{CSI-RS}$ | CSI-RS period $T_{CSI-RS}$ (sub-frame) | CSI-RS sub-frame configuration $\Delta_{CSI-RS}$ (sub-frame) |
|---|---|---|
| 0-4 | 5 | $I_{CSI-RS}$ |
| 5-14 | 10 | $I_{CSI-RS}$-5 |

TABLE 5-continued

| CSI-RS sub-frame configuration $I_{CSI-RS}$ | CSI-RS period $T_{CSI-RS}$ (sub-frame) | CSI-RS sub-frame configuration $\Delta_{CSI-RS}$ (sub-frame) |
|---|---|---|
| 15-34 | 20 | $I_{CSI-RS}$-15 |
| 35-74 | 40 | $I_{CSI-RS}$-35 |
| 75-154 | 80 | $I_{CSI-RS}$-75 |
| 155 | 1 | 0 |
| 156-157 | 2 | $I_{CSI-RS}$-156 |
| 158-160 | 3 | $I_{CSI-RS}$-158 |
| 160-163 | 4 | $I_{CSI-RS}$-160 |

Preferably, the DM-IMR configuration may be characterized in one of manners as follows:

(1) the network side represents the DM-IMR configuration by 16-bit high-layer signalling, and indicates which set or sets of ZP-CSI-RS resources in the ZP-CSI-RS resource configuration supported in LTE R11 are configured as DM-IMRs of the terminal to the terminal in a bitmap manner;

(2) the network side characterizes the DM-IMR configuration by X-bit high-layer signalling, and indicates which set or sets of added ZP-CSI-RS resources in the ZP-CSI-RS resource configuration which is added on the basis of the ZP-CSI-RS resource configuration supported in LTE R11 are configured as the DM-IMRs of the terminal to the terminal in the bitmap manner, wherein X refers to ZP-CSI-RS resource configuration which is added on the basis of LTE R11 and X is a positive integer;

(3) the network side characterizes the DM-IMR configuration by 16+X-bit high-layer signalling, and indicates which set or sets of ZP-CSI-RS resources in the ZP-CSI-RS resource configuration supported in LTE R11 and the ZP-CSI-RS resource configuration which is added on the basis of the ZP-CSI-RS resource configuration supported in LTE R11 are configured as the DM-IMRs of the terminal to the terminal in the bitmap manner, wherein 16 bits are configured to represent the ZP-CSI-RS resource configuration supported in LTE R11, X represents the ZP-CSI-RS resource configuration which is added on the basis of LTE R11, and X is a positive integer;

(4) the network side characterizes the DM-IMR configuration by 16+Q-bit high-layer signalling, and indicates REs in which set or sets of ZP-CSI-RS resources in the ZP-CSI-RS resource configuration supported in LTE R11 are configured as the DM-IMRs of the terminal to the terminal in the bitmap manner, wherein 16 bits are configured to indicate which set or sets of ZP-CSI-RS resources in the ZP-CSI-RS resource configuration supported in LTE R11 may be configured as the DM-IMRs of the terminal, Q bits are configured to indicate which REs in each set of ZP-CSI-RS resources which may be configured as the DM-IMRs of the terminal are configured as the DM-IMRs of the terminal, and Q is a positive integer;

(5) the network side characterizes the DM-IMR configuration by 16+X+Q-bit high-layer signalling, and indicates which set or which sets of ZP-CSI-RS resources and which REs therein in the ZP-CSI-RS resource configuration supported in LTE R11 and the ZP-CSI-RS resource configuration which is added on the basis of the ZP-CSI-RS resource configuration supported in LTE R11 are configured as the DM-IMRs of the terminal to the terminal in the bitmap manner, wherein 16+X bits are configured to indicate which set or sets of ZP-CSI-RS resources in the ZP-CSI-RS resource configuration supported in LTE R11 and the ZP-CSI-RS resource configuration which is added on the basis of the ZP-CSI-RS resource configuration supported in LTE R11 may be configured as the DM-IMRs of the terminal, Q bits are configured to indicate which REs in each set of ZP-CSI-RS resources which may be configured as the DM-IMRs of the terminal are configured as the DM-IMRs of the terminal, and both X and Q are positive integers;

(6) the network side characterizes the DM-IMR configuration by X+Q-bit high-layer signalling, and indicates which set or sets of ZP-CSI-RS resources and which REs therein in the ZP-CSI-RS resource configuration which is added on the basis of the ZP-CSI-RS resource configuration supported in LTE R11 are configured as the DM-IMRs of the terminal to the terminal in the bitmap manner, wherein X bits are configured to indicate which set or sets of ZP-CSI-RS resources in the ZP-CSI-RS resource configuration which is added on the basis of the ZP-CSI-RS resource configuration supported in LTE R11 may be configured as the DM-IMRs of the terminal, Q bits are configured to indicate which REs in each set of ZP-CSI-RS resources which may be configured as the DM-IMRs of the terminal are configured as the DM-IMRs of the terminal, and Q is a positive integer;

(7) the network side characterizes the DM-IMR configuration by 32-bit high-layer signalling, and indicates which set or sets of single-antenna or double-antenna port CSI-RS resources in the single-antenna or double-antenna port CSI-RS resource configuration supported in LTE R11 are configured as the DM-IMRs of the terminal to the terminal in the bitmap manner;

(8) the network side characterizes the DM-IMR configuration by Y1-bit high-layer signalling, and indicates which set or sets of added single-antenna or double-antenna port CSI-RS resources in the single-antenna or double-antenna port CSI-RS resource configuration which is added on the basis of the single-antenna or double-antenna port CSI-RS resource configuration supported in LTE R11 are configured as the DM-IMRs of the terminal to the terminal in the bitmap manner, wherein Y1 represents the single-antenna or double-antenna port CSI-RS resource configuration which is added on the basis of LTE R11, and Y1 is a positive integer;

(9) the network side characterizes the DM-IMR configuration by 32+Y1-bit high-layer signalling, and indicates which set or sets of added single-antenna or double-antenna port CSI-RS resources in the single-antenna or double-antenna port CSI-RS resource configuration supported in LTE R11 and the single-antenna or double-antenna port CSI-RS resource configuration which is added on the basis of the single-antenna or double-antenna port CSI-RS resource configuration supported in LTE R11 are configured as the DM-IMRs of the terminal to the terminal in the bitmap manner, wherein 32 bits are configured to represent the single-antenna or double-antenna port CSI-RS resource configuration supported in LTE R11, Y1 represents the single-antenna or double-antenna port CSI-RS resource configuration which is added on the basis of LTE R11, and Y1 is a positive integer;

(10) the network side characterizes the DM-IMR configuration by 16-bit high-layer signalling, and indicates which set or sets of four-antenna port CSI-RS resources in the four-antenna port CSI-RS resource configuration supported in LTE R11 are configured as the DM-IMRs of the terminal to the terminal in the bitmap manner;

(11) the network side characterizes the DM-IMR configuration by Y2-bit high-layer signalling, and indicates which set or sets of added four-antenna port CSI-RS resources in the four-antenna port CSI-RS resource configuration which is added on the basis of the four-antenna port CSI-RS resource configuration supported in LTE R11 are configured as the DM-IMRs of the terminal to the terminal in the bitmap manner, wherein Y2 represents the four-antenna port CSI-RS resource configuration which is added on the basis of LTE R11, and Y2 is a positive integer;

(12) the network side characterizes the DM-IMR configuration by 16+Y2-bit high-layer signalling, and indicates which set or sets of added four-antenna port CSI-RS resources in the four-antenna port CSI-RS resource configuration supported in LTE R11 and the four-antenna port CSI-RS resource configuration which is added on the basis of the four-antenna port CSI-RS resource configuration supported in LTE R11 are configured as the DM-IMRs of the terminal to the terminal in the bitmap manner, wherein 16 bits are configured to represent the four-antenna port CSI-RS resource configuration supported in LTE R11, Y2 represents the four-antenna port CSI-RS resource configuration which is added on the basis of LTE R11, and Y2 is a positive integer;

(13) the network side characterizes the DM-IMR configuration by 8-bit high-layer signalling, and indicates which set or sets of eight-antenna port CSI-RS resources in the eight-antenna port CSI-RS resource configuration supported in LTE R11 are configured as the DM-IMRs of the terminal to the terminal in the bitmap manner;

(14) the network side characterizes the DM-IMR configuration by Y3-bit high-layer signalling, and indicates which set or sets of added eight-antenna port CSI-RS resources in the eight-antenna port CSI-RS resource configuration which is added on the basis of the eight-antenna port CSI-RS resource configuration supported in LTE R11 are configured as the DM-IMRs of the terminal to the terminal in the bitmap manner, wherein Y3 represents the eight-antenna port CSI-RS resource configuration which is added on the basis of LTE R11, and Y3 is a positive integer;

(15) the network side characterizes the DM-IMR configuration by 8+Y3-bit high-layer signalling, and indicates which set or sets of added eight-antenna port CSI-RS resources in the eight-antenna port CSI-RS resource configuration supported in LTE R11 and the eight-antenna port CSI-RS resource configuration which is added on the basis of the eight-antenna port CSI-RS resource configuration supported in LTE R11 are configured as the DM-IMRs of the terminal to the terminal in the bitmap manner, wherein 8 bits are configured to represent the eight-antenna port CSI-RS resource configuration supported in LTE R11, Y3 represents the eight-antenna port CSI-RS resource configuration which is added on the basis of LTE R11, and Y3 is a positive integer;

(16) the network side characterizes the DM-IMR configuration by $|\log_2 16|$-bit high-layer signalling, and indicates which set of ZP-CSI-RS resources in the ZP-CSI-RS resource configuration supported in LTE R11 are configured as the DM-IMRs of the terminal to the terminal;

(17) the network side characterizes the DM-IMR configuration by $|\log_2 X|$-bit high-layer signalling, and indicates which set of added ZP-CSI-RS resources in the ZP-CSI-RS resource configuration which is added on the basis of the ZP-CSI-RS resource configuration supported in LTE R11 are configured as the DM-IMRs of the terminal to the terminal, wherein X represents the ZP-CSI-RS resource configuration which is added on the basis of LTE R11, and X is a positive integer;

(18) the network side characterizes the DM-IMR configuration by $|\log_2(16+X)|$-bit high-layer signalling, and indicates which set of added ZP-CSI-RS resources in the ZP-CSI-RS resource configuration supported in LTE R11 and the ZP-CSI-RS resource configuration which is added on the basis of the ZP-CSI-RS resource configuration supported in LTE R11 are configured as the DM-IMRs of the terminal to the terminal, wherein 16 bits are configured to represent the ZP-CSI-RS resource configuration supported in LTE R11, X represents the ZP-CSI-RS resource configuration which is added on the basis of LTE R11, and X is a positive integer;

(19) the network side characterizes the DM-IMR configuration by $|\log_2 32|$-bit high-layer signalling, and indicates which set of single-antenna or double-antenna port CSI-RS resources in the single-antenna or double-antenna port CSI-RS resource configuration supported in LTE R11 are configured as the DM-IMRs of the terminal to the terminal;

(20) the network side characterizes the DM-IMR configuration by $|\log_2 Y1|$-bit high-layer signalling, and indicates which set of added single-antenna or double-antenna port CSI-RS resources in the single-antenna or double-antenna port CSI-RS resource configuration which is added on the basis of the single-antenna or double-antenna port CSI-RS resource configuration supported in LTE R11 are configured as the DM-IMRs of the terminal to the terminal, wherein Y1 represents the single-antenna or double-antenna port CSI-RS resource configuration which is added on the basis of LTE R11, and Y1 is a positive integer;

(21) the network side characterizes the DM-IMR configuration by $|\log_2(32+Y1)|$-bit high-layer signalling, and indicates which set of added single-antenna or double-antenna port CSI-RS resources in the single-antenna or double-antenna port CSI-RS resource configuration supported in LTE R11 and the single-antenna or double-antenna port CSI-RS resource configuration which is added on the basis of the single-antenna or double-antenna port CSI-RS resource configuration supported in LTE R11 are configured as the DM-IMRs of the terminal to the terminal, wherein 32 bits are configured to represent the single-antenna or double-antenna port CSI-RS resource configuration supported in LTE R11, Y1 represents the single-antenna or double-antenna port CSI-RS resource configuration which is added on the basis of LTE R11, and Y1 is a positive integer;

(22) the network side characterizes the DM-IMR configuration by $|\log_2 16|$-bit high-layer signalling, and indicates which set of four-antenna port CSI-RS resources in the four-antenna port CSI-RS resource configuration supported in LTE R11 are configured as the DM-IMRs of the terminal to the terminal;

(23) the network side characterizes the DM-IMR configuration by $|\log_2 Y2|$-bit high-layer signalling, and indicates which set of added four-antenna port CSI-RS resources in the four-antenna port CSI-RS resource configuration which is added on the basis of the four-antenna port CSI-RS resource configuration supported in LTE R11 are configured as the DM-IMRs of the terminal to the terminal, wherein Y2 represents the four-antenna port CSI-RS resource configuration which is added on the basis of LTE R11, and Y2 is a positive integer;

(24) the network side characterizes the DM-IMR configuration by $|\log_2(16+Y2)|$-bit high-layer signalling, and indicates which set or sets of added four-antenna port CSI-RS resources in the four-antenna port CSI-RS resource configuration supported in LTE R11 and the four-antenna port CSI-RS resource configuration which is added on the basis of the four-antenna port CSI-RS resource configuration supported in LTE R11 are configured as the DM-IMRs of the terminal to the terminal, wherein 16 is configured to represent the four-antenna port CSI-RS resource configuration supported in LTE R11, Y2 represents the four-antenna port CSI-RS resource configuration which is added on the basis of LTE R11, and Y2 is a positive integer;

(25) the network side characterizes the DM-IMR configuration by $|\log_2 8|$-bit high-layer signalling, and indicates which set of eight-antenna port CSI-RS resources in the eight-antenna port CSI-RS resource configuration supported in LTE R11 are configured as the DM-IMRs of the terminal to the terminal;

(26) the network side characterizes the DM-IMR configuration by $|\log_2 Y3|$-bit high-layer signalling, and indicates which set of added eight-antenna port CSI-RS resources in the eight-antenna port CSI-RS resource configuration which is added on the basis of the eight-antenna port CSI-RS resource configuration supported in LTE R11 are configured as the DM-IMRs of the terminal to the terminal, wherein Y3 represents the eight-antenna port CSI-RS resource configuration which is added on the basis of LTE R11, and Y3 is a positive integer;

(27) the network side characterizes the DM-IMR configuration $|\log_2(8+Y3)|$-bit by high-layer signalling, and indicates which set of added eight-antenna port CSI-RS resources in the eight-antenna port CSI-RS resource configuration supported in LTE R11 and the eight-antenna port CSI-RS resource configuration which is added on the basis of the eight-antenna port CSI-RS resource configuration supported in LTE R11 are configured as the DM-IMRs of the terminal to the terminal, wherein 8 is configured to represent the eight-antenna port CSI-RS resource configuration supported in LTE R11, Y3 represents the eight-antenna port CSI-RS resource configuration which is added on the basis of LTE R11, and Y3 is a positive integer;

(28) the network side characterizes the DM-IMR configuration by 24-bit (a four-antenna port CRS occupies totally 24 REs in a PRB pair under the normal CP condition) high-layer signalling, and indicates which RE resources in the resources at the position of the CRS are configured as the DM-IMRs of the terminal to the terminal in the bitmap manner;

(29) Z sets of patterns of a part of CRS REs are predefined, and the network side characterizes the DM-IMR configuration by Z-bit high-layer signalling, and indicates which set or sets of RE resources in the Z sets of patterns of the part of CRS REs are configured as the DM-IMRs of the terminal to the terminal in the bitmap manner, wherein Z is an integer more than 1;

(30) Z sets of patterns of a part of CRS REs are predefined, and the network side characterizes the DM-IMR configuration by $|\log_2 Z|$-bit high-layer signalling, and indicates which set of RE resources in the Z sets of patterns of the part of CRS REs are configured as the DM-IMRs of the terminal to the terminal, wherein Z is an integer more than 1;

(31) the network side notifies the target user of positions or corresponding shift values $V_{shift}$ or physical cell IDs of the CRSs serving as the DM-IMRs through high-layer and/or physical-layer signalling; and

(32) the network side characterizes the DM-IMR configuration by 24+V-bit high-layer signalling, and indicates the positions of the CRSs and RE resources configured as the DM-IMRs of the terminal in resources at the positions of the CRSs to the terminal, wherein V bits are configured to represent the positions or corresponding shift values $V_{shift}$ or physical cell IDs of the CRSs serving as the DM-IMRs, the other 24 bits are configured to represent which RE resources in the resources at the positions of the CRSs are configured into the DM-IMRs of the terminal, and V is a positive integer.

Preferably, the network side configures N sets of DM-IMRs through high-layer signalling, and the network side indicates which set or sets in the N sets of DM-IMRs are configured as the DM-IMRs of the current target data channel to the terminal through $\lceil \log_2 N \rceil$ or N-bit physical-layer dynamic signalling, wherein N is an integer more than 1. Herein, each set of DM-IMRs preferably has a different DM-IMR ID from the other N−1 sets of DM-IMRs.

Step 3: the terminal receives the configuration information of the DM-IMRs through the high-layer signalling and/or the physical-layer signalling, determines the DM-IMRs of the target data channel, and measures the interference during the transmission of the target data channel through the DM-IMRs. The terminal performs interference elimination/suppression at a receiver on the basis of the measured interference to achieve higher target data channel receiving performance.

Preferably, the terminal does not receive any signal on the DM-IMRs, and de-maps the target data channel on the DM-IMRs in the rate matching manner.

Preferably, the terminal only monitors the DM-IMRs in the PRB and sub-frame which bear the target data channel.

Embodiment 2

Figure 8A:
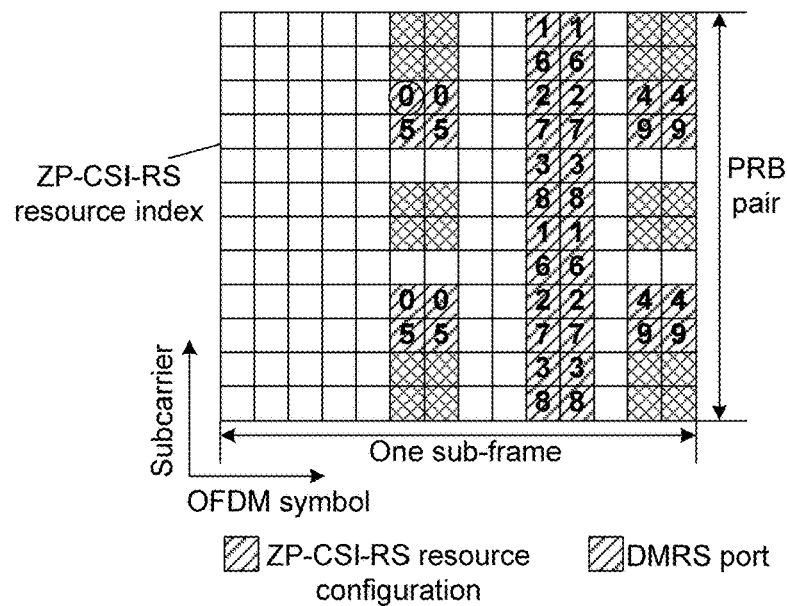
FIG. 8(a) and FIG. 8(b) are diagrams illustrating ZP-CSI-RS resource configuration under a normal CP condition according to the related technology.
Figure 8B:
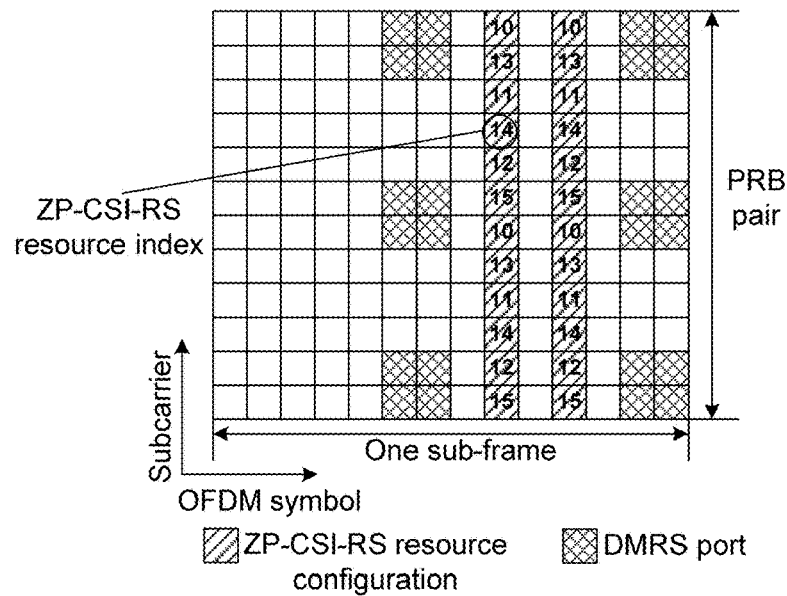
Figure 9A:
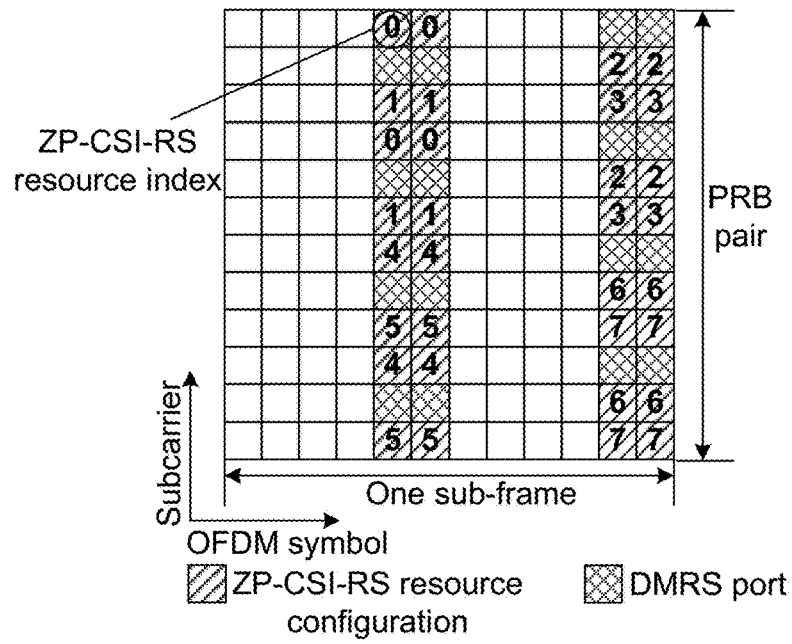
FIG. 9(a) and FIG. 9(b) are diagrams illustrating ZP-CSI-RS resource configuration under an extended CP condition according to the related technology.
Figure 9B:
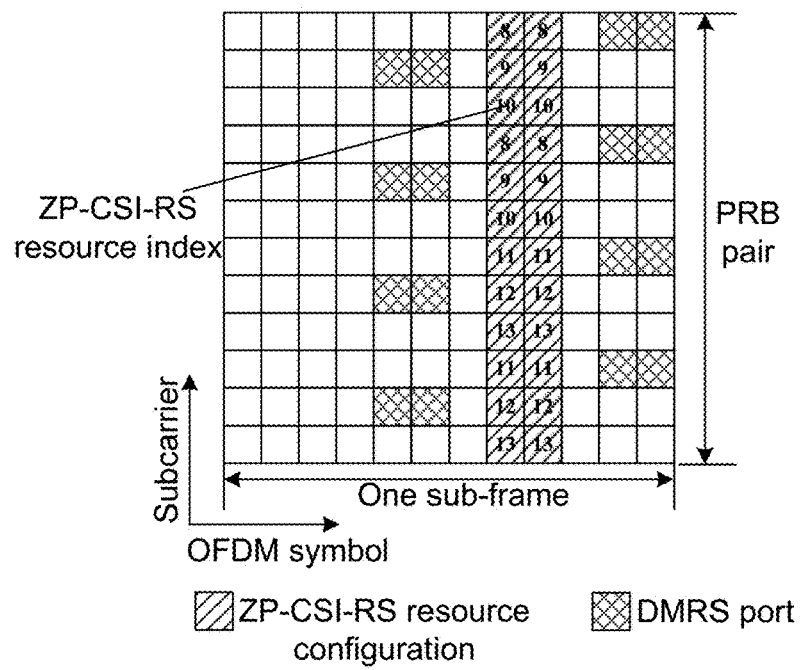

A network side configures DM-IMRs for a terminal, wherein REs configured as the DM-IMRs are REs corresponding to ZP-CSI-RSs. Specifically, the DM-IMRs configured for the terminal by the network side consist of one or more ZP-CSI-RS resources. FIG. 8(a)/FIG. 8(b) show all REs which may be configured as ZP-CSI-RSs in a sub-frame in a system under a normal CP condition, wherein each sequence number represents resource which may be configured as ZP-CSI-RS. FIG. 9(a)/FIG. 9(b) show all RE resources which may be configured as ZP-CSI-RSs in a sub-frame in the system under an extended CP condition, wherein each sequence number represents resource which may be configured as ZP-CSI-RS.

The network side indicates the DM-IMRs to the terminal in one of the two manners as follows.

Manner 1: the network side notifies the terminal of the DM-IMRs through high-layer signalling, wherein the DM-IMRs include one or more ZP-CSI-RS resources. Specifically, the network side adds a DM-IMR IE configuration item which is configured to indicate a condition of resource configuration in each set of DM-IMRs in the high-layer signalling, wherein the IE configuration item at least includes:

a DM-IMR configuration, configured to indicate RE resource positions of the DM-IMRs in each PRB resource which bears a target data channel, wherein the DM-IMR configuration is a ZP-CSI-RS resource configuration supported in LTE R11. The network side characterizes the DM-IMR configuration by 16-bit high-layer signalling, and indicates which one or more ZP-CSI-RS resources in the ZP-CSI-RS resource configuration supported in LTE R11 are configured as the DM-IMRs to the terminal through a 16-bit bitmap. Alternatively, the network side characterizes the DM-IMR configuration by $\lceil \log_2 16 \rceil = 4$-bit high-layer signalling, and indicates which ZP-CSI-RS resource in the ZP-CSI-RS resource configuration supported in LTE R11 is DM-IMRs to the terminal.

Manner 2: the network side configures the DM-IMRs through high-layer signalling, wherein the DM-IMRs include one or more ZP-CSI-RS resources, and the network side dynamically indicates which one or more ZP-CSI-RS resources are configured for interference measurement of the current target data channel to the terminal through physical-layer signalling, specifically including the following steps:

Step 1: the network side configures the DM-IMRs to the terminal through high-layer signalling, and specifically, the network side adds a DM-IMR IE configuration item which is configured to indicate the condition of resource configuration in each set of DM-IMRs in the high-layer signalling, wherein the IE configuration item at least includes:

the DM-IMR configuration, configured to indicate the RE resource positions of the DM-IMRs in each PRB resource which bears the target data channel, wherein the DM-IMRs are configured into the ZP-CSI-RS resource configuration supported in LTE R11. The network side characterizes a DM-IMR configuration by 16-bit high-layer signalling, and indicates which one or more ZP-CSI-RS resources in the ZP-CSI-RS resource configuration supported in LTE R11 form the set of DM-IMRs to the terminal through a 16-bit bitmap.

Step 2: the network side indicates one or more ZP-CSI-RS resources (it is supposed that the DM-IMRs determined in Step 1 include N ZP-CSI-RS resources and N is an integer more than 1) in the DM-IMRs determined in Step 1 to the terminal through physical-layer signalling for the interference measurement of the target data channel, specifically including:

the network side indicates the one or more ZP-CSI-RS resources in the DM-IMRs determined in Step 1 to the terminal through N-bit physical-layer signalling, and indicates the one or more ZP-CSI-RS resources in the DM-IMRs determined in Step 1 to the terminal through an N-bit bitmap for the interference measurement of the current target data channel; or the network side indicates the ZP-CSI-RS resource in the DM-IMRs determined in Step 1 to the terminal through $\lceil \log_2 N \rceil$-bit physical-layer signalling for the interference measurement of the current target data channel.

For a specified user, the network side only performs puncturing or rate matching on REs of the DM-IMRs configured for the user on a bandwidth which bears the target data channel.

For the specified user, the network side only performs puncturing or rate matching on the REs of the DM-IMRs configured for the user on a sub-frame which bears the target data channel.

A target user receives information of the DM-IMRs configured by the network side; and a User Equipment (UE) side performs data de-mapping in the same manner as that adopted by the network side on the sub-frame which bears the target data channel: if the network side performs rate matching on the REs of the DM-IMRs configured for the user, the UE side determines as a default that the REs for transmitting the DM-IMRs do not have any data corresponding to the target data channel, and if the network side performs puncturing on the REs of the DM-IMRs configured for the user, the UE side determines that signals received on these REs are still data of the target data channel of the user.

The target user determines the number of the ZP-CSI-RSs configured for demodulation interference measurement by the network side and RE resource positions corresponding to each ZP-CSI-RS according to the information of the DM-IMRs configured by the network side.

The target user estimates interference by means of the RE resource position corresponding to each ZP-CSI-RS respectively.

The target user performs interference compression or interference elimination processing on the basis of each piece of estimated interference information by adopting a receiving detection algorithm, and detects data information of the target data channel.

Embodiment 3

A network side configures DM-IMRs for a terminal, wherein REs configured into the DM-IMRs are REs corresponding to ZP-CSI-RSs. Specifically, the network side configures one or more sets of DM-IMRs for the terminal, wherein each set of DM-IMRs consists of one or more ZP-CSI-RS resources. FIG. 8(a)/FIG. 8(b) show all REs which may be configured into ZP-CSI-RSs in a sub-frame in a system under a normal CP condition, wherein each sequence number represents resource which may be configured into ZP-CSI-RS. FIG. 9(a)/FIG. 9(b) show all RE resources which may be configured as ZP-CSI-RSs in a sub-frame in the system under an extended CP condition, wherein each sequence number represents resource which may be configured as ZP-CSI-RS.

The network side indicates the DM-IMRs to the terminal in one of the following manners.

Manner 1: the network side notifies the terminal of the one or more sets of DM-IMRs through high-layer signalling. Specifically, the network side adds a DM-IMR IE configuration item which is configured to indicate a condition of resource configuration in each set of DM-IMRs in the high-layer signalling, wherein the IE configuration item includes:

a DM-IMR ID, configured to distinguish different sets of DM-IMRs, the DM-IMR ID being an integer valued from 1 to maxN, wherein maxN indicates that the network side may configure at most maxN sets of DM-IMRs for one terminal; and a DM-IMR configuration, configured to indicate RE resource positions of the DM-IMRs in each PRB resource which bears a target data channel, wherein the DM-IMR configuration is a ZP-CSI-RS resource configuration supported in LTE R11. The network side characterizes the DM-IMR configuration by 16-bit high-layer signalling, and indicates which one or more ZP-CSI-RS resources in the ZP-CSI-RS resource configuration supported in LTE R11 form the set of DM-IMRs to the terminal through a 16-bit bitmap. Alternatively, the network side characterizes the DM-IMR configuration by $|\log_2 16|=4$-bit high-layer signalling, and indicates which ZP-CSI-RS resource in the ZP-CSI-RS resource configuration supported in LTE R11 forms the set of DM-IMRs to the terminal.

Manner 2: the network side configures multiple sets of DM-IMRs through high-layer signalling, and indicates which set or sets therein are configured for interference measurement of the current target data channel to the terminal through physical-layer signalling, specifically including the following steps:

Step 1: the network side configures the multiple sets of DM-IMRs for the terminal through high-layer signalling, and specifically, the network side adds a DM-IMR IE configuration item which is configured to indicate the condition of resource configuration in each set of DM-IMRs in the high-layer signalling, wherein the IE configuration item at least includes:

the DM-IMR ID, configured to distinguish different sets of DM-IMRs, the DM-IMR ID being an integer valued from 1 to maxN, wherein maxN indicates that the network side may configure at most maxN sets of DM-IMRs to one terminal; and the DM-IMR configuration, configured to indicate the RE resource positions of the DM-IMRs in each PRB resource which bears the target data channel, wherein the DM-IMRs are configured into the ZP-CSI-RS resource configuration supported in LTE R11. The network side characterizes the DM-IMR configuration by 16-bit high-layer signalling, and indicates which one or more ZP-CSI-RS resources in the ZP-CSI-RS resource configuration supported in LTE R11 form the set of DM-IMRs to the terminal through a 16-bit bitmap. Alternatively, the network side characterizes the DM-IMR configuration by $|\log_2 16|=4$-bit high-layer signalling, and indicates which ZP-CSI-RS resource in the ZP-CSI-RS resource configuration supported in LTE R11 forms the set of DM-IMRs to the terminal.

Step 2: the network side indicates one or more sets in the multiple sets (it is supposed that there are N sets and N is an integer more than 1) of DM-IMRs determined in Step 1 to the terminal through physical-layer signalling for the interference measurement of the target data channel, specifically including:

the network side indicates the one or more sets in the multiple sets of DM-IMRs determined in Step 1 to the terminal through N-bit physical-layer signalling for the interference measurement of the target data channel; or, the network side indicates the one set in the multiple sets of DM-IMRs determined in Step 1 to the terminal through $|\log_2 N|$-bit physical-layer signalling for the interference measurement of the current target data channel.

For a specified user, the network side only performs puncturing or rate matching on REs of the DM-IMRs configured for the user on a bandwidth which bears the target data channel.

For the specified user, the network side only performs puncturing or rate matching on the REs of the DM-IMRs configured for the user on a sub-frame which bears the target data channel.

A target user receives information of the DM-IMRs configured by the network side; and a UE side performs data de-mapping in the same manner as that adopted by the network side on the sub-frame which bears the target data channel: if the network side performs rate matching on the REs of the DM-IMRs configured for the user, the UE side determines as a default that the REs for transmitting the DM-IMRs do not have any data corresponding to the target data channel, and if the network side performs puncturing on the REs of the DM-IMRs configured for the user, the UE side determines that signals received on these REs are still data of the target data channel of the user.

The target user determines the number of the DM-IMRs configured by the network side and RE resource positions corresponding to the ZP-CSI-RSs in each set of DM-IMRs according to the information of the DM-IMRs configured by the network side.

The target user estimates interference by means of the RE resource positions corresponding to each set of DM-IMRs respectively.

The target user performs interference compression or interference elimination processing on the basis of each piece of estimated interference information by adopting a receiving detection algorithm, and detects data information of the target data channel.

Embodiment 4

A network side configures DM-IMRs for a terminal, wherein REs configured as the DM-IMRs are REs corresponding to ZP-CSI-RSs. Specifically, the network side configures one or more sets of DM-IMRs for the terminal, wherein each set of DM-IMRs consists of one or more ZP-CSI-RS resources and each ZP-CSI-RS resource corresponds to a CSI-RS sub-frame configuration. FIG. 8(a)/8(b) shows all REs which may be configured as ZP-CSI-RSs in a sub-frame in a system under a normal CP condition, wherein each sequence number represents resource which may be configured as ZP-CSI-RS. FIG. 9(*a*)/9(*b*) shows all RE resources which may be configured as ZP-CSI-RSs in a sub-frame in the system under an extended CP condition, wherein each sequence number represents resource which may be configured as a ZP-CSI-RS. The CSI-RS sub-frame configuration is a CSI-RS sub-frame configuration supported in LTE R11, as shown in Table 2, wherein each sub-frame configuration corresponds to a CSI-RS period and a CSI-RS sub-frame offset or a CSI-RS sub-frame configuration which is added by the network side on the basis of the CSI-RS sub-frame configuration supported in LTE R11, the CSI-RS sub-frame configuration has a shorter CSI-RS period than the CSI-RS sub-frame configuration supported in LTE R11, and the added CSI-RS sub-frame configuration preferably supports the condition that the CSI-RS period is 1, for example, as shown in Table 3.

The network side notifies the terminal of the one or more sets of DM-IMRs through high-layer signalling. Specifically, the network side adds a DM-IMR IE configuration item which is configured to indicate a condition of resource configuration in each set of DM-IMRs in the high-layer signalling, wherein the IE configuration item includes:

a DM-IMR ID, configured to distinguish different sets of DM-IMRs, the DM-IMR ID being an integer valued from 1 to maxN, wherein maxN indicates that the network side may configure at most maxN sets of DM-IMRs for one terminal;

a DM-IMR configuration, configured to indicate RE resource positions of the DM-IMRs in each PRB resource which bears a target data channel, wherein the DM-IMR configuration is a ZP-CSI-RS resource configuration supported in LTE R11; the network side characterizes the DM-IMR configuration by 16-bit high-layer signalling, and indicates which one or more ZP-CSI-RS resources in the ZP-CSI-RS resource configuration supported in LTE R11 form the set of DM-IMRs to the terminal through a 16-bit bitmap; or, the network side characterizes the DM-IMR configuration by $|\log_2 16|=4$-bit high-layer signalling, and indicates which ZP-CSI-RS resource in the ZP-CSI-RS resource configuration supported in LTE R11 forms the set of DM-IMRs to the terminal; and a DM-IMR sub-frame configuration, configured to indicate a sub-frame where the DM-IMRs are located. Specifically, the DM-IMR sub-frame configuration is the CSI-RS sub-frame configuration supported in LTE R11 as shown in Table 2 or the CSI-RS sub-frame configuration added by the network side on the basis of the CSI-RS sub-frame configuration supported in LTE R11, and for example, the added CSI-RS sub-frame configuration supports the condition that the CSI-RS period is 1.

Generally, the one or more sets of DM-IMRs configured by the network side meet the conditions that different sets of DM-IMRs have different DM-IMR IDs and that a combination result of the DM-IMR sub-frame configurations corresponding to the one or more sets of DM-IMRs is that the DM-IMRs may appear in each sub-frame.

For a specified user, the network side only performs puncturing or rate matching on REs of the DM-IMRs configured for the user on a bandwidth which bears a target data channel.

For the specified user, the network side only performs puncturing or rate matching on the REs of the DM-IMRs configured for the user on a sub-frame which bears the target data channel.

A target user receives information of the DM-IMRs configured by the network side; and a UE side performs data de-mapping in the same manner as that adopted by the network side on the sub-frame which bears the target data channel: if the network side performs rate matching on the REs of the DM-IMRs configured for the user, the UE side determines as a default that the REs for transmitting the DM-IMRs do not have any data corresponding to the target data channel, and if the network side performs puncturing on the REs of the DM-IMRs configured for the user, the UE side determines that signals received on these REs are still data of the target data channel of the user.

The target user determines the number of the DM-IMRs configured by the network side and RE resource positions corresponding to the ZP-CSI-RSs in each set of DM-IMRs according to the information of the DM-IMRs configured by the network side.

The target user estimates interference by means of the RE resource positions corresponding to each set of DM-IMRs respectively.

The target user performs interference compression or interference elimination processing on the basis of each piece of estimated interference information by adopting a receiving detection algorithm, and detects data information of the target data channel.

Embodiment 5

A network side configures DM-IMRs for a terminal, wherein REs configured as the DM-IMRs are REs corresponding to ZP-CSI-RS resources which are added by the network side on the basis of a ZP-CSI-RS resource configuration supported in LTE R11. Specifically, the DM-IMRs configured for the terminal by the network side include one or more ZP-CSI-RS resources. FIG. 8(*a*)/8(*b*) shows all REs which may be configured as ZP-CSI-RSs supported in LTE R11 in a sub-frame in a system under a normal CP condition, wherein each sequence number represents a resource which may be configured into a ZP-CSI-RS. FIG. 9(*a*)/9(*b*) shows all RE resources which may be configured as ZP-CSI-RSs supported in LTE R11 in a sub-frame in the system under an extended CP condition, wherein each sequence number represents a resource which may be configured into a ZP-CSI-RS. The ZP-CSI-RS resources mentioned here also include the ZP-CSI-RS resources which will be added on the basis of the ZP-CSI-RS resource configurations supported in LTE R11 in the future, and for example, a PDCCH area is removed in a new carrier type, which may allow addition of new ZP-CSI-RS resources in the PDCCH area in the new carrier type.

The network side indicates the DM-IMRs to the terminal in one of manners as follows.

Manner 1: the network side notifies the terminal of the DM-IMRs through high-layer signalling, wherein the DM-IMRs include one or more ZP-CSI-RS resources. Specifically, the network side adds a DM-IMR IE configuration item which is configured to indicate a resource configuration condition of the DM-IMRs in the high-layer signalling, wherein the IE configuration item includes one of:

DM-IMR IDs, configured to distinguish different sets of DM-IMRs, the DM-IMR IDs being integers valued from 1 to maxN, wherein maxN indicates that the network side may configure at most maxN sets of DM-IMRs for one terminal; and a DM-IMR configuration, configured to indicate RE resource positions of the DM-IMRs in each PRB resource which bears a target data channel, wherein the DM-IMR configuration is a ZP-CSI-RS resource configuration which is added by the network side on the basis of a ZP-CSI-RS resource configuration supported in LTE R11. The network side characterizes the DM-IMR configuration by 16+X-bit high-layer signalling, and indicates which one or more ZP-CSI-RS resources in the ZP-CSI-RS resource configuration which is added on the basis of the ZP-CSI-RS resource configuration supported in LTE R11 are configured as the DM-IMRs of the terminal to the terminal in a bitmap manner, wherein X represents the ZP-CSI-RS resource configuration which is added on the basis of LTE R11, and X is a positive integer; or, the network side characterizes the DM-IMR configuration by $|\log_2(16+X)|$ or $|\log_2 X|$-bit high-layer signalling, and indicates which ZP-CSI-RS resource in the ZP-CSI-RS resource configuration which is added on the basis of the ZP-CSI-RS resource configuration supported in LTE R11 is the DM-IMR to the terminal.

Manner 2: the network side configures the DM-IMRs through high-layer signalling, the DM-IMRs including one or more ZP-CSI-RS resources, and dynamically indicates which one or more ZP-CSI-RS resources therein are configured for interference measurement of the current target data channel to the terminal through physical-layer signalling, specifically including the following steps:

Step 1: the network side configures the DM-IMRs for the terminal through high-layer signalling, and specifically, the network side adds a DM-IMR IE configuration item which is configured to indicate the resource configuration condition of the DM-IMRs in the high-layer signalling, wherein the IE configuration item at least includes one of:

the DM-IMR IDs, configured to distinguish different sets of DM-IMRs, the DM-IMR IDs being integers valued from 1 to maxN, wherein maxN indicates that the network side may configure at most maxN sets of DM-IMRs for one terminal; and the DM-IMR configuration, configured to indicate the RE resource positions of the DM-IMRs in each PRB resource which bears the target data channel, wherein the DM-IMRs are configured as the ZP-CSI-RS resource configuration which is added by the network side on the basis of the ZP-CSI-RS resource configuration supported in LTE R11. The network side characterizes the DM-IMR configuration by 16+X or X-bit high-layer signalling, and indicates which one or more ZP-CSI-RS resources in the ZP-CSI-RS resource configuration which is added on the basis of the ZP-CSI-RS resource configuration supported in LTE R11 are configured as the DM-IMRs of the terminal to the terminal in the bitmap manner; or, the network side characterizes the DM-IMR configuration by $|\log_2(16+X)|$ or $|\log_2 X|$-bit high-layer signalling, and indicates which ZP-CSI-RS resource in the ZP-CSI-RS resource configuration which is added on the basis of the ZP-CSI-RS resource configuration supported in LTE R11 is the DM-IMR to the terminal, wherein X represents the ZP-CSI-RS resource configuration which is added on the basis of LTE R11, and X is a positive integer.

Step 2: the DM-IMRs configured for the interference measurement of the current target data channel are notified to the terminal, specifically including the following two cases.

Case 1: under the condition that there is only one set of DM-IMRs, the network side usually indicates one or more ZP-CSI-RS resources (it is supposed that the DM-IMRs determined in Step 1 include N ZP-CSI-RS resources and N is an integer more than 1) in the DM-IMRs determined in Step 1 to the terminal through physical-layer signalling for the interference measurement of the target data channel, specifically including: the network side indicates the one or more ZP-CSI-RS resources in the DM-IMRs determined in Step 1 to the terminal through N-bit physical-layer signalling, and indicates the one or more ZP-CSI-RS resources in the DM-IMRs determined in Step 1 to the terminal through an N-bit bitmap for the interference measurement of the target data channel; or, the network side indicates the ZP-CSI-RS resource in the DM-IMRs determined in Step 1 to the terminal through $|\log_2 N|$-bit physical-layer signalling for the interference measurement of the current target data channel.

Case 2: under the condition that there are multiple sets of DM-IMRs, the network side usually indicates one or more sets of DM-IMRs (it is supposed that there are N sets of DM-IMRs determined in Step 1 and N is an integer more than 1) in the multiple sets of DM-IMRs determined in Step 1 to the terminal through physical-layer signalling for the interference measurement of the target data channel, specifically including: the network side indicates the one or more sets in the DM-IMRs determined in Step 1 to the terminal through N-bit physical-layer signalling, and indicates the one or more sets of DM-IMRs in the DM-IMRs determined in Step 1 to the terminal through an N-bit bitmap for the interference measurement of the current target data channel; or, the network side indicates one set of DM-IMRs in the DM-IMRs determined in Step 1 to the terminal through $|\log_2 N|$-bit physical-layer signalling for the interference measurement of the current target data channel.

For a specified user, the network side only performs puncturing or rate matching on REs of the DM-IMRs configured for the user on a bandwidth which bears the target data channel.

For the specified user, the network side only performs puncturing or rate matching on the REs of the DM-IMRs configured for the user on a sub-frame which bears the target data channel.

A target user receives information of the DM-IMRs configured by the network side; and a UE side performs data de-mapping in the same manner as that adopted by the network side on the sub-frame which bears the target data channel: if the network side performs rate matching on the REs of the DM-IMRs configured to the user, the UE side determines as a default that the REs for transmitting the DM-IMRs do not have any data corresponding to the target data channel, and if the network side performs puncturing on the REs of the DM-IMRs configured to the user, the UE side determines that signals received on these REs are still data of the target data channel of the user.

The target user determines the number of the DM-IMRs or ZP-CSI-RSs configured by the network side and RE resource positions corresponding to each set of DM-IMRs or each ZP-CSI-RS according to the information of the DM-IMRs configured by the network side.

The target user estimates interference by means of the RE resource positions corresponding to each set of DM-IMRs or each ZP-CSI-RS respectively.

The target user performs interference compression or interference elimination processing on the basis of each piece of estimated interference information by adopting a receiving detection algorithm, and detects data information of the target data channel.

Embodiment 6

A network side configures DM-IMRs for a terminal, wherein REs configured into the DM-IMRs are REs corresponding to a part of REs in REs corresponding to ZP-CSI-RS resources, and the other part of REs may serve as DM-IMRs of another terminal or may still be configured to transmit ZI-CSI-RSs. Specifically, the DM-IMRs configured to the terminal by the network side include one or more ZP-CSI-RS resources. FIG. 8(a)/8(b) shows all REs which may be configured into ZP-CSI-RSs supported in LTE R11 in a sub-frame in a system under a normal CP condition, wherein each sequence number represents a resource which may be configured into a ZP-CSI-RS. FIG. 9(a)/9(b) shows all RE resources which may be configured into ZP-CSI-RSs supported in LTE R11 in a sub-frame in the system under an extended CP condition, wherein each sequence number represents a resource which may be configured as a ZP-CSI-RS. The ZP-CSI-RS resources mentioned here also include ZP-CSI-RS resources which will be added on the basis of a ZP-CSI-RS resource configuration supported in LTE R11 in the future, and for example, a PDCCH area is removed in a new carrier type, which may allow addition of new ZP-CSI-RS resources in the PDCCH area in the new carrier type.

The network side indicates the DM-IMRs to the terminal in one of manners as follows.

Manner 1: the network side notifies the DM-IMRs to the terminal through high-layer signalling, wherein the DM-IMRs include one or more ZP-CSI-RS resources. Specifically, the network side adds a DM-IMR IE configuration item which is configured to indicate a resource configuration condition of the DM-IMRs in the high-layer signalling, wherein the IE configuration item at least includes one of:

DM-IMR IDs, configured to distinguish different sets of DM-IMRs, the DM-IMR IDs being integers valued from 1 to maxN, wherein maxN indicates that the network side may configure at most maxN sets of DM-IMRs to one terminal; and a DM-IMR configuration, configured to indicate RE resource positions of the DM-IMRs in each PRB resource which bears a target data channel, wherein the DM-IMR configuration is the ZP-CSI-RS resources supported in LTE R11 or a part of REs in the REs corresponding to a ZP-CSI-RS resource configuration which is added by the network side on the basis of a ZP-CSI-RS resource configuration supported in LTE R11. The network side characterizes the DM-IMR configuration by 16+Q-bit or 16+X+Q-bit or X+Q-bit high-layer signalling, and indicates which part of REs in which one or more ZP-CSI-RS resources are the DM-IMRs of the terminal to the terminal in a bitmap manner, wherein X represents the ZP-CSI-RS resource configuration which is added on the basis of LTE R11, and X is a positive integer; and Q represents which part of REs in each ZP-CSI-RS resource are employed as the DM-IMRs of the terminal. For example, when the DM-IMR resource configuration is the ZP-CSI-RS resource configuration supported in LTE R11, the DM-IMR resource configuration may be characterized by 16+2 (Q=2)-bit high-layer signalling, wherein 16 bits are configured to indicate the one or more ZP-CSI-RS resources to the terminal, Q is configured to indicate which REs in these ZP-CSI-RS resources are employed as the DM-IMRs of the terminal to the terminal, and for example, it is indicated that the first two REs in each ZP-CSI-RS resource in these ZP-CSI-RS resources are configured into the DM-IMRs when 2-bit high-layer signalling is 10; it is indicated that the latter two REs in each ZP-CSI-RS resource in these ZP-CSI-RS resources are configured into the DM-IMRs when 2-bit high-layer signalling is 01; and all the REs in each ZP-CSI-RS resource in these ZP-CSI-RSs are configured into the DM-IMRs when 2-bit high-layer signalling is 11.

Manner 2: the network side configures the DM-IMRs through high-layer signalling, the DM-IMRs including one or more ZP-CSI-RS resources, and the network side dynamically indicates which one or more ZP-CSI-RS resources therein are configured for interference measurement of the current target data channel to the terminal through physical-layer signalling, specifically including the following steps:

Step 1: the network side configures the DM-IMRs to the terminal through high-layer signalling, and specifically, the network side adds a DM-IMR IE configuration item which is configured to indicate the resource configuration condition of the DM-IMRs in the high-layer signalling, wherein the IE configuration item at least includes one of:

the DM-IMR IDs, configured to distinguish different sets of DM-IMRs, the DM-IMR IDs being integers valued from 1 to maxN, wherein maxN indicates that the network side may configure at most maxN sets of DM-IMRs to one terminal; and the DM-IMR configuration, configured to indicate the RE resource positions of the DM-IMRs in each PRB resource which bears the target data channel, wherein the DM-IMRs are configured into the ZP-CSI-RS resources supported in LTE R11 or the part of REs in the REs corresponding to the ZP-CSI-RS resource configuration which is added by the network side on the basis of the ZP-CSI-RS resource configuration supported in LTE R11. The network side characterizes the DM-IMR configuration by the 16+Q-bit or 16+X+Q-bit or X+Q-bit high-layer signalling, and indicates which part of REs in which one or more ZP-CSI-RS resources are the DM-IMRs of the terminal to the terminal in the bitmap manner, wherein X represents the ZP-CSI-RS resource configuration which is added on the basis of LTE R11, and X is a positive integer; and Q represents which part of REs in each ZP-CSI-RS resource are employed as the DM-IMRs of the terminal. For example, when the DM-IMR resource configuration is the ZP-CSI-RS resource configuration supported in LTE R11, the DM-IMR resource configuration may be characterized by the 16+2 (Q=2)-bit high-layer signalling, wherein 16 bits are configured to indicate the one or more ZP-CSI-RS resources to the terminal, Q is configured to indicate which REs in these ZP-CSI-RS resources are employed as the DM-IMRs of the terminal to the terminal, and for example, it is indicated that the first two REs in each ZP-CSI-RS resource in these ZP-CSI-RS resources are configured into the DM-IMRs when 2-bit high-layer signalling is 10; it is indicated that the latter two REs in each ZP-CSI-RS resource in these ZP-CSI-RS resources are configured into the DM-IMRs when 2-bit high-layer signalling is 01; and all the REs in each ZP-CSI-RS resource in these ZP-CSI-RSs are configured into the DM-IMRs when 2-bit high-layer signalling is 11.

Step 2: the DM-IMRs configured for the interference measurement of the current target data channel are notified to the terminal, specifically including the following two cases.

Case 1: under the condition that there is only one set of DM-IMRs, the network side usually indicates one or more ZP-CSI-RS resources (it is supposed that the DM-IMRs determined in Step 1 include N ZP-CSI-RS resources and N is an integer more than 1) in the DM-IMRs determined in Step 1 to the terminal through physical-layer signalling for the interference measurement of the target data channel, specifically including: the network side indicates the one or more ZP-CSI-RS resources in the DM-IMRs determined in Step 1 to the terminal through N-bit physical-layer signalling, and indicates the one or more ZP-CSI-RS resources in the DM-IMRs determined in Step 1 to the terminal through an N-bit bitmap for the interference measurement of the current target data channel; or, the network side indicates the ZP-CSI-RS resource in the DM-IMRs determined in Step 1 to the terminal through $\lceil \log_2 N \rceil$-bit physical-layer signalling for the interference measurement of the current target data channel.

Case 2: under the condition that there are multiple sets of DM-IMRs, the network side usually indicates one or more sets of DM-IMRs (it is supposed that there are N sets of DM-IMRs determined in Step 1 and N is an integer more than 1) in the DM-IMRs determined in Step 1 to the terminal through physical-layer signalling for the interference measurement of the target data channel, specifically including: the network side indicates the one or more sets of DM-IMRs in the DM-IMRs determined in Step 1 to the terminal through N-bit physical-layer signalling, and indicates the one or more sets of DM-IMRs in the DM-IMRs determined in Step 1 to the terminal through an N-bit bitmap for the interference measurement of the current target data channel; or, the network side indicates one set of DM-IMRs in the DM-IMRs determined in Step 1 to the terminal through $\lceil \log_2 N \rceil$-bit physical-layer signalling for the interference measurement of the current target data channel.

For a specified user, the network side only performs puncturing or rate matching on REs of the DM-IMRs configured to the user on a bandwidth, which bears the target data channel, of the user.

For the specified user, the network side only performs puncturing or rate matching on the REs of the DM-IMRs configured to the user on a sub-frame, which bears the target data channel, of the user.

A target user receives information of the DM-IMRs configured by the network side; and a UE side performs data de-mapping in a manner the same as that adopted by the network side on the sub-frame which bears the target data channel: if the network side performs rate matching on the REs of the DM-IMRs configured to the user, the UE side determines as a default that the REs for transmitting the DM-IMRs do not have any data corresponding to the target data channel, and if the network side performs puncturing on the REs of the DM-IMRs configured to the user, the UE side determines that signals received on these REs are still data of the target data channel of the user.

The target user determines the number of the DM-IMRs or ZP-CSI-RSs configured by the network side and RE resource positions corresponding to each set of DM-IMRs or each ZP-CSI-RS according to the information of the DM-IMRs configured by the network side.

The target user estimates interference by virtue of the RE resource positions corresponding to each set of DM-IMRs or each ZP-CSI-RS respectively.

The target user performs interference compression or interference elimination processing on the basis of each piece of estimated interference information by adopting a receiving detection algorithm, and detects data information of the target data channel.

Embodiment 7

A network side configures DM-IMRs for a terminal, wherein REs configured into the DM-IMRs are double-antenna port CSI-RS resources supported in LTE R11 or REs corresponding to double-antenna port CSI-RS resources which are added by the network side on the basis of a double-antenna port CSI-RS resource configuration supported in LTE R11. Specifically, the DM-IMRs configured to the terminal by the network side include one or more double-antenna port CSI-RS resources. FIG. 10(a)/10(b) shows all REs which may be configured into double-antenna port CSI-RSs supported in LTE R11 in a sub-frame in a system under a normal CP condition, wherein each sequence number represents a resource which may be configured into a double-antenna port CSI-RS. FIG. 11(a)/11(b) shows all RE resources which may be configured into double-antenna port CSI-RSs supported in LTE R11 in a sub-frame in the system under an extended CP condition, wherein each sequence number represents a resource which may be configured into a double-antenna port CSI-RS. The double-antenna port CSI-RS resources mentioned here also include the double-antenna port CSI-RS resources which will be added on the basis of the double-antenna port CSI-RS resource configuration supported in LTE R11 in the future, and for example, a PDCCH area is removed in a new carrier type, which may cause addition of new double-antenna port CSI-RS resources in the PDCCH area in the new carrier type.

The network side indicates the DM-IMRs to the terminal in one of manners as follows.

Manner 1: the network side notifies the DM-IMRs to the terminal through high-layer signalling, wherein the DM-IMRs include one or more double-antenna port CSI-RS resources. Specifically, the network side adds a DM-IMR IE configuration item which is configured to indicate a resource configuration condition of the DM-IMRs in the high-layer signalling, wherein the IE configuration item at least includes one of:

DM-IMR IDs, configured to distinguish different sets of DM-IMRs, the DM-IMR IDs being integers valued from 1 to maxN, wherein maxN indicates that the network side may configure at most maxN sets of DM-IMRs to one terminal; and a DM-IMR configuration, configured to indicate RE resource positions of the DM-IMRs in each PRB resource which bears a target data channel, wherein the DM-IMR configuration is the double-antenna port CSI-RS resource configuration supported in LTE R11 or the double-antenna port CSI-RS resource configuration which is added by the network side on the basis of the double-antenna port CSI-RS resource configuration supported in LTE R11. The network side characterizes the DM-IMR configuration by 32 or 32+X-bit high-layer signalling, and indicates which one or more double-antenna port CSI-RS resources in the double-antenna port CSI-RS resource configuration supported in LTE R11 or the double-antenna port CSI-RS resource configuration which is added by the network side on the basis of the double-antenna port CSI-RS resource configuration supported in LTE R11 are configured into the DM-IMRs of the terminal to the terminal in a bitmap manner, wherein X represents the double-antenna port CSI-RS resource configuration which is added on the basis of LTE R11, and X is a positive integer; or, the network side characterizes the DM-IMR configuration by $\lceil \log_2 32 \rceil$ or $\lceil \log_2(32+Y) \rceil$-bit high-layer signalling, and indicates which double-antenna port CSI-RS resource in the double-antenna port CSI-RS resource configuration supported in LTE R11 or the double-antenna port CSI-RS resource configuration which is added on the basis of the double-antenna port CSI-RS resource configuration supported in LTE R11 is the DM-IMR of the terminal to the terminal.

Manner 2: the network side configures the DM-IMRs through high-layer signalling, the DM-IMRs including one or more double-antenna port CSI-RS resources, and the network side dynamically indicates which one or more double-antenna port CSI-RS resources therein are configured for interference measurement of the current target data channel to the terminal through physical-layer signalling, specifically including the following steps:

Step 1: the network side configures the DM-IMRs to the terminal through high-layer signalling, and specifically, the network side adds a DM-IMR IE configuration item which is configured to indicate the resource configuration condition of the DM-IMRs in the high-layer signalling, wherein the IE configuration item at least includes one of:

the DM-IMR IDs, configured to distinguish different sets of DM-IMRs, the DM-IMR IDs being integers valued from 1 to maxN, wherein maxN indicates that the network side may configure at most maxN sets of DM-IMRs to one terminal; and the DM-IMR configuration, configured to indicate the RE resource positions of the DM-IMRs in each PRB resource which bears the target data channel, wherein the DM-IMRs are configured into the double-antenna port CSI-RS resource configuration supported in LTE R11 or the double-antenna port CSI-RS resource configuration which is added by the network side on the basis of the double-antenna port CSI-RS resource configuration supported in LTE R11. The network side characterizes the DM-IMR configuration by the 32 or 32+X-bit high-layer signalling, and indicates which one or more double-antenna port CSI-RS resources in the double-antenna port CSI-RS resource configuration supported in LTE R11 or the double-antenna port CSI-RS resource configuration which is added by the network side on the basis of the double-antenna port CSI-RS resource configuration supported in LTE R11 are configured into the DM-IMRs of the terminal to the terminal in the bitmap manner, wherein X represents the double-antenna port CSI-RS resource configuration which is added on the basis of LTE R11, and X is a positive integer; or, the network side characterizes the DM-IMR configuration by the $\lceil \log_2 32 \rceil$ or $\lceil \log_2(32+Y) \rceil$-bit high-layer signalling, and indicates which double-antenna port CSI-RS resource in the double-antenna port CSI-RS resource configuration supported in LTE R11 or the double-antenna port CSI-RS resource configuration which is added on the basis of the double-antenna port CSI-RS resource configuration supported in LTE R11 is the DM-IMR of the terminal to the terminal.

Step 2: the DM-IMRs configured for the interference measurement of the current target data channel are notified to the terminal, specifically including the following two cases.

Case 1: under the condition that there is only one set of DM-IMRs, the network side usually indicates one or more double-antenna port CSI-RS resources (it is supposed that the DM-IMRs determined in Step 1 include N double-antenna port CSI-RS resources and N is an integer more than 1) in the DM-IMRs determined in Step 1 to the terminal through physical-layer signalling for the interference measurement of the target data channel, specifically including: the network side indicates the one or more double-antenna port CSI-RS resources in the DM-IMRs determined in Step 1 to the terminal through N-bit physical-layer signalling, and indicates the one or more double-antenna port CSI-RS resources in the DM-IMRs determined in Step 1 to the terminal through an N-bit bitmap for the interference measurement of the target data channel; or, the network side indicates the double-antenna port CSI-RS resource in the DM-IMRs determined in Step 1 to the terminal through $\lceil \log_2 N \rceil$-bit physical-layer signalling for the interference measurement of the current target data channel.

Case 2: under the condition that there are multiple sets of DM-IMRs, the network side usually indicates one or more sets of DM-IMRs (it is supposed that there are N sets of DM-IMRs determined in Step 1 and N is an integer more than 1) in the DM-IMRs determined in Step 1 to the terminal through physical-layer signalling for the interference measurement of the target data channel, specifically including: the network side indicates the one or more sets of DM-IMRs in the DM-IMRs determined in Step 1 to the terminal through N-bit physical-layer signalling, and indicates the one or more sets of DM-IMRs in the DM-IMRs determined in Step 1 to the terminal through an N-bit bitmap for the interference measurement of the current target data channel; or, the network side indicates one set of DM-IMRs in the DM-IMRs determined in Step 1 to the terminal through $\lceil \log_2 N \rceil$-bit physical-layer signalling for the interference measurement of the current target data channel.

For a specified user, the network side only performs puncturing or rate matching on REs of the DM-IMRs configured to the user on a bandwidth, which bears the target data channel, of the user.

For the specified user, the network side only performs puncturing or rate matching on the REs of the DM-IMRs configured to the user on a sub-frame, which bears the target data channel, of the user.

A target user receives information of the DM-IMRs configured by the network side; and a UE side performs data de-mapping in a manner the same as that adopted by the network side on the sub-frame which bears the target data channel: if the network side performs rate matching on the REs of the DM-IMRs configured to the user, the UE side determines as a default that the REs for transmitting the DM-IMRs do not have any data corresponding to the target data channel, and if the network side performs puncturing on the REs of the DM-IMRs configured to the user, the UE side determines that signals received on these REs are still data of the target data channel of the user.

The target user determines the number of the DM-IMRs or double-antenna port CSI-RSs configured by the network side and RE resource positions corresponding to each set of DM-IMRs or each double-antenna port CSI-RS according to the information of the DM-IMRs configured by the network side.

The target user estimates interference by virtue of the RE resource positions corresponding to each set of DM-IMRs or each double-antenna port CSI-RS respectively.

The target user performs interference compression or interference elimination processing on the basis of each piece of estimated interference information by adopting a receiving detection algorithm, and detects data information of the target data channel.

Embodiment 8

Figure 16:
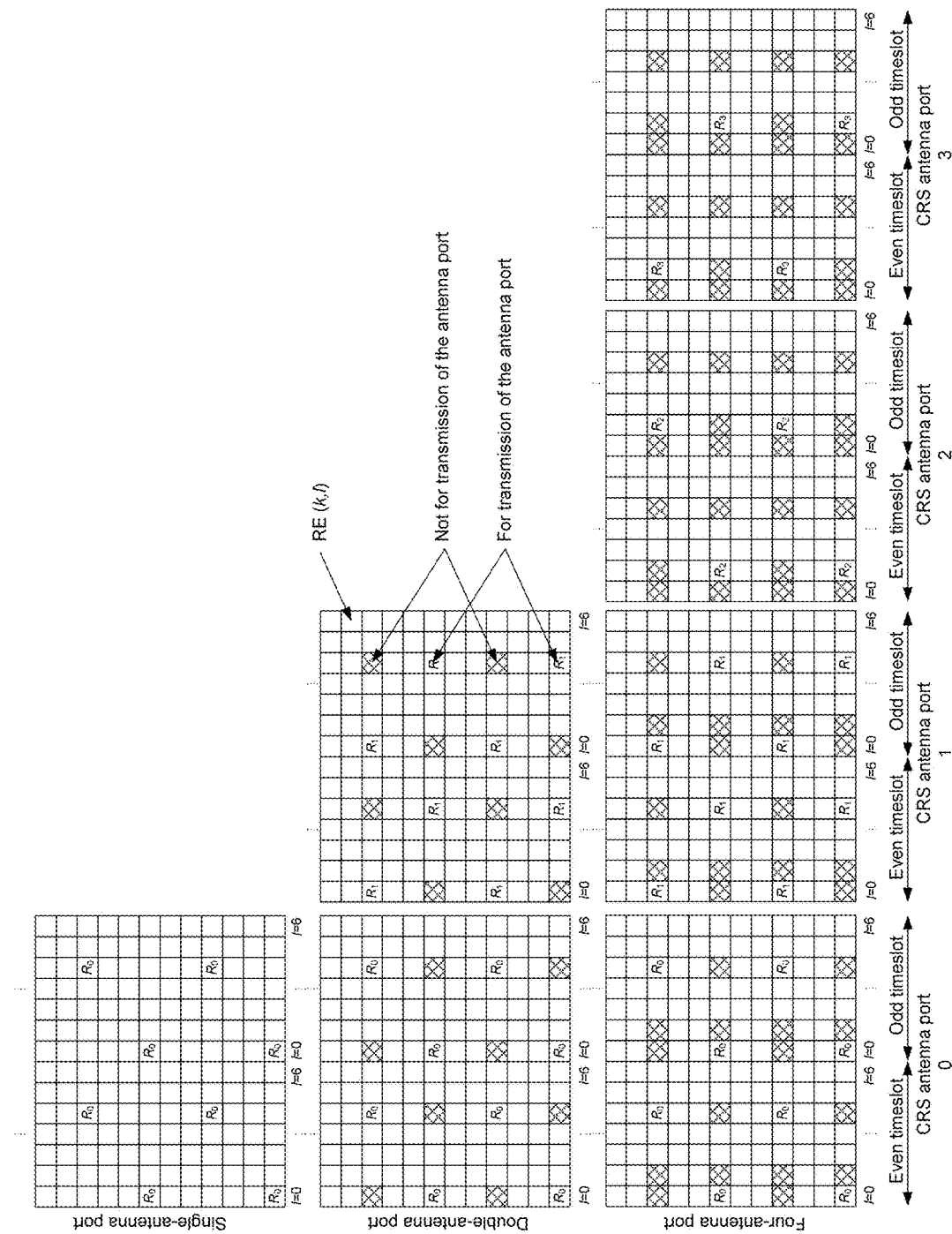
FIG. 16 is a diagram illustrating a CRS resource under a normal CP condition.
Figure 17:
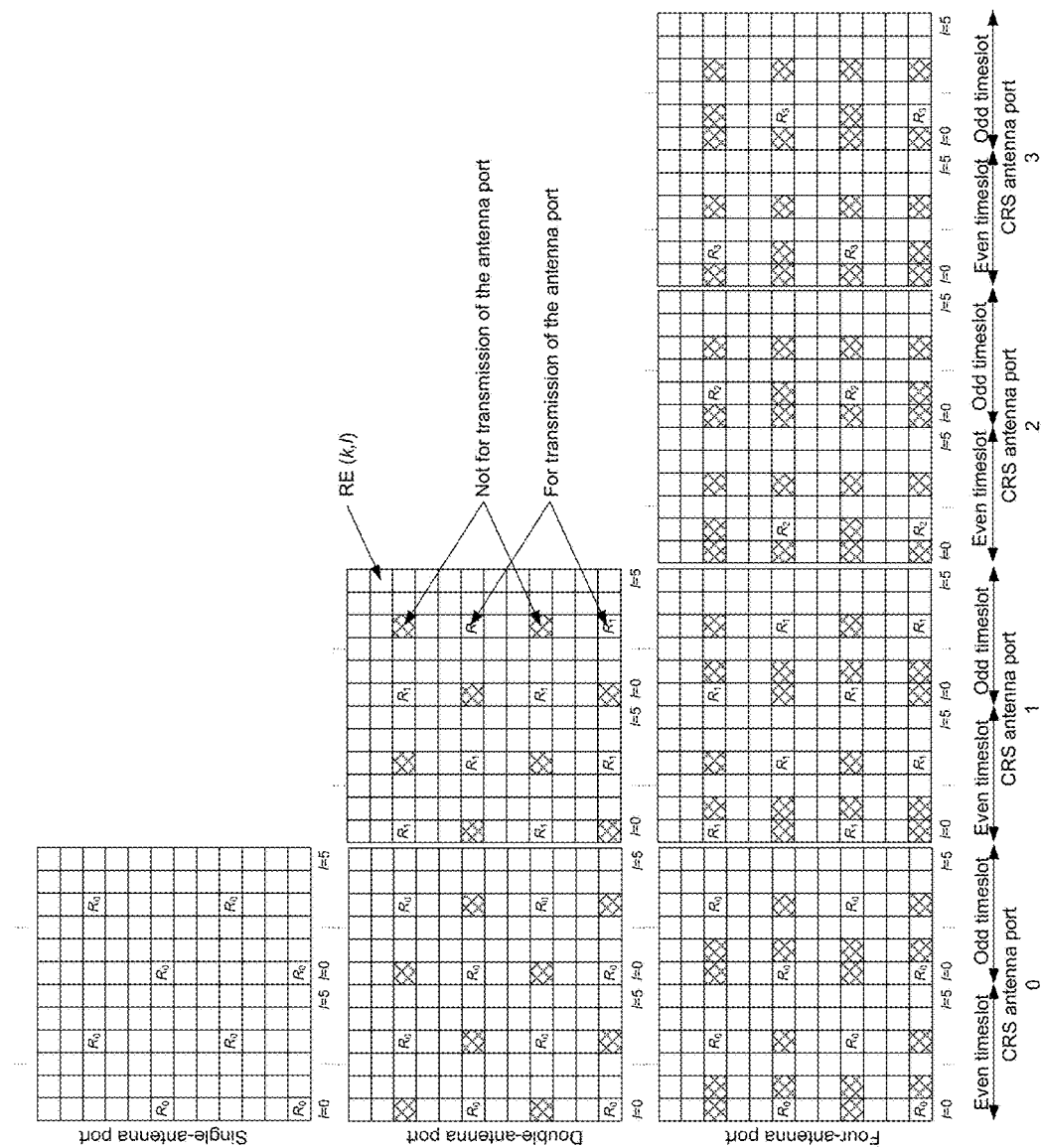
FIG. 17 is a diagram illustrating a CRS resource under an extended CP condition.

A network side configures DM-IMRs for a terminal, wherein REs configured into the DM-IMRs are RE resources at a position of a serving cell CRS is located or a part of RE resources at the position where the serving cell CRS is located or RE resources at a position where an interference cell CRS is located or a part of RE resources at the position where the interference cell CRS is located. FIG. 16 and FIG. 17 are diagrams of a CRS resource under a normal CP condition and an extended CP condition according to the existing technology respectively, wherein $R_0$ represents an RE resource occupied by a CRS antenna port 0, $R_1$ represents an RE resource occupied by a CRS antenna port 1, $R_2$ represents an RE resource occupied by a CRS antenna port 2 and $R_3$ represents an RE resource occupied by a CRS antenna port 3.

The network side indicates the DM-IMRs to the terminal in one of manners as follows.

Manner 1: the network side notifies the DM-IMRs to the terminal through high-layer signalling. Specifically, the network side adds a DM-IMR IE configuration item which is configured to indicate a resource configuration condition of the DM-IMRs in the high-layer signalling, wherein the IE configuration item at least includes one of:

DM-IMR IDs, configured to distinguish different sets of DM-IMRs, the DM-IMR IDs being integers valued from 1 to maxN, wherein maxN indicates that the network side may configure at most maxN sets of DM-IMRs to one terminal; and a DM-IMR configuration, configured to indicate RE resource positions of the DM-IMRs in each PRB resource which bears a target data channel, wherein the DM-IMR configuration is position indication information of the RE resources at the position where the serving cell CRS is located or the part of RE resources at the position where the serving cell CRS is located or the RE resources at the position where the interference cell CRS is located or the part of RE resources at the position where the interference cell CRS is located. The network side characterizes the DM-IMR configuration through 24-bit high-layer signalling, and indicates which REs in the RE resources at the position where the serving cell CRS is located or the RE resources at the position where the interference cell CRS is located are the DM-IMRs of the terminal to the terminal in a bitmap manner; or, the network side characterizes the DM-IMR configuration through 24+V-bit high-layer signalling, and indicates whether the REs at the position where the serving cell CRS or the interference cell CRS (value of $V_{shift}$) are located and which REs therein are the DM-IMRs of the terminal to the terminal in the bitmap manner, wherein V is a positive integer, and V bits are configured to represent whether the DM-IMRs are from the serving cell CRS or the interference cell CRS, i.e. the value of $V_{shift}$ corresponding to the CRS resource positions of the DM-IMRs; or Z sets of patterns of a part of CRS REs are pre-defined, and the network side characterizes the DM-IMR configuration through Z or $\lceil \log_2 Z \rceil$-bit high-layer signalling, and indicates which set or sets in the Z sets of patterns of the part of CRS REs are the DM-IMRs of the terminal to the terminal, wherein Z is an integer more than 1.

Manner 2: the network side configures multiple sets of DM-IMRs through high-layer signalling, the DM-IMRs including the RE resources at the position where the serving cell CRS is located or the part of RE resources at the position where the serving cell CRS is located or the RE resources at the position where the interference cell CRS is located or the part of RE resources at the position where the interference cell CRS is located, and dynamically the network side indicates which set or sets of DM-IMRs therein are configured for interference measurement of the current target data channel to the terminal through physical-layer signalling, specifically including the following steps:

Step 1: the network side configures the DM-IMRs to the terminal through the high-layer signalling, and specifically, the network side adds a DM-IMR IE configuration item which is configured to indicate the resource configuration condition of the DM-IMRs in the high-layer signalling, wherein the IE configuration item at least includes one of:

the DM-IMR IDs, configured to distinguish different sets of DM-IMRs, the DM-IMR IDs being integers valued from 1 to maxN, wherein maxN indicates that the network side may configure at most maxN sets of DM-IMRs to one terminal; and the DM-IMR configuration, configured to indicate the RE resource positions of the DM-IMRs in each PRB resource which bears the target data channel, wherein the DM-IMR configuration is the position indication information of the RE resources at the position where the serving cell CRS is located or the part of RE resources at the position where the serving cell CRS is located or the RE resources at the position where the interference cell CRS is located or the part of RE resources at the position where the interference cell CRS is located. The network side characterizes the DM-IMR configuration through the 24-bit high-layer signalling, and indicates which REs in the RE resources at the position where the serving cell CRS is located or the RE resources at the position where the interference cell CRS is located are the DM-IMRs of the terminal to the terminal in the bitmap manner; or, the network side characterizes the DM-IMR configuration through the 24+V-bit high-layer signalling, and indicates whether the REs at the position where the serving cell CRS or the interference cell CRS (value of $V_{shift}$) are located and which REs therein are the DM-IMRs of the terminal to the terminal in the bitmap manner, wherein V is a positive integer, and V bits are configured to represent whether the DM-IMRs are from the serving cell CRS or the interference cell CRS, i.e. the value of $V_{shift}$ or physical cell ID related information corresponding to the CRS resource positions of the DM-IMRs; or the Z sets of patterns of the part of CRS REs are pre-defined, and the network side characterizes the DM-IMR configuration through the Z or $\lceil \log_2 Z \rceil$-bit high-layer signalling, and indicates which set or sets in the Z sets of patterns of the part of CRS REs are the DM-IMRs of the terminal to the terminal, wherein Z is an integer more than 1.

Step 2: the DM-IMRs configured for the interference measurement of the current target data channel are notified to the terminal. Specifically, the network side indicates one or more sets of DM-IMRs (it is supposed that there are N sets of DM-IMRs determined in Step 1 and N is an integer more than 1) in the DM-IMRs determined in Step 1 to the terminal through physical-layer signalling for the interference measurement of the current target data channel, specifically including: the network side indicates which set or sets of DM-IMRs in the DM-IMRs determined in Step 1 to the terminal through N-bit physical-layer signalling, and indicates which set or sets of DM-IMRs in the DM-IMRs determined in Step 1 to the terminal through an N-bit bitmap for the interference measurement of the current target data channel; or, the network side indicates one set of DM-IMRs in the DM-IMRs determined in Step 1 to the terminal through $\lceil \log_2 N \rceil$-bit physical-layer signalling for the interference measurement of the current target data channel.

For a specified user, the network side only performs puncturing or rate matching on REs of the DM-IMRs configured for the user on a bandwidth, which bears the target data channel, of the user.

For the specified user, the network side only performs puncturing or rate matching on the REs of the DM-IMRs configured for the user on a sub-frame, which bears the target data channel, of the user.

A target user receives information of the DM-IMRs configured by the network side; and a UE side performs data de-mapping in a manner the same as that adopted by the network side on the sub-frame which bears the target data channel: if the network side performs rate matching on the REs of the DM-IMRs configured to the user, the UE side determines as a default that the REs for transmitting the DM-IMRs do not have any data corresponding to the target data channel, and if the network side performs puncturing on the REs of the DM-IMRs configured to the user, the UE side determines that signals received on these REs are still data of the target data channel of the user.

The target user determines the DM-IMRs configured by the network side and the RE resource positions corresponding to each set of DM-IMRs according to the information of the DM-IMRs configured by the network side.

The target user estimates interference by virtue of the RE resource positions corresponding to each set of DM-IMRs respectively.

The target user performs interference compression or interference elimination processing on the basis of each piece of estimated interference information by adopting a receiving detection algorithm, and detects data information of the target data channel.

Embodiment 9

On the basis of the characteristics of the disclosure, a specific IMR configuration method and interference measurement manner include:

a network side configures DM-IMRs, wherein REs configured into the DM-IMRs are REs which may be configured into ZP-CSI-RSs, wherein the DM-IMRs may include one or more REs which may be configured into ZP-CSI-RSs. FIG. 8(a)/8(b) shows all REs which may be configured into ZP-CSI-RSs in a sub-frame in a system under a normal CP condition, wherein each sequence number represents a group of resources which may be configured into ZP-CSI-RSs. FIG. 9(a)/9(b) shows all RE resources which may be configured into ZP-CSI-RSs in a sub-frame in the system under an extended CP condition, wherein each sequence number represents a group of REs which may be configured into ZP-CSI-RSs.

Information of the DM-IMRs configured by the network side at least includes information of ZP-CSI-RSs configured into the DM-IMRs. A specific configuration manner includes:

Manner 1: indexes, for example, indexes i, j and k of the ZP-CSI-RSs configured for the DM-IMRs are directly indicated, wherein values of i, j and k are 0~15 (or 1~16) in 6(a)/6(b) or 7(a)/7(b); under the extended CP condition, a value range of i, j and k is 1~K, wherein K is the number of ZP-CSI-RSs which may be configured in the sub-frame after extension, K=16+X and X represents the number of added resources which may be configured into ZP-CSI-RSs in the sub-frame; and i, j and k are different.

Manner 2: a bitmap manner is adopted for indication, wherein one or more sets of ZP-CSI-RSs configured for the DM-IMRs are indicated by 16 bits on the basis of 6(a)/6(b) or 7(a)/7(b); and when the resources which may be configured into ZP-CSI-RSs in each sub-frame are extended, for example, the number of the ZP-CSI-RSs which may be configured is K, the ZP-CSI-RSs are indicated by K bits.

For a specified user, the network side only performs puncturing or rate matching on REs of the DM-IMRs configured to the user on a bandwidth, which bears the target data channel, of the user.

For the specified user, the network side only performs puncturing or rate matching on the REs of the DM-IMRs configured to the user on a sub-frame, which bears the target data channel, of the user.

UE receives the information of the DM-IMRs configured by the network side; and a UE side performs data de-mapping in a manner the same as that adopted by the network side on the sub-frame which bears the target data channel: if the network side performs rate matching on the REs of the DM-IMRs configured to the user, the UE side determines as a default that the REs for transmitting the DM-IMRs do not have any data corresponding to the target data channel, and if the network side performs puncturing on the REs of the DM-IMRs configured to the user, the UE side determines that signals received on these REs are still data of the target data channel of the user.

The target user determines the number of the ZP-CSI-RSs configured into the DM-IMRs configured by the network side and RE resource positions corresponding to each ZP-CSI-RS according to the information of the DM-IMRs configured by the network side.

The target user estimates interference by virtue of the RE resource positions corresponding to each ZP-CSI-RS respectively.

The target user performs interference compression or interference elimination processing on the basis of each piece of estimated interference information by adopting a receiving detection algorithm, and detects data information of the target data channel.

Embodiment 10

DM-IMRs configured for a target user by a network side are one or more ZP-CSI-RS resources, and ZP-CSI-RS resource indexes or resource configuration or resource positions of the DM-IMRs are notified to the target user through high-layer signalling and/or physical-layer signalling. Wherein, the DM-IMRs exist and only exist in a PRB and sub-frame which bear a target data channel.

Figure 18:
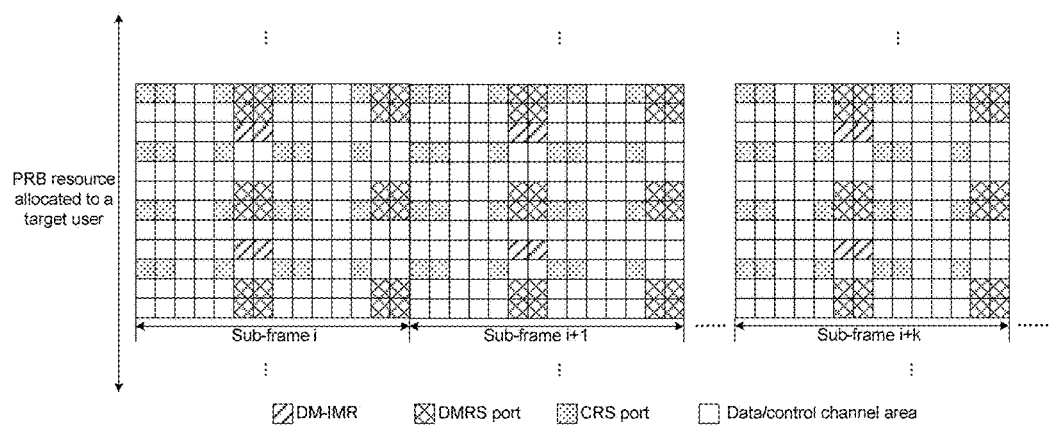
FIG. 18 is a diagram illustrating a DM-IMR according to application embodiments 10 and 11 of the disclosure.

For example, under a normal CP condition, the network side configures a ZP-CSI-RS resource to the target user, an ZP-CSI-RS resource index (or resource configuration) being 0, and the network side notifies the DM-IMR to the target user through high-layer signalling and/or physical-layer signalling. The DM-IMRs are configured as shown in FIG. 18: the DM-IMRs "" exist and only exist in each sub-frame and each PRB of resources where a PDSCH/ePDCCH of the target user is located, and four REs exist in each PRB (corresponding to a ZP-CSI-RS resource configuration, the ZP-CSI-RS resource configuration being 0 in the embodiment); the target user sends zero power signals on the DM-IMRs, and the target user performs PDSCH/ePDCCH mapping on these DM-IMRs in a rate matching manner; and therefore, signals received on the DM-IMRs are correspondingly interference signals of the target user on each sub-frame and each PRB.

The target user performs interference elimination or interference suppression on a receiving side to achieve higher PDSCH or ePDCCH demodulation/decoding performance by means of the interference signals measured on the DM-IMRs.

Embodiment 11

DM-IMRs configured for a target user by a network side are one or more ZP-CSI-RS resources, and ZP-CSI-RS indexes (or resource configuration or resource positions) in the DM-IMRs and a corresponding CSI-RS sub-frame configuration are notified to the target user through high-layer signalling and/or physical-layer signalling. Herein, the DM-IMRs exist and only exist in a PRB which bears a target data channel on the frequency domain, and the CSI-RS sub-frame configuration is configured to determine a sub-frame where the DM-IMRs are located on the time domain.

The network side configures M sets of ZP-CSI-RS resources for the target user, including:

configuring the first set of ZP-CSI-RS resources in a manner that: a ZP-CSI-RS resource index (configuration) is n0 and a corresponding CSI-RS sub-frame configuration includes a CSI-RS period M and a sub-frame offset 0;

configuring the second set of ZP-CSI-RS resources in a manner that: a ZP-CSI-RS resource index (configuration) is n0 and a corresponding CSI-RS sub-frame configuration includes a CSI-RS period M and a sub-frame offset 1;

operating the rest in the same manner; and configuring the Mth set of ZP-CSI-RS resources in a manner that: a ZP-CSI-RS resource index (configuration) is n0 and a corresponding CSI-RS sub-frame configuration includes a CSI-RS period M and a sub-frame offset M−1.

By such configurations, it is ensured that each sub-frame has the ZP-CSI-RS resource configuration n0 available for the DM-IMRs of the target user.

For example, under a normal CP condition, the DM-IMRs are configured as shown in FIG. 18: the DM-IMRs "▨" exist and only exist in each sub-frame and each PRB of resources where a PDSCH/ePDCCH of the target user is located, and four REs exist in each PRB (corresponding to a ZP-CSI-RS resource configuration, the ZP-CSI-RS resource configuration being 0 in the embodiment); the target user sends zero power signals on the DM-IMRs, and the target user performs PDSCH/ePDCCH mapping on these DM-IMRs in a rate matching manner; and therefore, signals received on the DM-IMRs are correspondingly interference signals of the target user on each sub-frame and each PRB.

The target user performs interference elimination or interference suppression on a receiving side to achieve higher PDSCH or ePDCCH demodulation/decoding performance by means of the interference signals measured on the DM-IMRs.

Embodiment 12

DM-IMRs configured for a target user by a network side are one or more ZP-CSI-RS resources. Herein, the DM-IMRs exist and only exist in a PRB which bears a target data channel on the frequency domain, and a CSI-RS sub-frame configuration is configured to determine a sub-frame where the DM-IMRs are located on the time domain.

The network side configures M sets of ZP-CSI-RS resources to the target user, including:

configuring the first set of ZP-CSI-RS resources in a manner that: a ZP-CSI-RS resource index (configuration) is n0 and a corresponding CSI-RS sub-frame configuration includes a CSI-RS period M and a sub-frame offset 0;

configuring the second set of ZP-CSI-RS resources in a manner that: a ZP-CSI-RS resource index (configuration) is n1 and a corresponding CSI-RS sub-frame configuration includes a CSI-RS period M and a sub-frame offset 1;

operating the rest in the same manner; and configuring the Mth set of ZP-CSI-RS resources in a manner that: a ZP-CSI-RS resource index (configuration) is nM and a corresponding CSI-RS sub-frame configuration includes a CSI-RS period M and a sub-frame offset M−1.

By such configurations, it is ensured that each sub-frame has the ZP-CSI-RS resources available for the DM-IMRs of the target user.

Figure 19:
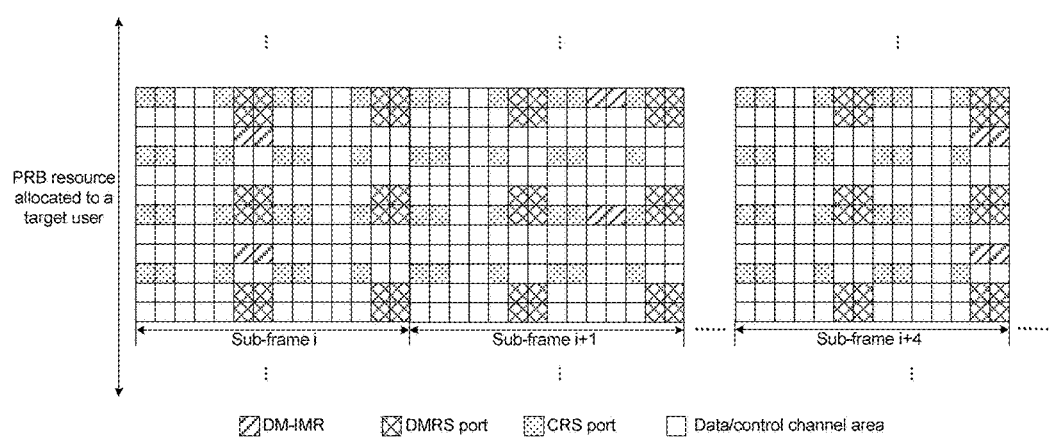
FIG. 19 is a diagram illustrating an IMR according to an application embodiment 12 of the disclosure.

For example, under a normal CP condition, the DM-IMRs are configured as shown in FIG. 19: the DM-IMRs "▨" exist and only exist in each sub-frame and each PRB pair of resources where a PDSCH/ePDCCH of the target user is located, four REs exist in each PRB pair (corresponding to a ZP-CSI-RS resource configuration, the ZP-CSI-RS resource configuration being 0 in the embodiment), and different ZP-CSI-RS resource configurations are adopted in different sub-frames, that is, positions of the DM-IMRs "▨" in different sub-frames are different; the target user sends zero power signals on the DM-IMRs, and the target user performs PDSCH/ePDCCH mapping on these DM-IMRs in a rate matching manner; and therefore, signals received on the DM-IMRs are correspondingly interference signals of the target user on each sub-frame and each PRB.

The network side notifies ZP-CSI-RS indexes (or resource configuration or resource positions) in the DM-IMRs and the corresponding CSI-RS sub-frame configuration to the target user through high-layer signalling and/or physical-layer signalling.

The target user performs interference elimination or interference suppression on a receiving side to achieve higher PDSCH or ePDCCH demodulation/decoding performance by virtue of the interference signals measured on the DM-IMRs.

Embodiment 13

A network side configures two sets of DM-IMRs configured to measure interference of different interference sources respectively for a target user, wherein each set of DM-IMRs consists of one or more ZP-CSI-RS resources. The ZP-CSI-RS resources exist and only exist in a sub-frame and PRB resource which bear a target data channel.

Figure 20:
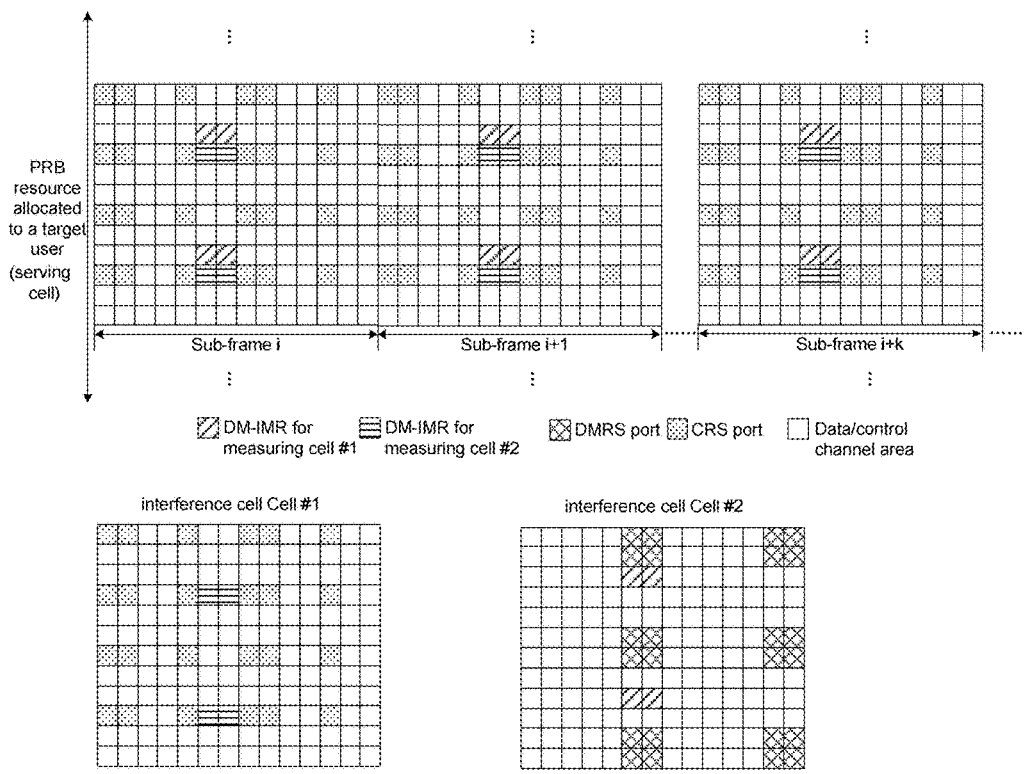
FIG. 20 is a diagram illustrating an IMR according to an application embodiment 13 of the disclosure.

For example, under a normal CP condition, the first set of DM-IMRs (with a DM-IMR ID 0) are configured into ZP-CSI-RS resources corresponding to a ZP-CSI-RS resource configuration 0, the second set of DM-IMRs (with a DM-IMR ID 1) are configured into ZP-CSI-RS resources corresponding to a ZP-CSI-RS resource configuration 1, and the DM-IMRs are configured as shown in FIG. 20: the DM-IMRs "▨" and "▤" exist and only exist on each sub-frame and each PRB pair of resources where a data/control channel to be measured of the target user is located, and eight REs (corresponding to two ZP-CSI-RS resource configurations) exist in each PRB pair, wherein the DM-IMRs "▨" are mainly configured to measure interference of an interference cell cell#1, and the DM-IMRs "▤" are mainly configured to measure interference of an interference cell cell#2; the target user sends zero power signals on the DM-IMRs, a user of the interference cell cell#1 sends zero power signals on the DM-IMRs "▤", a user of the interference cell cell#2 sends zero power signals on the DM-IMRs "▨", the target user maps its data/control channel on the DM-IMRs in a rate matching manner, the user of the interference cell cell#1 maps its data/control channel on the DM-IMRs "▤" in the rate matching manner, and the user of the interference cell cell#2 maps its data/control channel on the DM-IMRs "▨" in the rate matching manner. Therefore, signals received on the DM-IMRs are correspondingly interference signals of the target user on each sub-frame and each PRB, and specifically, data/control channel interference signals from the interference cell cell#1 are measured on the DM-IMRs "▨", and data/control channel interference signals from the interference cell cell#2 are measured on the DM-IMRs "▤".

The network side notifies the DM-IMR IDs of the DM-IMRs and/or ZP-CSI-RS indexes (or resource configuration or resource positions) in each set of DM-IMRs to the target user through high-layer signalling and/or physical-layer signalling.

The target user performs interference elimination or interference suppression on a receiving side to achieve higher target data channel receiving performance by virtue of the interference signals measured on the DM-IMRs.

Embodiment 14

DM-IMRs configured to a target user by a network side are a part of RE resources at a position where a serving cell CRS of a target cell is located. The target user sends zero power signals on the DM-IMRs, and the DM-IMRs exist and only exist in a sub-frame and PRB resource where a target data channel to which interference is measured by the DM-IMRs is located.

Figure 21:
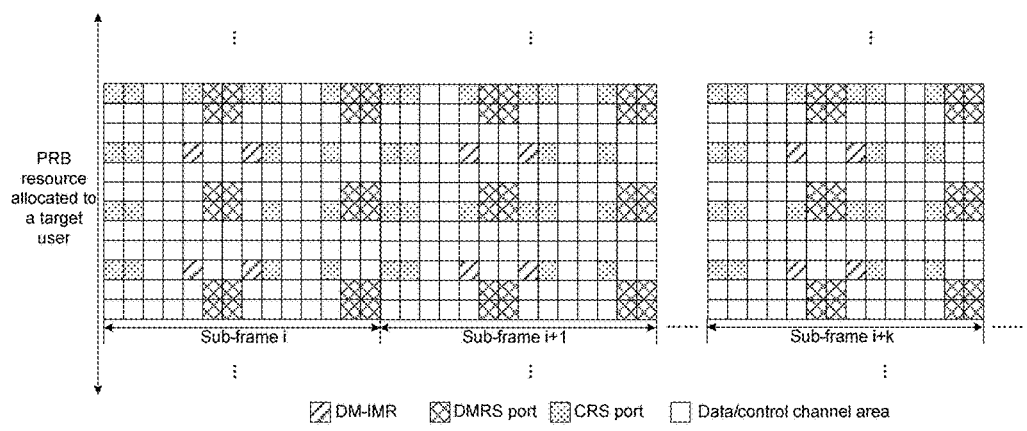
FIG. 21 is a diagram illustrating an IMR according to an application embodiment 14 of the disclosure.

For example, under a normal CP condition, configuration of the DM-IMRs is implemented as shown in FIG. 21: the DM-IMRs "" exist and only exist on each sub-frame and each PRB where a data/control channel to be demodulated/decoded of the target user is located, and the DM-IMRs "" in each PRB are a part of RE resources of the serving cell CRS of the target user; the target user sends zero power signals on the DM-IMRs, and the target user performs target data/control channel mapping on these DM-IMRs in a rate matching manner; and therefore, signals received on the DM-IMRs are correspondingly interference signals of the target user on each sub-frame and each PRB.

The network side notifies the target user of positions of the part of RE resources at the serving cell CRS of the target user in one of manners as follows:

Manner 1: the network side characterizes a DM-IMR configuration through 24-bit (a four-port CRS occupies totally 24 REs in a PRB pair under the normal CP condition) high-layer signalling, and indicates which RE resources in the resources at the position of the CRS are the DM-IMRs of the terminal to the terminal in a bitmap manner;

Manner 2: Z sets of patterns of a part of CRS REs are pre-defined, and the network side characterizes the DM-IMR configuration by Z-bit high-layer signalling, and indicates which set or sets in the Z sets of patterns of the part of CRS REs are the DM-IMRs of the terminal to the terminal in the bitmap manner, wherein Z is an integer more than 1; and Manner 3: Z sets of patterns of a part of CRS REs are pre-defined, and the network side characterizes the DM-IMR configuration by $\lceil \log_2 Z \rceil$-bit high-layer signalling, and indicates which set in the Z sets of patterns of the part of CRS REs are the DM-IMRs of the terminal to the terminal, wherein Z is an integer more than 1.

The target user performs interference elimination or interference suppression on a receiving side to achieve higher target data channel demodulation/decoding performance by virtue of the interference signals measured on the DM-IMRs.

Embodiment 15

DM-IMRs configured to a target user by a network side are a part of RE resources at a position where an interference cell CRS of the target user is located. The target user sends zero power signals on the DM-IMRs, and the DM-IMRs exist and only exist in a sub-frame and PRB resource where a target data channel to which interference is measured by the DM-IMRs is located.

Figure 22:
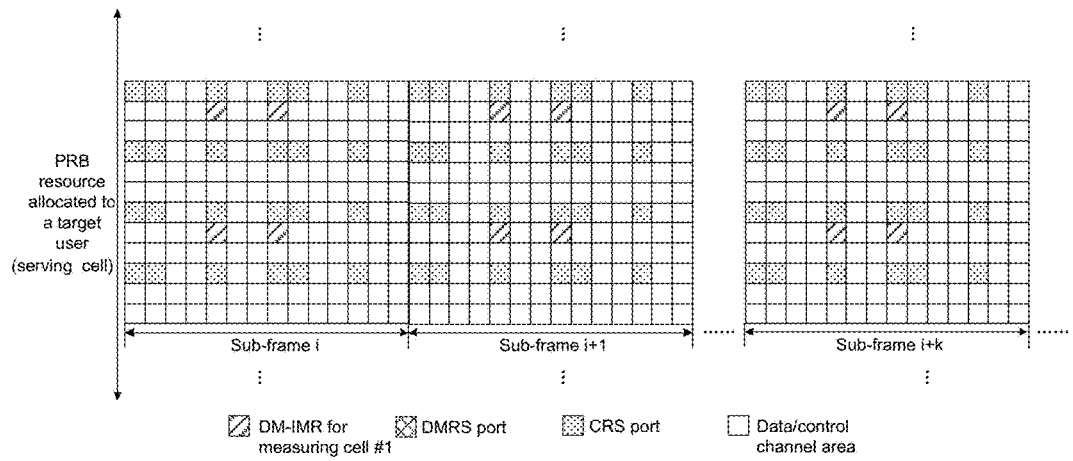
FIG. 22 is a diagram illustrating an IMR according to an application embodiment 15 of the disclosure.
Figure 22:
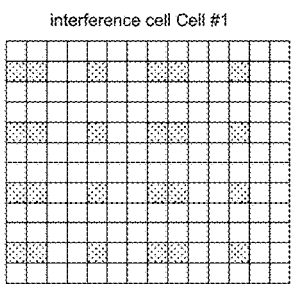

For example, under a normal CP condition, configuration of the DM-IMRs is implemented as shown in FIG. 22: the DM-IMRs "" exist and only exist on each sub-frame and each PRB where a data/control channel to be demodulated/decoded of the target user is located, and the DM-IMRs "" in each PRB are a part of RE resources at a position where an adjacent cell CRS of the target user is located; the target user sends zero power signals on the DM-IMRs, and the target user performs target data/control channel mapping on these DM-IMRs in a rate matching manner; and therefore, signals received on the DM-IMRs are correspondingly interference signals of the target user on each sub-frame and each PRB.

The network side notifies positions of the part of RE resources at the interference cell CRS of the target user to the target user in one of manners as follows:

Manner 1: the network side characterizes a DM-IMR configuration through 24-bit (a four-port CRS occupies totally 24 REs in a PRB pair under the normal CP condition) high-layer signalling, and indicates which RE resources in the resources at the position of the CRS are the DM-IMRs of the terminal to the terminal in a bitmap manner;

Manner 2: Z sets of patterns of a part of CRS REs are pre-defined, and the network side characterizes the DM-IMR configuration by Z-bit high-layer signalling, and indicates which set or sets in the Z sets of patterns of the part of CRS REs are the DM-IMRs of the terminal to the terminal in the bitmap manner, wherein Z is an integer more than 1;

Manner 3: Z sets of patterns of a part of CRS REs are pre-defined, and the network side characterizes the DM-IMR configuration by $\lceil \log_2 Z \rceil$-bit high-layer signalling, and indicates which set in the Z sets of patterns of the part of CRS REs are the DM-IMRs of the terminal to the terminal, wherein Z is an integer more than 1;

Manner 4: the network side notifies positions or corresponding shift values $V_{shift}$ or physical cell IDs of CRSs serving as DM-IMRs to the target user through high-layer and/or physical-layer signalling; and Manner 5: the network side characterizes the DM-IMR configuration by 24+V-bit high-layer signalling, and indicates the positions of the CRSs and RE resources configured as the DM-IMRs of the terminal in resources at the positions of the CRSs to the terminal in the bitmap manner, wherein V bits are configured to represent the positions or corresponding shift values $V_{shift}$ or physical cell IDs of the CRSs serving as DM-IMRs, the other 24 bits are configured to represent which RE resources in the resources at the positions of the CRSs are the DM-IMRs of the terminal, and V is a positive integer.

The target user performs interference elimination or interference suppression on a receiving side to achieve higher target data channel demodulation/decoding performance by means of the interference signals measured on the DM-IMRs.

Embodiment 16

DM-IMRs configured for a target user by a network side are a part of RE resources at a position where an interference cell CRS of the target user is located. The target user sends zero power signals on the DM-IMRs, and the DM-IMRs exist and only exist in a sub-frame and PRB resource where a target data channel to which interference is measured by the DM-IMRs is located.

Figure 23:
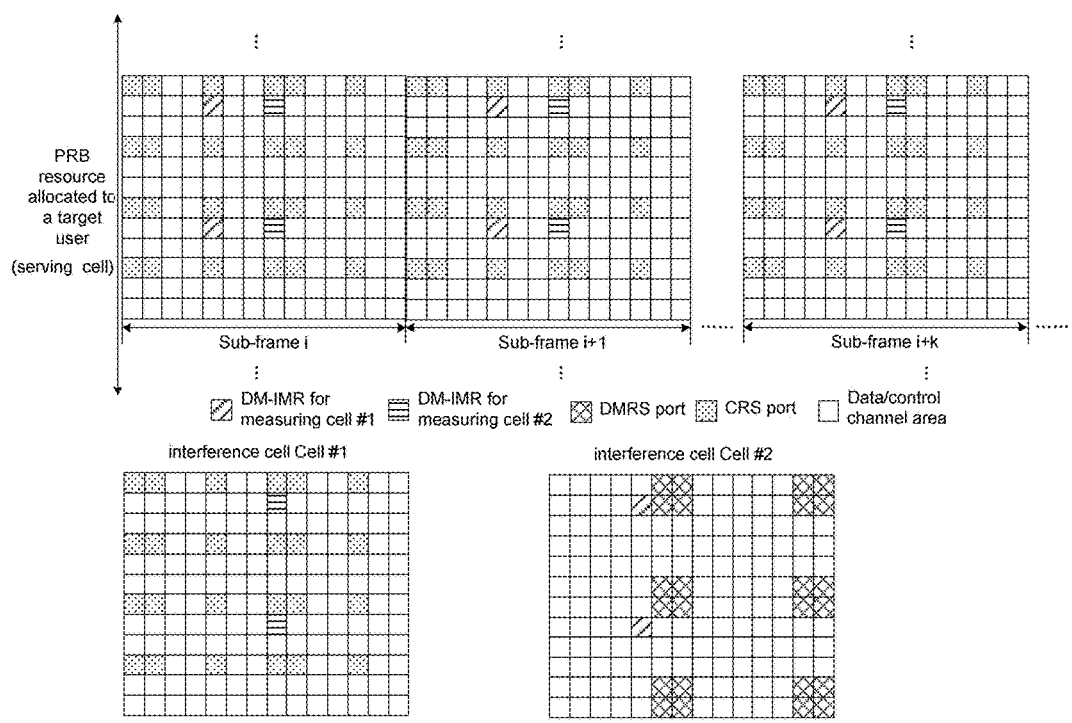
FIG. 23 is a diagram illustrating an IMR according to an application embodiment 16 of the disclosure.

For example, under a normal CP condition, the DM-IMRs are configured as shown in FIG. 23: the DM-IMRs "" and "" exist and only exist on each sub-frame and each PRB pair of resources where a data/control channel to be measured of the target user is located, and the DM-IMRs "" in each PRB are a part of RE resources at a position where an adjacent cell CRS of the target user is located, wherein the DM-IMRs "" are mainly configured to measure interference of an interference cell cell#1, and the DM-IMRs "" are mainly configured to measure interference of an interference cell cell#2; the target user sends zero power signals on the DM-IMRs, a user of the interference cell cell#1 sends zero power signals on the DM-IMRs "", a user of the interference cell cell#2 sends zero power signals on the DM-IMRs "", the target user maps its data/control channel on the DM-IMRs in a rate matching manner, the user of the interference cell cell#1 maps its data/control channel on the DM-IMRs "" in the rate matching manner, and the user of the interference cell cell#2 maps its data/control channel on the DM-IMRs "" in the rate matching manner. Therefore, signals received on the DM-IMRs are correspondingly interference signals of the target user on each sub-frame and each PRB, and specifically, data/control channel interference signals from the interference cell cell#1 are measured on the DM-IMRs "", and data/control channel interference signals from the interference cell cell#2 are measured on the DM-IMRs "".

The network side notifies the target user of positions of the part of RE resources at the interference cell CRS of the target user in one of manners as follows:

Manner 1: the network side characterizes a DM-IMR configuration through 24-bit (a four-port CRS occupies totally 24 REs in a PRB pair under the normal CP condition) high-layer signalling, and indicates which RE resources in the resources at the position of the CRS are the DM-IMRs of the terminal to the terminal in a bitmap manner;

Manner 2: Z sets of patterns of a part of CRS REs are pre-defined, and the network side characterizes the DM-IMR configuration by Z-bit high-layer signalling, and indicates which set or sets in the Z sets of patterns of the part of CRS REs are the DM-IMRs of the terminal to the terminal in the bitmap manner, wherein Z is an integer more than 1;

Manner 3: Z sets of patterns of a part of CRS REs are pre-defined, and the network side characterizes the DM-IMR configuration by $\lceil \log_2 Z \rceil$-bit high-layer signalling, and indicates which set in the Z sets of patterns of the part of CRS REs are the DM-IMRs of the terminal to the terminal, wherein Z is an integer more than 1;

Manner 4: the network side notifies positions or corresponding shift values $V_{shift}$ or physical cell IDs of CRSs serving as DM-IMRs to the target user through high-layer and/or physical-layer signalling; and Manner 5: the network side characterizes the DM-IMR configuration by 24+V-bit high-layer signalling, and indicates the positions of the CRSs and RE resources configured into the DM-IMRs of the terminal in resources at the positions of the CRSs to the terminal in the bitmap manner, wherein V bits are configured to represent the positions or corresponding shift values $V_{shift}$ or physical cell IDs of the CRSs serving as DM-IMRs, the other 24 bits are configured to represent which RE resources in the resources at the positions of the CRSs are the DM-IMRs of the terminal, and V is a positive integer.

The target user performs interference elimination or interference suppression on a receiving side to achieve higher target data channel demodulation/decoding performance by virtue of the interference signals measured on the DM-IMRs.

Embodiment 17

DM-IMRs configured to a target user by a network side are a part of RE resources at a position where a serving cell CRS of the target user is located, and adoption of different RE resources in the part of RE resources at the position where the CRS is located for demodulation interference measurement of the target user in different sub-frames is allowed. The target user sends zero power signals on the DM-IMRs, and the DM-IMRs exist and only exist in a sub-frame and PRB resource where a target data channel to which interference is measured by the DM-IMRs is located.

Figure 24:
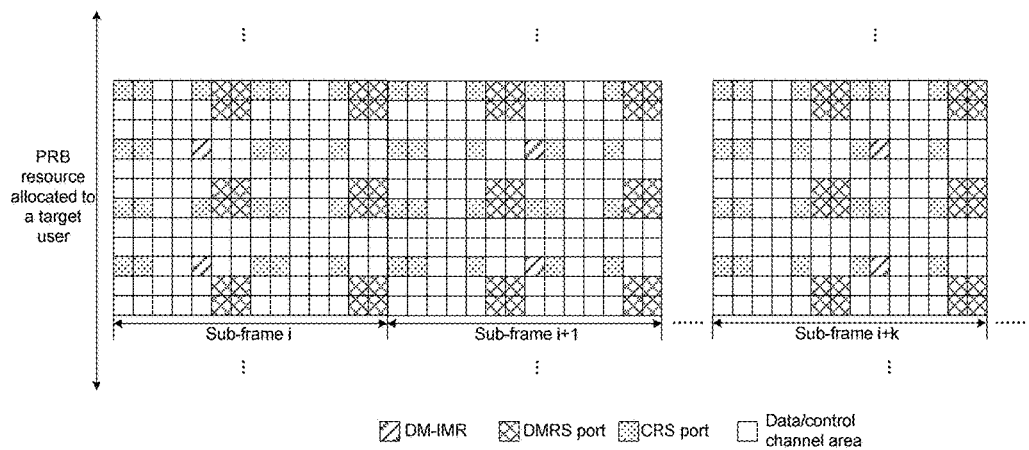
FIG. 24 is a diagram illustrating an IMR according to an application embodiment 17 of the disclosure.

For example, under a normal CP condition, configuration of the DM-IMRs is implemented as shown in FIG. 24: the DM-IMRs "" exist and only exist on each sub-frame and each PRB where a target data/control channel to be demodulated/decoded of the target user is located, the DM-IMRs "" in each PRB are a part of RE resources at the position where a serving cell CRS of the target user is located, and adoption of different RE resources in the part of RE resources at the position where the serving cell CRS is located for demodulation interference measurement of the target user in different sub-frames is allowed (in the embodiment, as shown in FIG. 24, a part of RE resources of a serving cell CRS port 0 in sub-frame i are configured for the demodulation interference measurement of the target user, a part of RE resources of a serving cell CRS port 1 in sub-frame i+1 are configured for the demodulation interference measurement of the target user, a part of RE resources of a serving cell CRS port 3 in sub-frame i+k are configured for the demodulation interference measurement of the target user, and the like); the target user sends zero power signals on the DM-IMRs, and the target user performs target data/control channel mapping on these DM-IMRs in a rate matching manner; and therefore, signals received on the DM-IMRs are correspondingly interference signals of the target user on each sub-frame and each PRB.

The network side notifies the target user of positions of the part of RE resources in an initial sub-frame at the serving cell CRS of the target user in one of manners as follows:

Manner 1: the network side characterizes a DM-IMR configuration through 24-bit (a four-port CRS occupies totally 24 REs in a PRB pair under the normal CP condition) high-layer signalling, and indicates which RE resources in the resources at the position of the CRS are the DM-IMRs of the terminal to the terminal in a bitmap manner;

Manner 2: Z sets of patterns of a part of CRS REs are pre-defined, and the network side characterizes the DM-IMR configuration by Z-bit high-layer signalling, and indicates which set or sets in the Z sets of patterns of the part of CRS REs are the DM-IMRs of the terminal to the terminal in the bitmap manner, wherein Z is an integer more than 1; and Manner 3: Z sets of patterns of a part of CRS REs are pre-defined, and the network side characterizes the DM-IMR configuration by $\lceil \log_2 Z \rceil$-bit high-layer signalling, and indicates which set in the Z sets of patterns of the part of CRS REs are the DM-IMRs of the terminal to the terminal, wherein Z is an integer more than 1.

The positions of a part of REs in the other sub-frames hop according to the pre-defined patterns.

The target user performs interference elimination or interference suppression on a receiving side to achieve higher target data channel demodulation/decoding performance by means of the interference signals measured on the DM-IMRs.

Embodiment 18

DM-IMRs configured for a target user by a network side are RE resources at a position where an interference cell CRS of the target user is located. The target user sends zero power signals on the DM-IMRs, and the DM-IMRs exist and only exist in a sub-frame and PRB resource where a target data channel to which interference is measured by the DM-IMRs is located.

Figure 25:
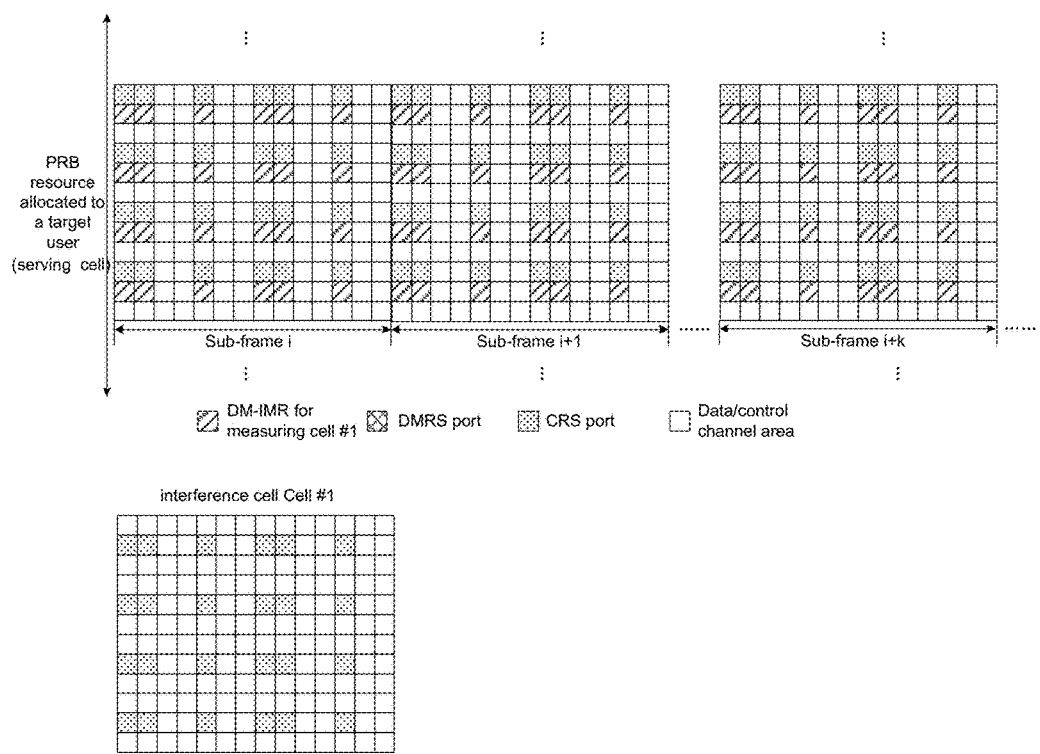
FIG. 25 is a diagram illustrating an IMR according to an application embodiment 18 of the disclosure.

For example, under a normal CP condition, configuration of the DM-IMRs is implemented as shown in FIG. 25: the DM-IMRs "" exist and only exist on each sub-frame and each PRB where a target data/control channel to be demodulated/decoded of the target user is located, and the DM-IMRs "" in each PRB are a part of RE resources at a position where an adjacent cell CRS of the target user is located; the target user sends zero power signals on the DM-IMRs, and the target user performs target data channel mapping on these DM-IMRs in a rate matching manner; and therefore, signals received on the DM-IMRs are correspondingly interference signals of the target user on each sub-frame and each PRB.

The network side notifies the target user of the position of the interference cell CRS or a shift value $V_{shift}$ or physical cell ID corresponding to the interference cell CRS through high-layer signalling and/or physical-layer signalling.

The target user performs interference elimination or interference suppression on a receiving side to achieve higher target data channel demodulation/decoding performance by means of the interference signals measured on the DM-IMRs.

Embodiment 19

DM-IMRs configured to a target user by a network side simultaneously include RE resources at a position where a CRS is located and ZP-CSI-RS resources, wherein the RE resources at the position where the CRS is located and the ZP-CSI-RS resources may be configured to measure interference of different interference sources respectively, and for example, the RE resources at the position where the CRS is located are configured to measure interference of a strong interference source, while the ZP-CSI-RS resources are configured to measure interference, except the interference of the strong interference source, to the target user.

If the target user has three interference cell, i.e. interference cells cell#1, cell#2 and cell#3 respectively, wherein an interference signal in cell#1 is transmitted on the basis of CRS, and interference signals in cell#2 and cell#3 are all transmitted on the basis of DMRS. The DM-IMRs configured for the target user by the network side include a part of RE resources at positions where interference cell CRSs of the target user are located and ZP-CSI-RS resources indicated by a ZP-CSI-RS resource configuration 0. The target user sends zero power signals on the DM-IMRs, and the DM-IMRs exist and only exist in a sub-frame and PRB resource where a target data channel to which interference is measured by the DM-IMRs is located.

Figure 26:
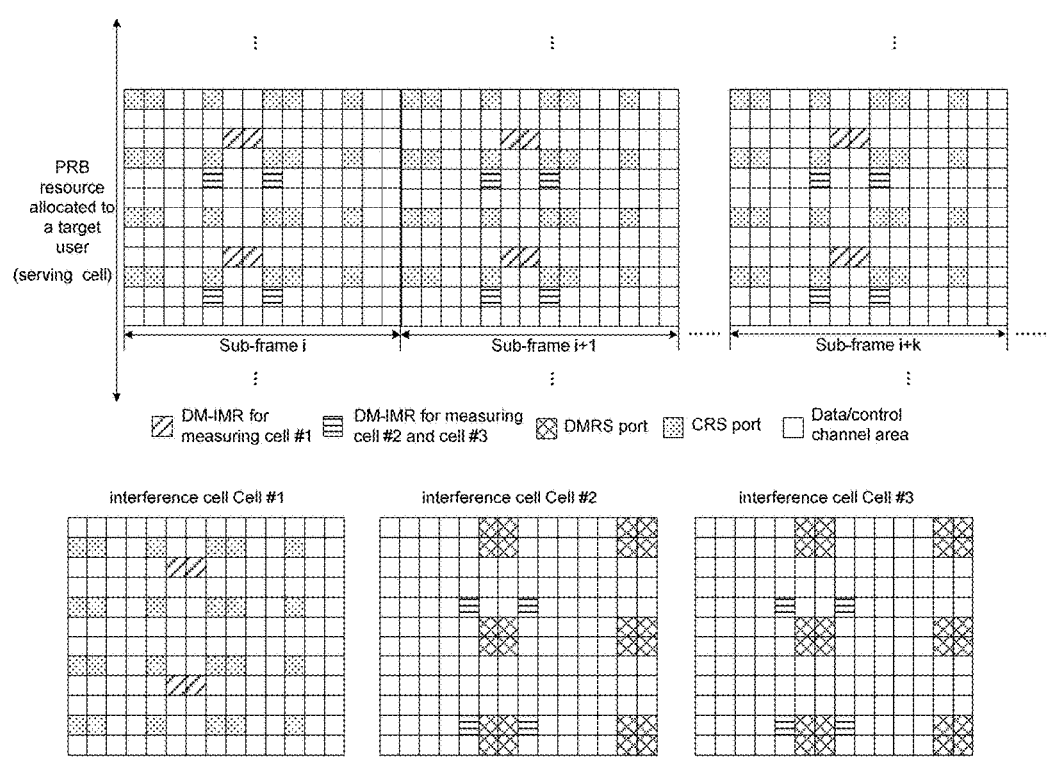
FIG. 26 is a diagram illustrating an IMR according to an application embodiment 19 of the disclosure.

For example, under a normal CP condition, configuration of the DM-IMRs is implemented as shown in FIG. 26: the DM-IMRs "" and "" exist and only exist on each sub-frame and each PRB pair where a data/control channel to be demodulated/decoded of the target user is located. The DM-IMRs "" are a part of RE resources at a position where an adjacent cell CRS of the target user is located (a part of resources of CRS port 1 and port 2 in the interference cell cell#1 in the embodiment shown in FIG. 26), and are configured to measure interference of interference user cell#1; and the DM-IMRs "" in each PRB are the ZP-CSI-RS resources indicated by the ZP-CSI-RS resource configuration 0, and are configured to measure interference except the interference of the interference user cell#1 in all the interference to the target user (i.e. interference, of cell#2 and cell#3 to the user).

The target user sends zero power signals on the DM-IMRs, and the target user performs target data channel mapping on these DM-IMRs in a rate matching manner; and in addition, the interference user cell#1 sends zero power signals on the ZP-CSI-RS resources indicated by the ZP-CSI-RS resource configuration 0, and the interference users cell#2 and cell#3 send zero power signals on the part of RE resources at the position where the adjacent cell CRS of the target user is located (a part of resources of CRS port 1 and port 2 in the interference cell cell#1 in the embodiment shown in FIG. 26). Therefore, signals received on the DM-IMRs "" are interference signals of cell#2 and cell#3, and signals received on the DM-IMRs "" are interference signals of cell#1.

The network side notifies the target user of the DM-IMRs through high-layer signalling and/or physical-layer signalling.

The target user performs interference elimination or interference suppression on a receiving side to achieve higher target data channel demodulation/decoding performance by means of the interference signals measured on the DM-IMRs.

Embodiment 20

The same DM-IMRs may be configured for multiple users.

For example, UE1, UE2 and UE3 are users in the same serving cell, and UE1, UE2 and UE3 are simultaneously scheduled and allocated with different PRB resources for transmitting target transmission channels. For example, serving cell PRB resources allocated to UE1 are {PRB #0, PRB#1, PRB#3}, serving cell PRB resource allocated to UE2 is {PRB #5} and PRB resources allocated to UE3 are {PRB #2, PRB #7}.

All DM-IMRs configured for UE1, UE2 and UE3 by a network side have a ZP-CSI-RS resource configuration 0, and a difference is that the DM-IMRs of UE1 only exist in PRB #0, PRB #1 and PRB #3, the DM-IMRs of UE2 only exist in PRB #5 and the DM-IMRs of UE3 only exist in PRB #2 and PRB #7.

UE1 measures transmission interference to its target data channel by means of RE resources indicated by the ZP-CSI-RS resource configuration 0 for demodulation interference measurement in PRB #0, PRB #1 and PRB #3; UE2 measures transmission interference to its target data channel by means of RE resources indicated by the ZP-CSI-RS resource configuration 0 for demodulation interference measurement in PRB #5; and UE3 measures transmission interference to its target data channel by means of RE resources indicated by the ZP-CSI-RS resource configuration 0 for demodulation interference measurement in PRB #2 and PRB #7.

UE1 performs interference elimination or interference suppression at a receiving side to achieve better target data channel demodulation/decoding performance by means of measured transmission interference signals; UE2 performs interference elimination or interference suppression at a receiving side to achieve better target data channel demodulation/decoding performance by means of measured transmission interference signals; and UE3 performs interference elimination or interference suppression at a receiving side to achieve better target data channel demodulation/decoding performance by means of measured transmission interference signals.

The disclosure also records a storage medium, in which a computer program, wherein the computer program is configured to execute the interference measurement methods according to embodiments 1 to 20.

The above is only the preferred embodiment of the disclosure and not intended to limit the scope of protection of the disclosure.

INDUSTRIAL APPLICABILITY

By the solutions of the embodiments of the disclosure, accuracy in transmission interference measurement of the target data channel may be improved, so that improvement in demodulation/decoding performance of the target data channel at a receiving side is facilitated, and receiving performance of the target data channel may further be improved.

What is claimed is:

1. An interference measurement method, comprising:
configuring, by a network side, Interference Measurement Resources for Demodulation (DM-IMRs) for a target data channel of a terminal, positions of the DM-IMRs on a frequency domain being determined according to a Physical Resource Block (PRB) which bears the target data channel; and
indicating configuration information of the DM-IMRs to the terminal to enable the terminal to perform transmission interference measurement on the target data channel;
wherein the positions of the DM-IMRs on the frequency domain only exist in the PRB which bears the target data channel, and the DM-IMRs are not configured in a sub-frame where a Physical Multicast Channel (PMCH) is located; and
an attribute of the DM-IMRs is that: the network side sends zero power signals on the DM-IMRs, and the target data channel is mapped to the DM-IMRs in a rate matching manner.

2. The method according to claim 1, wherein
N sets of DM-IMRs are configured for the terminal through high-layer signalling, and DM-IMRs configured for the interference measurement of the current target data channel are indicated to the terminal through $|\log_2 N|$ or N-bit physical-layer signalling, wherein N is a positive integer more than 1.

3. The method according to claim 1, wherein the DM-IMRs comprise one of the following resources:
Resource Element (RE) resources configurable as Zero Power Channel State Information Reference Signals (ZP-CSI-RSs);
RE resources configurable as Channel State Information Reference Signals (CSI-RSs); and
RE resources configurable as Common Reference Signals (CRSs).

4. The method according to claim 3, wherein when the DM-IMRs are the RE resources configurable as ZP-CSI-RSs,
the DM-IMRs are one or more sets of RE resources configurable as ZP-CSI-RS resources; or
the DM-IMRs are a part of RE resources in one or more sets of RE resources configurable as ZP-CSI-RS resources.

5. The method according to claim 3, wherein when the DM-IMRs are the RE resources configurable as CSI-RSs,
the DM-IMRs are one or more sets of RE resources configurable as single-antenna or double-antenna port CSI-RS resources; or
the DM-IMRs are one or more sets of RE resources configurable as four-antenna port CSI-RS resources; or
the DM-IMRs are one or more sets of RE resources configurable as eight-antenna port CSI-RS resources.

6. The method according to claim 3, wherein when the DM-IMRs are the RE resources configurable as CRSs,
the DM-IMRs are RE resources at a position where a serving cell CRS of the terminal is located; or
the DM-IMRs are a part of RE resources at the position where the serving cell CRS of the terminal is located; or
the DM-IMRs are RE resources at a position where an interference cell CRS of the terminal is located; or
the DM-IMRs are a part of RE resources at the position where the interference cell CRS of the terminal is located.

7. The method according to claim 3, wherein
the RE resources configurable as ZP-CSI-RSs are RE resources configured as ZP-CSI-RSs and supported by a communication system or RE resources configured as ZP-CSI-RSs which are added on the basis of the RE resources configured as ZP-CSI-RSs and supported by the communication system; and
the RE resources configurable as CSI-RSs are RE resources configured as CSI-RSs and supported by the communication system or RE resources configured as CSI-RSs which are added on the basis of the RE resources configured as CSI-RSs and supported by the communication system.

8. The method according to claim 1, wherein the configuration information of the DM-IMRs is indicated to the terminal in one of the following manners:
one or more sets of DM-IMRs are configured and indicated through high-layer signalling; or,
multiple sets of DM-IMRs are configured through high-layer signalling, and DM-IMRs configured for interference measurement of a current target data channel are indicated to the terminal through physical-layer signalling.

9. The method according to claim 8, wherein a DM-IMR Information Element (IE) configuration item is set in the high-layer signalling, and the DM-IMR IE configuration item comprises one or more of:
DM-IMR Identifiers (IDs), configured to distinguish different sets of DM-IMRs;
a DM-IMR configuration, configured to indicate RE resource positions of the DM-IMRs in each PRB resource where the target data channel is located; and
a DM-IMR sub-frame configuration, configured to indicate a sub-frame where the DM-IMRs are located.

10. The method according to claim 9, wherein the DM-IMR configuration comprises at least one of:
a ZP-CSI-RS resource configuration supported by a communication system;

a ZP-CSI-RS resource configuration which is added on the basis of the ZP-CSI-RS resource configuration supported by the communication system;

the ZP-CSI-RS resource configuration supported by the communication system and position indication information of a part of RE resources under each ZP-CSI-RS resource configuration;

the ZP-CSI-RS resource configuration which is added on the basis of the ZP-CSI-RS resource configuration supported by the communication system and the position indication information of the part of RE resources under each ZP-CSI-RS resource configuration;

a single-antenna or double-antenna port CSI-RS resource configuration supported by the communication system;

a single-antenna or double-antenna port CSI-RS resource configuration which is added on the basis of the single-antenna or double-antenna port CSI-RS resource configuration supported by the communication system;

a four-antenna port CSI-RS resource configuration supported by the communication system;

a four-antenna port CSI-RS resource configuration which is added on the basis of the four-antenna port CSI-RS resource configuration supported by the communication system;

an eight-antenna port CSI-RS resource configuration supported by the communication system;

an eight-antenna port CSI-RS resource configuration which is added on the basis of the eight-antenna port CSI-RS resource configuration supported by the communication system;

position indication information of RE resources at a position where a serving cell CRS of the terminal is located;

position indication information of the part of RE resources at the position where the serving cell CRS of the terminal is located;

position indication information of RE resources at a position where an interference cell CRS of the terminal is located; and position indication information of the part of RE resources at the position where the interference cell CRS of the terminal is located.

11. The method according to claim 9, wherein the DM-IMR sub-frame configuration comprises at least one of:

a CSI-RS sub-frame configuration supported by the communication system;

a CSI-RS sub-frame configuration which is added on the basis of the CSI-RS sub-frame configuration supported by the communication system; and a sub-frame configuration which bears the target data channel.

12. The method according to claim 9, wherein a representation manner for the DM-IMR configuration comprises one of the following manners that:

the DM-IMR configuration is characterized by 16 or 16+X or X-bit high-layer signalling, and ZP-CSI-RS resources configured as DM-IMRs are indicated to the terminal in a bitmap manner, wherein X represents the added ZP-CSI-RS resource configuration in the communication system, and X is a positive integer;

the DM-IMR configuration is characterized by 32 or 32+Y1 or Y1-bit high-layer signalling, and single-antenna or double-antenna port CSI-RS resources configured as DM-IMRs are indicated to the terminal in the bitmap manner, wherein Y1 represents the added single-antenna or double-antenna port CSI-RS resource configuration of the communication system, and Y1 is a positive integer;

the DM-IMR configuration is characterized by 16 or 16+Y2 or Y2-bit high-layer signalling, and four-antenna port CSI-RS resources configured as DM-IMRs are indicated to the terminal in the bitmap manner, wherein Y2 represents the added four-antenna port CSI-RS resource configuration in the communication system, and Y2 is a positive integer;

the DM-IMR configuration is characterized by 8 or 8+Y3 or Y3-bit high-layer signalling, and eight-antenna port CSI-RS resources configured as DM-IMRs are indicated to the terminal in the bitmap manner, wherein Y3 represents the added eight-antenna port CSI-RS resource configuration in the communication system, and Y3 is a positive integer;

the DM-IMR configuration is characterized by $|\log_2 16|$ or $|\log_2(16+X)|$ or $|\log_2 X|$-bit high-layer signalling, and the ZP-CSI-RS resources configured as DM-IMRs are indicated to the terminal, wherein X represents the added ZP-CSI-RS resource configuration in the communication system, and X is a positive integer;

the DM-IMR configuration is characterized by $|\log_2 32|$ or $|\log_2(32+Y1)|$ or $|\log_2 Y1|$-bit high-layer signalling, and the single-antenna or double-antenna port CSI-RS resources configured as DM-IMRs are indicated to the terminal, wherein Y1 represents the added single-antenna or double-antenna port CSI-RS resource configuration in the communication system, and Y1 is a positive integer;

the DM-IMR configuration is characterized by $|\log_2 16|$ or $|\log_2 (16+Y2)|$ or $|\log_2 Y2|$-bit high-layer signalling, and the four-antenna port CSI-RS resources configured into DM-IMRs are indicated to the terminal, wherein Y2 represents the added four-antenna port CSI-RS resource configuration in the communication system, and Y2 is a positive integer;

the DM-IMR configuration is characterized by $|\log_2 8|$ or $|\log_2(8+Y3)|$ or $|\log_2 Y3|$-bit high-layer signalling, and the eight-antenna port CSI-RS resources configured as DM-IMRs are indicated to the terminal, wherein Y3 represents the added eight-antenna port CSI-RS resource configuration in the communication system, and Y3 is a positive integer;

the DM-IMR configuration is characterized by 16 or 16+Q or 16+X+Q-bit high-layer signalling, and RE resources in the ZP-CSI-RS resources configured as DM-IMRs are indicated to the terminal in the bitmap manner, wherein X represents the added ZP-CSI-RS resource configuration in the communication system, Q represents the RE resources configured as DM-IMRs of the terminal in each set of ZP-CSI-RS resources usable for the DM-IMRs of the terminal, and both X and Q are positive integers;

the DM-IMR configuration is characterized by 24-bit high-layer signalling, and RE resources configured as the DM-IMRs of the terminal in the RE resources at the position where the CRS is located are indicated to the terminal in the bitmap manner;

Z sets of patterns of a part of CRS REs are pre-defined, the DM-IMR configuration is characterized by Z or $|\log_2 Z|$-bit high-layer signalling, and RE resources configured as the DM-IMRs of the terminal in the Z sets of patterns of the part of CRS REs are indicated to the terminal, wherein Z is an integer more than 1;

positions or corresponding shift values $V_{shift}$ or physical cell IDs of CRSs serving as DM-IMRs are indicated to the terminal through high-layer and/or physical-layer signalling; and the DM-IMR configuration is characterized by 24+V-bit high-layer signalling, and the positions of the CRSs and RE resources configured as the DM-IMRs of the terminal in resources at the positions of the CRSs are indicated to the terminal, wherein V is a positive integer.

13. An interference measurement method, comprising:
receiving, by a terminal side, configuration information of Interference Measurement Resources for Demodulation (DM-IMRs), positions of the DM-IMRs on a frequency domain being determined according to a Physical Resource Block (PRB) which bears a target data channel; and determining, by the terminal side, DM-IMRs corresponding to the target data channel on the basis of the configuration information of the DM-IMRs, and measuring interference during transmission of the target data channel through the DM-IMRs;

wherein the terminal determines as a default that the DM-IMRs only exist in a sub-frame which bears the target data channel, and there are no DM-IMRs in a sub-frame where a Physical Multicast Channel (PMCH) is located; and the terminal does not receive any signal on the DM-IMRs, and de-maps the target data channel on the DM-IMRs in a rate matching manner.

14. The method according to claim 13, wherein the terminal receives the configuration information of the DM-IMRs in one of manners of:
determining one or more sets of DM-IMRs which are configured and indicated by receiving high-layer signalling; or,
determining multiple sets of DM-IMRs which are configured by receiving high-layer signalling, and determining DM-IMRs configured for interference measurement of a current target data channel by receiving physical-layer signalling.

15. The method according to claim 14, wherein
the terminal determines the configured DM-IMRs by receiving a DM-IMR Information Element (IE) configuration item in the high-layer signalling, and the DM-IMR IE configuration item comprises one or more of:
DM-IMR Identifiers (IDs), configured to distinguish different sets of DM-IMRs;
a DM-IMR configuration, configured to indicate RE resource positions of the DM-IMRs in each PRB resource where the target data channel is located; and
a DM-IMR sub-frame configuration, configured to indicate a sub-frame where the DM-IMRs are located.

16. The method according to claim 15, wherein the DM-IMR configuration comprises at least one of:
a ZP-CSI-RS resource configuration supported by a communication system;
a ZP-CSI-RS resource configuration which is added on the basis of the ZP-CSI-RS resource configuration supported by the communication system;
the ZP-CSI-RS resource configuration supported by the communication system and position indication information of a part of RE resources under each ZP-CSI-RS resource configuration;
the ZP-CSI-RS resource configuration which is added on the basis of the ZP-CSI-RS resource configuration supported by the communication system and the position indication information of the part of RE resources under each ZP-CSI-RS resource configuration;
a single-antenna or double-antenna port CSI-RS resource configuration supported by the communication system;
a single-antenna or double-antenna port CSI-RS resource configuration which is added on the basis of the single-antenna or double-antenna port CSI-RS resource configuration supported by the communication system;
a four-antenna port CSI-RS resource configuration supported by the communication system;
a four-antenna port CSI-RS resource configuration which is added on the basis of the four-antenna port CSI-RS resource configuration supported by the communication system;
an eight-antenna port CSI-RS resource configuration supported by the communication system;
an eight-antenna port CSI-RS resource configuration which is added on the basis of the eight-antenna port CSI-RS resource configuration supported by the communication system;
position indication information of RE resources at a position where a serving cell CRS of the terminal is located;
position indication information of the part of RE resources at the position where the serving cell CRS of the terminal is located;
position indication information of RE resources at a position where an interference cell CRS of the terminal is located; and
position indication information of the part of RE resources at the position where the interference cell CRS of the terminal is located.

17. The method according to claim 15, wherein the DM-IMR sub-frame configuration comprises at least one of:
a CSI-RS sub-frame configuration supported by the communication system;
a CSI-RS sub-frame configuration which is added on the basis of the CSI-RS sub-frame configuration supported by the communication system; and
the sub-frame which bears the target data channel.

18. The method according to claim 15, wherein a representation manner for the DM-IMR configuration comprises one of the following manners that:
the DM-IMR configuration is characterized by 16 or 16+X or X-bit high-layer signalling, and ZP-CSI-RS resources configured as DM-IMRs are indicated to the terminal in a bitmap manner, wherein X represents the added ZP-CSI-RS resource configuration in the communication system, and X is a positive integer;
the DM-IMR configuration is characterized by 32 or 32+Y1 or Y1-bit high-layer signalling, and single-antenna or double-antenna port CSI-RS resources configured as DM-IMRs are indicated to the terminal in the bitmap manner, wherein Y1 represents the added single-antenna or double-antenna port CSI-RS resource configuration of the communication system, and Y1 is a positive integer;
the DM-IMR configuration is characterized by 16 or 16+Y2 or Y2-bit high-layer signalling, and four-antenna port CSI-RS resources configured as DM-IMRs are indicated to the terminal in the bitmap manner, wherein Y2 represents the added four-antenna port CSI-RS resource configuration in the communication system, and Y2 is a positive integer;
the DM-IMR configuration is characterized by 8 or 8+Y3 or Y3-bit high-layer signalling, and eight-antenna port CSI-RS resources configured as DM-IMRs are indicated to the terminal in the bitmap manner, wherein Y3 represents the added eight-antenna port CSI-RS resource configuration in the communication system, and Y3 is a positive integer;

the DM-IMR configuration is characterized by $|\log_2 16|$ or $|\log_2(16+X)|$ or $|\log_2 X|$-bit high-layer signalling, and the ZP-CSI-RS resources configured as DM-IMRs are indicated to the terminal, wherein X represents the added ZP-CSI-RS resource configuration in the communication system, and X is a positive integer;

the DM-IMR configuration is characterized by $|\log_2 32|$ or $|\log_2(32+Y1)|$ or $|\log_2 Y1|$-bit high-layer signalling, and the single-antenna or double-antenna port CSI-RS resources configured as DM-IMRs are indicated to the terminal, wherein Y1 represents the added single-antenna or double-antenna port CSI-RS resource configuration in the communication system, and Y1 is a positive integer;

the DM-IMR configuration is characterized by $|\log_2 16|$ or $|\log_2(16+Y2)|$ or $|\log_2 Y2|$-bit high-layer signalling, and the four-antenna port CSI-RS resources configured into DM-IMRs are indicated to the terminal, wherein Y2 represents the added four-antenna port CSI-RS resource configuration in the communication system, and Y2 is a positive integer;

the DM-IMR configuration is characterized by $|\log_2 8|$ or $|\log_2(8+Y3)|$ or $|\log_2 Y3|$-bit high-layer signalling, and the eight-antenna port CSI-RS resources configured as DM-IMRs are indicated to the terminal, wherein Y3 represents the added eight-antenna port CSI-RS resource configuration in the communication system, and Y3 is a positive integer;

the DM-IMR configuration is characterized by 16 or 16+Q or 16+X+Q-bit high-layer signalling, and RE resources in the ZP-CSI-RS resources configured as DM-IMRs are indicated to the terminal in the bitmap manner, wherein X represents the added ZP-CSI-RS resource configuration in the communication system, Q represents the RE resources configured as DM-IMRs of the terminal in each set of ZP-CSI-RS resources usable for the DM-IMRs of the terminal, and both X and Q are positive integers;

the DM-IMR configuration is characterized by 24-bit high-layer signalling, and RE resources configured as the DM-IMRs of the terminal in the RE resources at the position where the CRS is located are indicated to the terminal in the bitmap manner;

Z sets of patterns of a part of CRS REs are pre-defined, the DM-IMR configuration is characterized by Z or $|\log_2 Z|$-bit high-layer signalling, and RE resources configured as the DM-IMRs of the terminal in the Z sets of patterns of the part of CRS REs are indicated to the terminal, wherein Z is an integer more than 1;

positions or corresponding shift values $V_{shift}$ or physical cell IDs of CRSs serving as DM-IMRs are indicated to the terminal through high-layer and/or physical-layer signalling; and the DM-IMR configuration is characterized by 24+V-bit high-layer signalling, and the positions of the CRSs and RE resources configured as the DM-IMRs of the terminal in resources at the positions of the CRSs are indicated to the terminal, wherein V is a positive integer.

19. The method according to claim 13, wherein the DM-IMRs comprise one of the following resources:

Resource Element (RE) resources configurable as Zero Power Channel State Information Reference Signals (ZP-CSI-RSs);

RE resources configurable as Channel State Information Reference Signals (CSI-RSs); and RE resources configurable as Common Reference Signals (CRSs).

20. The method according to claim 19, wherein when the DM-IMRs are the RE resources configurable as ZP-CSI-RSs, the DM-IMRs are one or more sets of RE resources configurable as ZP-CSI-RS resources; or the DM-IMRs are a part of RE resources in one or more sets of RE resources configurable as ZP-CSI-RS resources.

21. The method according to claim 19, wherein when the DM-IMRs are the RE resources configurable as CSI-RSs, the DM-IMRs are one or more sets of RE resources configurable as single-antenna or double-antenna port CSI-RS resources; or the DM-IMRs are one or more sets of RE resources configurable as four-antenna port CSI-RS resources; or the DM-IMRs are one or more sets of RE resources configurable as eight-antenna port CSI-RS resources.

22. The method according to claim 19, wherein when the DM-IMRs are the RE resources configurable as CRSs, the DM-IMRs are RE resources at a position where a serving cell CRS of the terminal is located; or the DM-IMRs are a part of RE resources at the position where the serving cell CRS of the terminal is located; or the DM-IMRs are RE resources at a position where an interference cell CRS of the terminal is located; or the DM-IMRs are a part of RE resources at the position where the interference cell CRS of the terminal is located.

23. The method according to claim 19, wherein the RE resources configurable as ZP-CSI-RSs are RE resources configurable as ZP-CSI-RSs and supported by a communication system or RE resources configured as ZP-CSI-RSs which are added on the basis of the RE resources configured as ZP-CSI-RSs and supported by the communication system; and the RE resources configured as CSI-RSs are RE resources configured as CSI-RSs and supported by the communication system or RE resources configured as CSI-RSs which are added on the basis of the RE resources configured as CSI-RSs and supported by the communication system.

24. The method according to claim 13, wherein the terminal determines N sets of available DM-IMRs by receiving the high-layer signalling, and determines resources configured for the interference measurement of the current target data channel by receiving $|\log_2 N|$ or N-bit physical-layer signalling, wherein N is a positive integer more than 1.

25. A network-side equipment, comprising: a configuration module and an indication module, wherein the configuration module is configured to configure Interference Measurement Resources for Demodulation (DM-IMRs) for a target data channel of a terminal, positions of the DM-IMRs on a frequency domain being determined according to a Physical Resource Block (PRB) which bears the target data channel; and the indication module is configured to indicate configuration information of the DM-IMRs to the terminal to enable the terminal to perform transmission interference measurement on the target data channel;
wherein the positions of the DM-IMRs on the frequency domain only exist in the PRB which bears the target data channel, and the DM-IMRs are not configured in a sub-frame where a Physical Multicast Channel (PMCH) is located; and
an attribute of the DM-IMRs is that: the network side sends zero power signals on the DM-IMRs, and the target data channel is mapped to the DM-IMRs in a rate matching manner.

26. A terminal equipment, comprising: a receiving module and a measurement module, wherein
the receiving module is configured to receive configuration information of Interference Measurement Resources for Demodulation (DM-IMRs), positions of the DM-IMRs on a frequency domain being determined according to a Physical Resource Block (PRB) which bears a target data channel; and
the measurement module is configured to determine DM-IMRs corresponding to the target data channel on the basis of the configuration information of the DM-IMRs, and measure interference during transmission of the target data channel through the DM-IMRs;
wherein the positions of the DM-IMRs on the frequency domain only exist in the PRB which bears the target data channel, and the DM-IMRs are not configured in a sub-frame where a Physical Multicast Channel (PMCH) is located; and
the terminal does not receive any signal on the DM-IMRs, and de-maps the target data channel on the DM-IMRs in a rate matching manner.

27. A non-transitory storage medium comprising a computer program stored thereon, wherein the computer program is configured to execute an interference measurement method, the interference measurement method comprising:
configuring, by a network side, Interference Measurement Resources for Demodulation (DM-IMRs) for a target data channel of a terminal, positions of the DM-IMRs on a frequency domain being determined according to a Physical Resource Block (PRB) which bears the target data channel; and
indicating configuration information of the DM-IMRs to the terminal to enable the terminal to perform transmission interference measurement on the target data channel; or
receiving, by a terminal side, configuration information of Interference Measurement Resources for Demodulation (DM-IMRs), positions of the DM-IMRs on a frequency domain being determined according to a Physical Resource Block (PRB) which bears a target data channel; and
determining, by the terminal side, DM-IMRs corresponding to the target data channel on the basis of the configuration information of the DM-IMRs, and measuring interference during transmission of the target data channel through the DM-IMRs;
wherein the positions of the DM-IMRs on the frequency domain only exist in the PRB which bears the target data channel, and the DM-IMRs are not configured in a sub-frame where a Physical Multicast Channel (PMCH) is located; and
an attribute of the DM-IMRs is that: the network side sends zero power signals on the DM-IMRs, and the target data channel is mapped to the DM-IMRs in a rate matching manner.

\* \* \* \* \*